United States Patent
Jang et al.

(10) Patent No.: US 12,068,983 B2
(45) Date of Patent: Aug. 20, 2024

(54) METHOD FOR IDENTIFYING FORMAT OF PPDU IN WIRELESS COMMUNICATION SYSTEM

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Dongguk Lim, Seoul (KR); Suhwook Kim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/632,924

(22) PCT Filed: Aug. 12, 2020

(86) PCT No.: PCT/KR2020/010669
§ 371 (c)(1),
(2) Date: Feb. 4, 2022

(87) PCT Pub. No.: WO2021/029667
PCT Pub. Date: Feb. 18, 2021

(65) Prior Publication Data
US 2022/0311568 A1    Sep. 29, 2022

Related U.S. Application Data

(60) Provisional application No. 62/900,465, filed on Sep. 14, 2019.

(30) Foreign Application Priority Data

Aug. 12, 2019  (KR) .................. 10-2019-0098119
Aug. 13, 2019  (KR) .................. 10-2019-0098825

(Continued)

(51) Int. Cl.
*H04L 27/26*    (2006.01)
*H04L 5/00*     (2006.01)
*H04W 84/14*    (2009.01)

(52) U.S. Cl.
CPC ........ *H04L 5/0046* (2013.01); *H04L 27/2602* (2013.01); *H04W 84/14* (2013.01)

(58) Field of Classification Search
CPC ..... H04L 1/00; H04L 27/2602; H04L 5/0046; H04L 65/40; H04W 72/04; H04W 84/14
See application file for complete search history.

(56) References Cited

U.S. PATENT DOCUMENTS

2005/0265221 A1* 12/2005 Batra .................. H04L 27/2605
                                                                       370/208
2017/0250848 A1   8/2017 Lee et al.

FOREIGN PATENT DOCUMENTS

KR    10-2007-0022717    2/2007
KR    10-2016-0055945    5/2016
(Continued)

OTHER PUBLICATIONS

PCT International Application No. PCT/KR2020/010669, International Search Report dated Nov. 11, 2020, 7 pages.
(Continued)

*Primary Examiner* — Melvin C Marcelo
*Assistant Examiner* — Natali Pascual Peguero
(74) *Attorney, Agent, or Firm* — LEE, HONG, DEGERMAN, KANG & WAIMEY

(57) ABSTRACT

One example according to the present specification relates to a method for identifying the format of a PPDU in a wireless LAN (WLAN) system. A receiving STA may receive a first PPDU. The receiving STA may check at least one extra tone of at least one symbol of the first PPDU. The receiving STA may determine, on the basis of the at least one extra tone, the (Continued)

format of the first PPDU as a repeated PPDU format. Thereafter, the receiving STA may receive a second PPDU including the same data as the first PPDU.

17 Claims, 57 Drawing Sheets

(30) Foreign Application Priority Data

Sep. 3, 2019 (KR) ........................ 10-2019-0109185
Nov. 4, 2019 (KR) ........................ 10-2019-0139716

(56) References Cited

FOREIGN PATENT DOCUMENTS

| | | |
|---|---|---|
| KR | 10-2019-0092452 | 8/2019 |
| WO | 2020159163 | 8/2020 |

OTHER PUBLICATIONS

Filippi et al., "Adaptive Repetition," IEEE 802.11-19/1055r0, Jul. 2019, 22 pages.

\* cited by examiner

FIG. 1
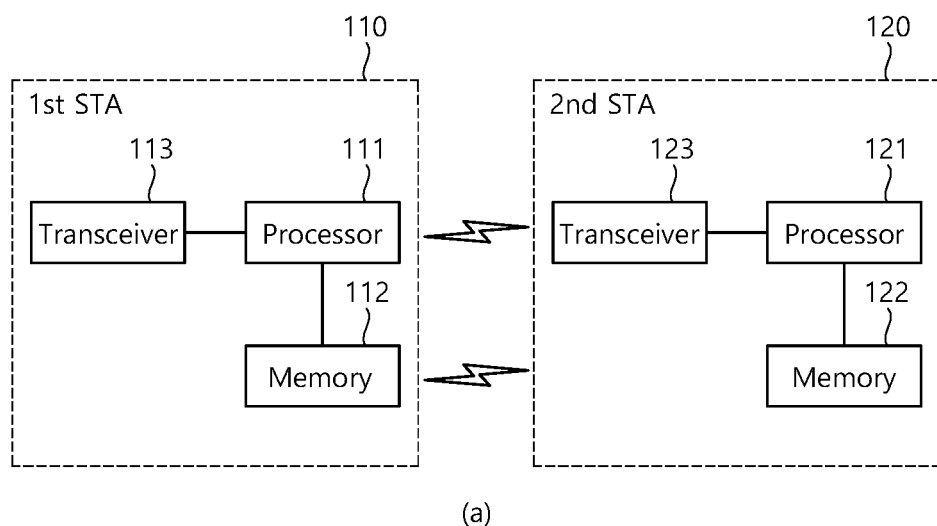
(a)
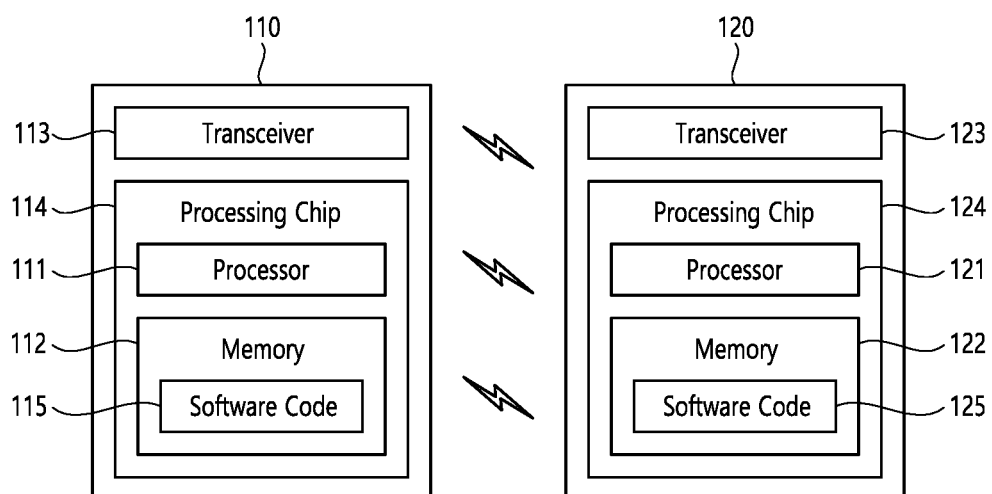
(b)

FIG. 2
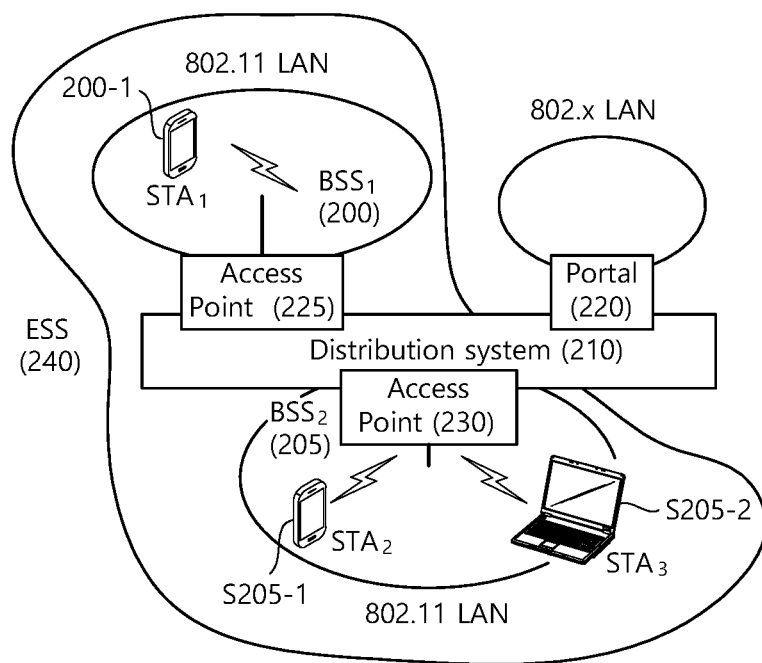
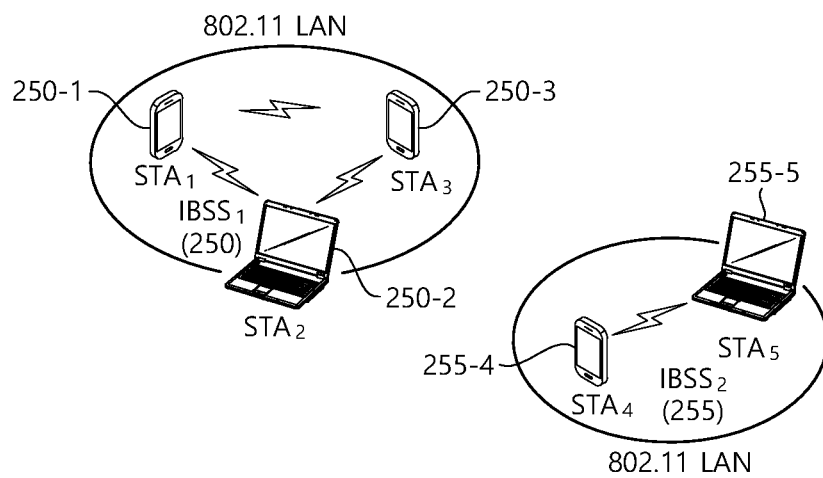

METHOD FOR IDENTIFYING FORMAT OF PPDU IN WIRELESS COMMUNICATION SYSTEM

CROSS-REFERENCE TO RELATED APPLICATIONS

This application is the National Stage filing under 35 U.S.C. 371 of International Application No. PCT/KR2020/010669, filed on Aug. 12, 2020, which claims the benefit of earlier filing date and right of priority to Korean Application Nos. 10-2019-0098119 filed on Aug. 12, 2019, 10-2019-0098825 filed on Aug. 13, 2019, 10-2019-0109185 filed on Sep. 3, 2019, and 10-2019-0139716 filed on Nov. 4, 2019, and also claims the benefit of U.S. Provisional Application No. 62/900,465, filed on Sep. 14, 2019, the contents of all of which are hereby incorporated by reference herein in their entireties.

BACKGROUND

Technical Field

This specification relates to a scheme for identifying a PPDU format in a wireless LAN system, and more particularly, relates to a method for identifying a PPDU format in a wireless LAN system and an apparatus supporting the same.

Related Art

Wireless network technologies may include various types of wireless local area networks (WLAN). WLAN may be used for interconnecting neighboring devices by adopting networking protocols that are extensively used. The various technical features that are described in this specification may be applied to a random communication standard, such as Wi-Fi, or more generally, any one of the IEEE 802.11 wireless protocol group.

The present specification either enhances the conventional (or existing) IEEE 802.11p specification or proposes technical characteristics that can be used in a new communication standard. The new communication standard may be a Next Generation Vehicular/V2x (NGV) standard, which is currently being discussed.

SUMMARY

Technical Objects

In the NGV standard (that is, 802.11bd standard), the PPDU may be transmitted/received in various formats. In the NGV standard (that is, 802.11bd standard), a format in which an 11p PPDU is repeatedly transmitted is considered. Accordingly, when an 11p PPDU is received by a STA supporting the NGV standard (that is, an NGV STA), a method for distinguishing whether the 11p PPDU is in a repeatedly transmitted format may be required.

Technical Solutions

According to various embodiments of the present disclosure, a receiving STA may perform a step of receiving, from the transmitting STA, a first Physical Protocol Data Unit (PPDU), wherein at least one symbol of the first PPDU includes at least one extra tone; a step of determining the format of the first PPDU as a repeated PPDU format based on the at least one extra tone; and a step of receiving, from the transmitting STA, a second PPDU including the same data as the first PPDU based on the format of the first PPDU, wherein the first PPDU and the second PPDU are received through a 5.9 GHz band based on a frequency spacing of 156.25 kHz.

Technical Effects

This specification proposes technical features supporting a situation in which the 5.9 GHz band is used in various WLAN systems (for example, IEEE 802.11bd systems). Based on various examples of the present specification, throughput improvement and high speed of Dedicated Short Range Communication (DSRC) (802.11p) may be supported for smooth V2X support in the 5.9 GHz band.

According to an example of this specification, a transmitting STA may transmit a PPDU in a repeated PPDU format. That is, the transmitting STA may repeatedly transmit the same PPDU. The PPDU of the repeated PPDU format may include information for indicating the repeated PPDU format. The receiving STA may confirm that the same PPDU is scheduled to be transmitted after the received PPDU, based on the information for indicating the repeated PPDU format.

Accordingly, according to an example of the present specification, when PPDUs of the repeated PPDU format are received, there is an effect of increasing the SNR.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

DETAILED DESCRIPTION

Figure 3:
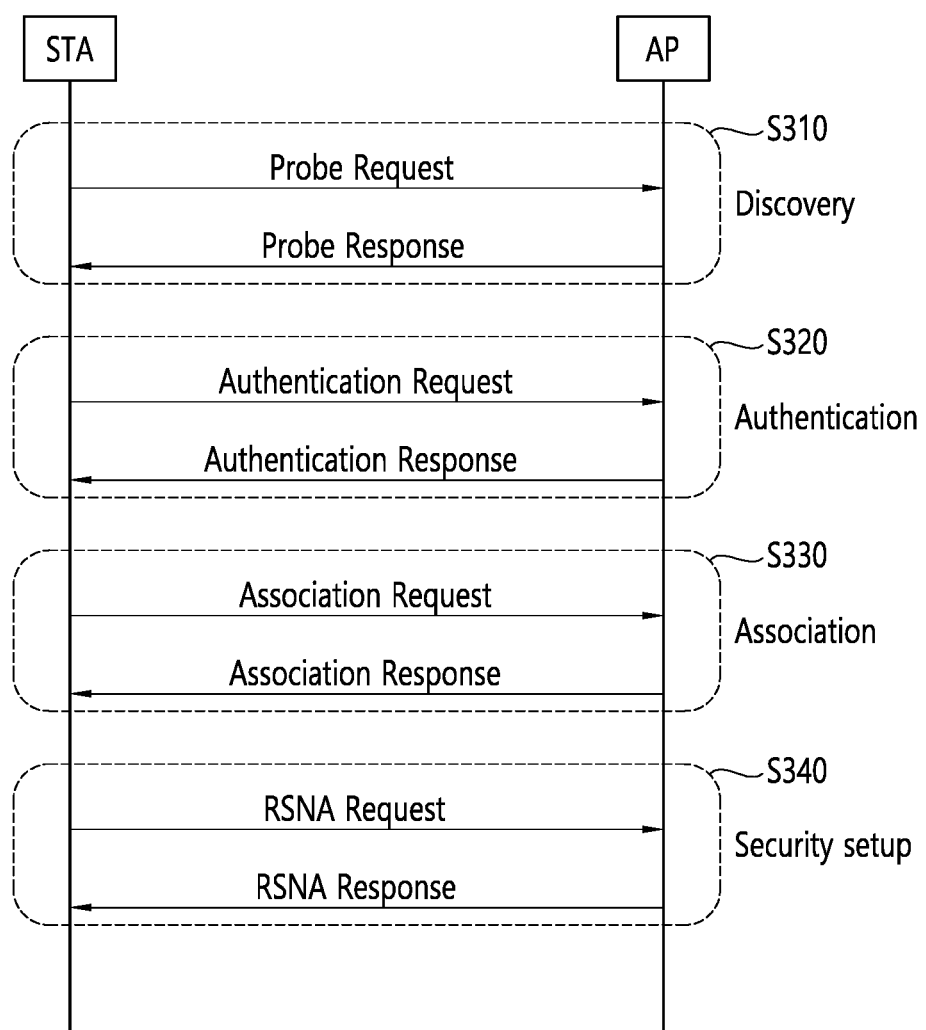
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
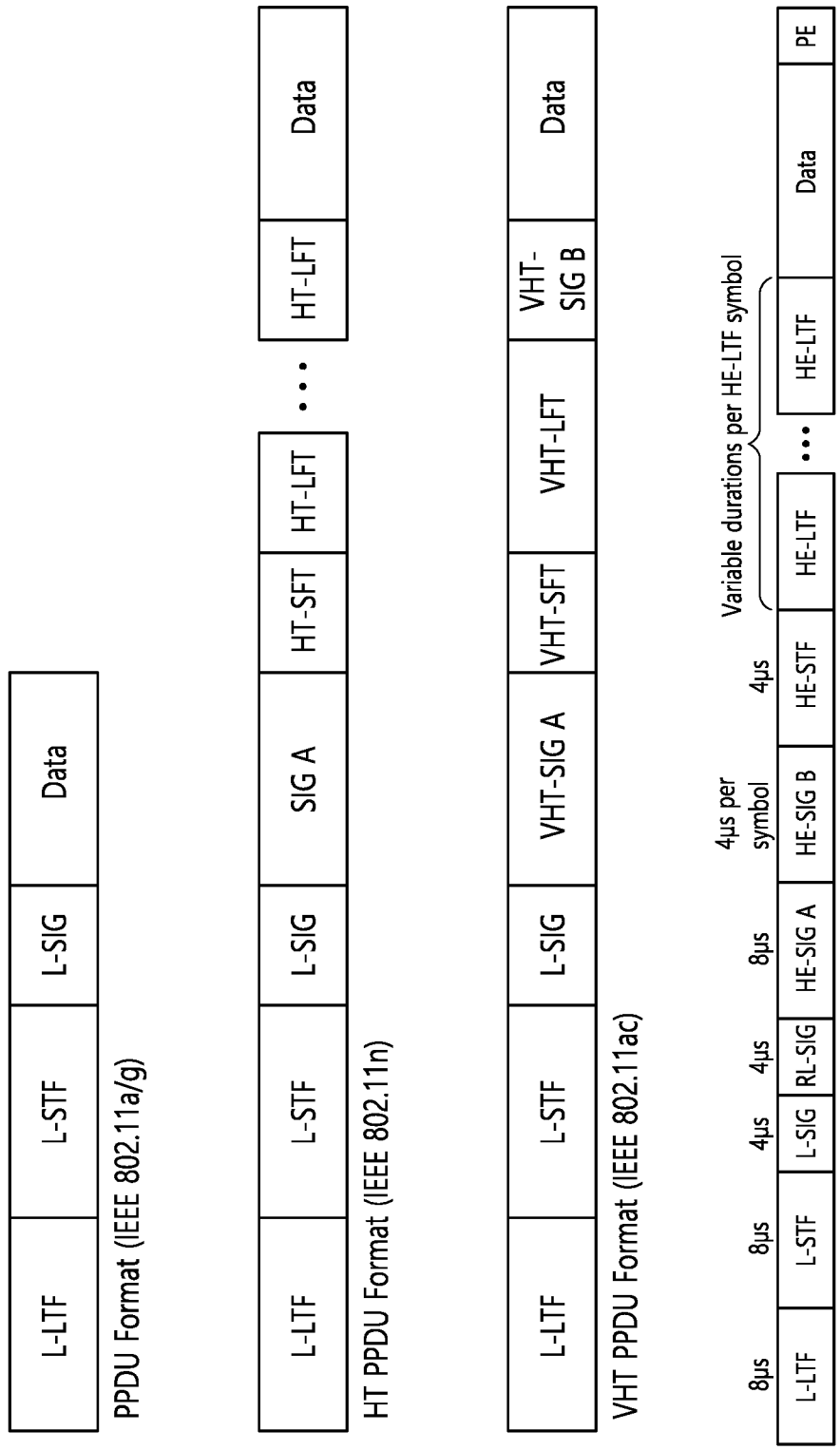
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
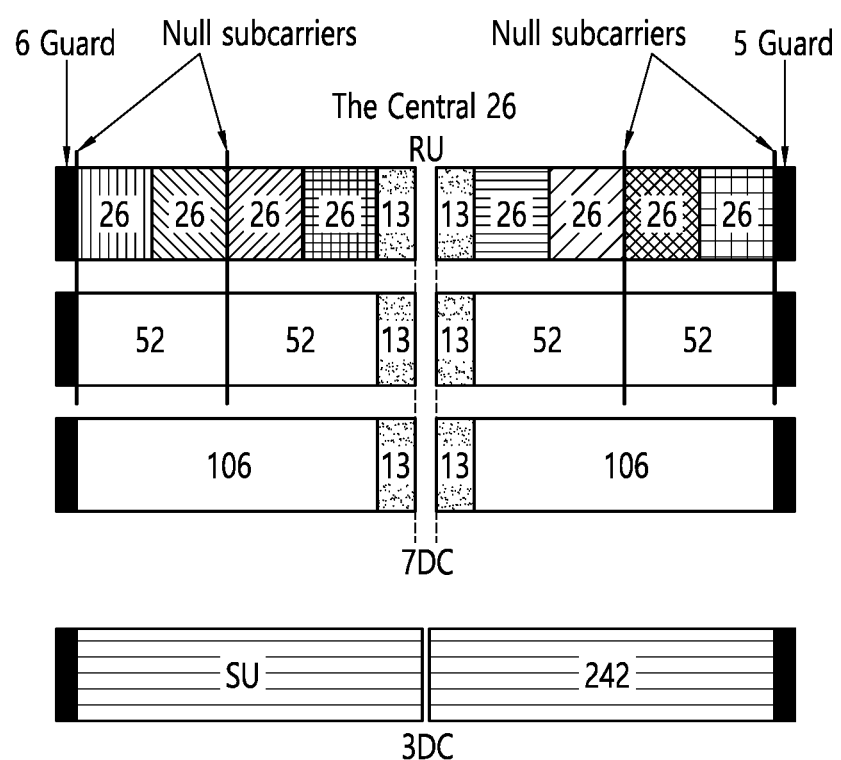
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
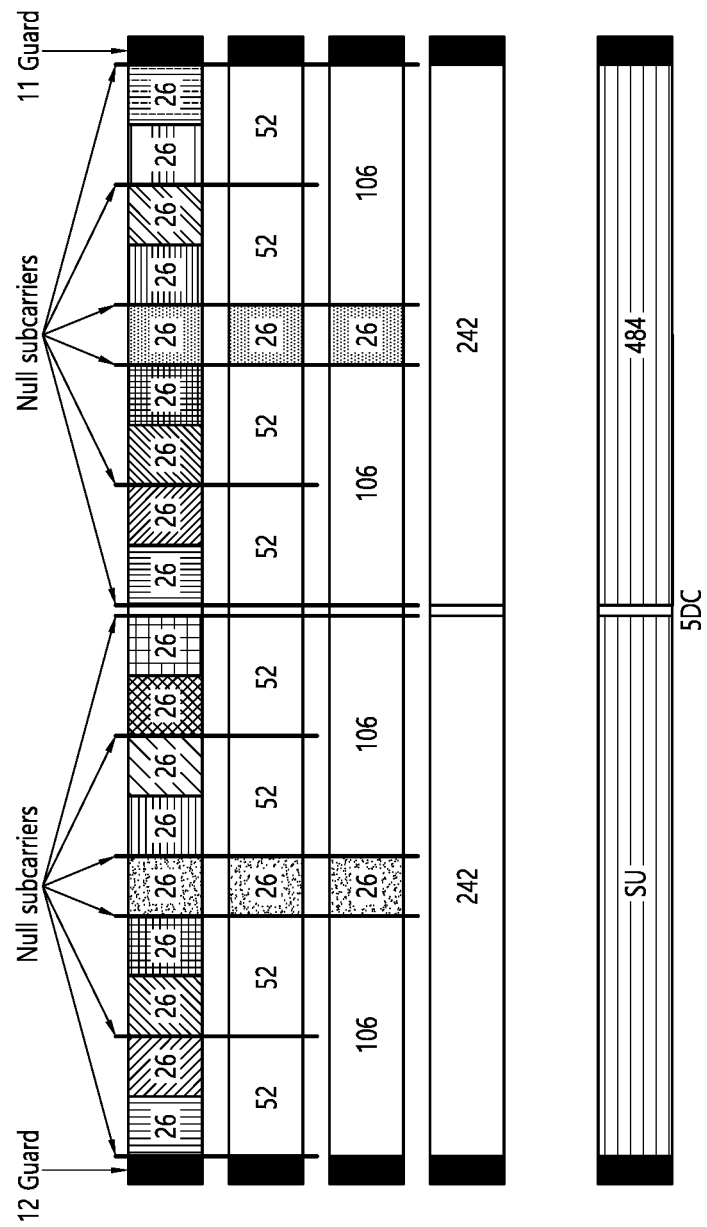
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
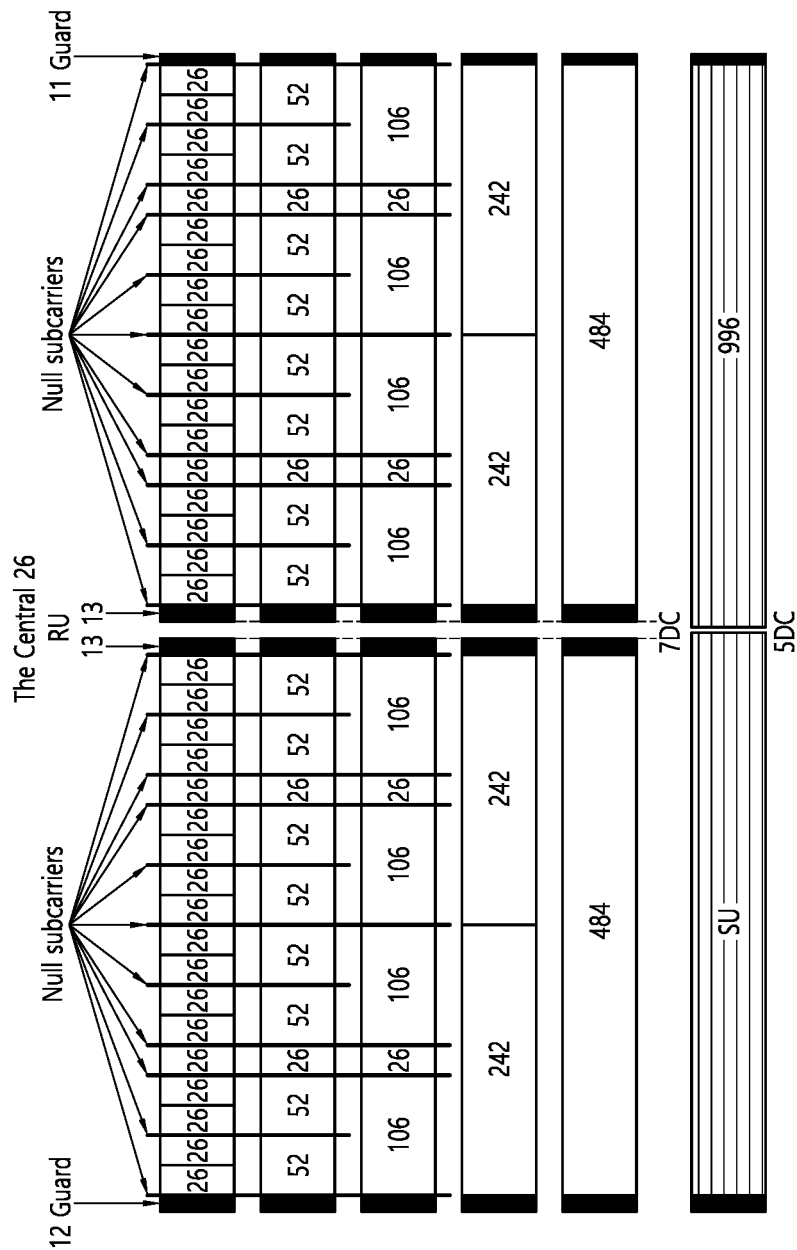
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
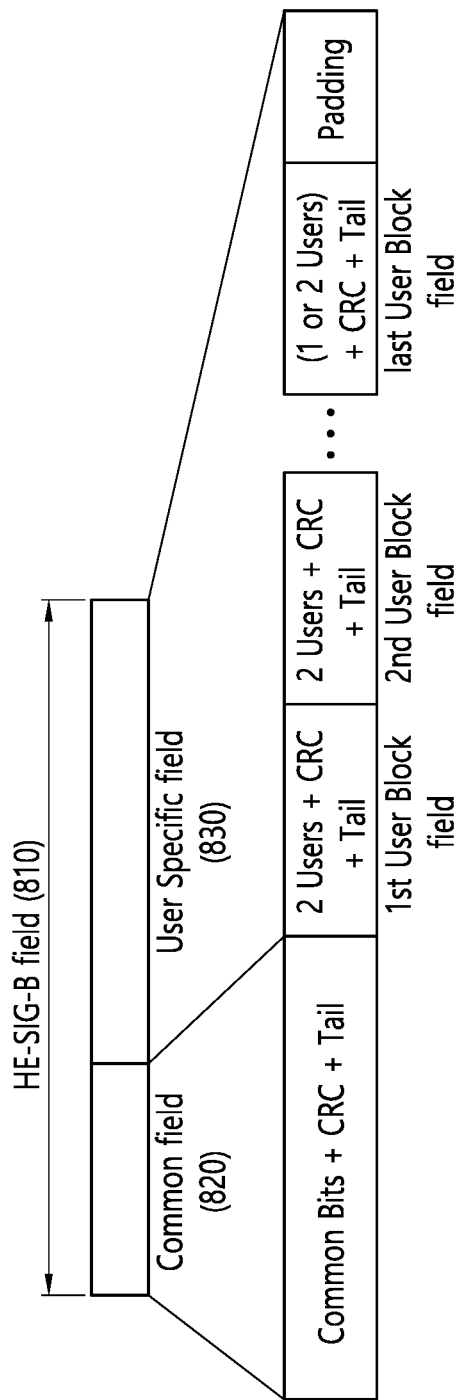
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 20 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | 26 | 26 | 26 | 26 | 26 | | | 8 |
| 01001$y_2y_1y_0$ | 106 | | 26 | 26 | 26 | 52 | | | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
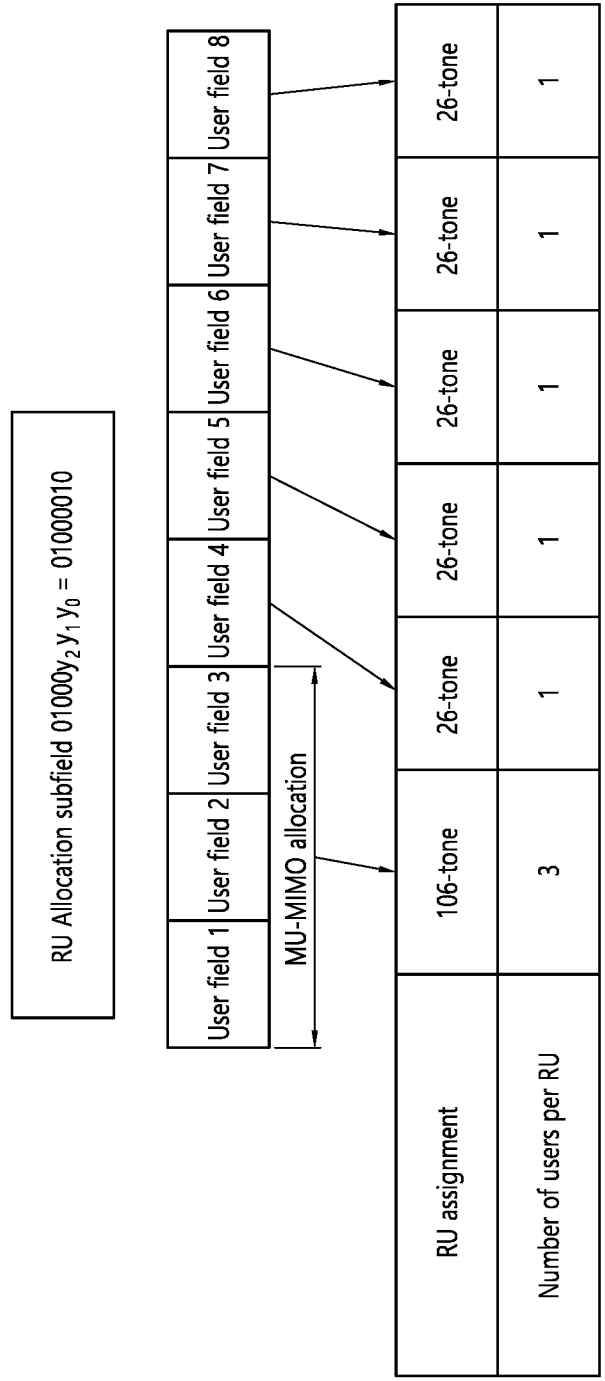
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |

TABLE 3-continued

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100      | 3   | 3 | 2 | | | | | | 8   | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111      | 3   | 3 | 1 | 1 | | | | | 8   | |
|   | 1000-1001 | 1-3 | 2 | 2 | 1 | | | | | 7-8 | |
|   | 1010      | 2   | 2 | 2 | 2 | | | | | 8   | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0110 | 2-3 | 2 | 1 | 1 | 1 | | | | 7-8 | |
|   | 10110     | 2   | 2 | 2 | 1 | 1 | | | | 8   | |
| 6 | 0000-0011 | 1-3 | 1 | 1 | 1 | 1 | 1 | | | 6-8 | 4 |
|   | 0011      | 2   | 2 | 1 | 1 | 1 | 1 | | | 8   | |
| 7 | 0000-0001 | 1-2 | 1 | 1 | 1 | 1 | 1 | 1 | | 7-8 | 2 |
| 8 | 0000      | 1   | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 2, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
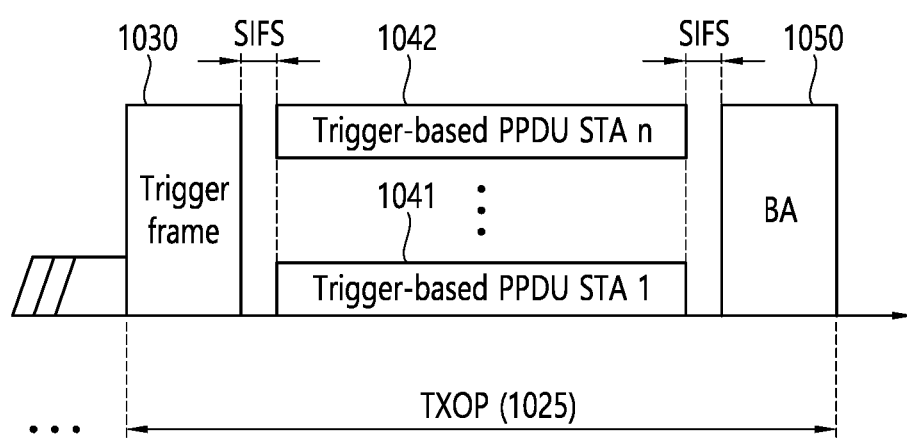
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame

1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
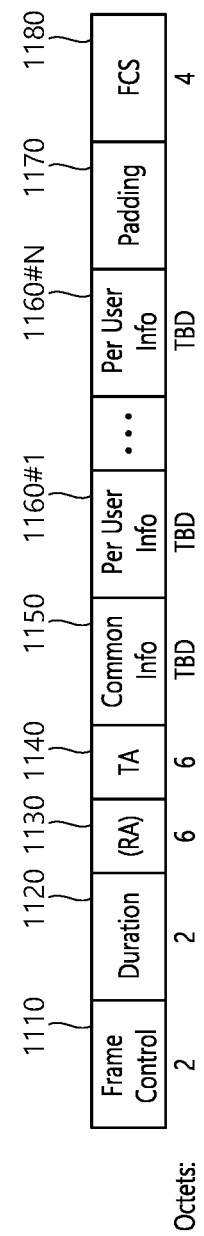
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
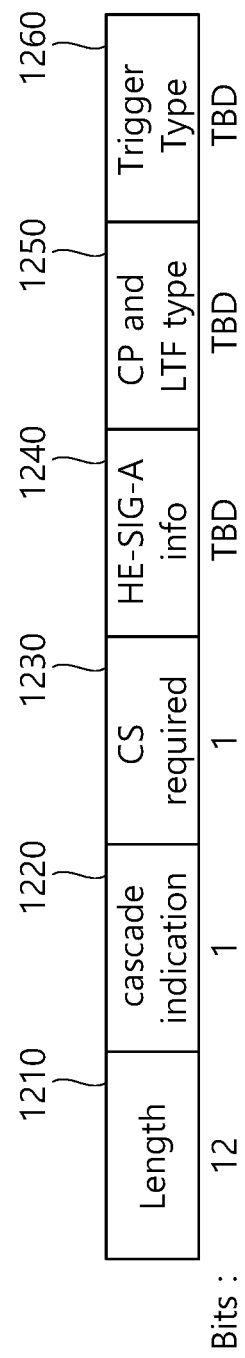
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
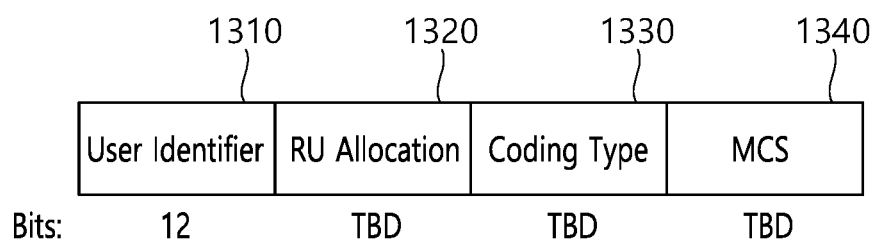
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
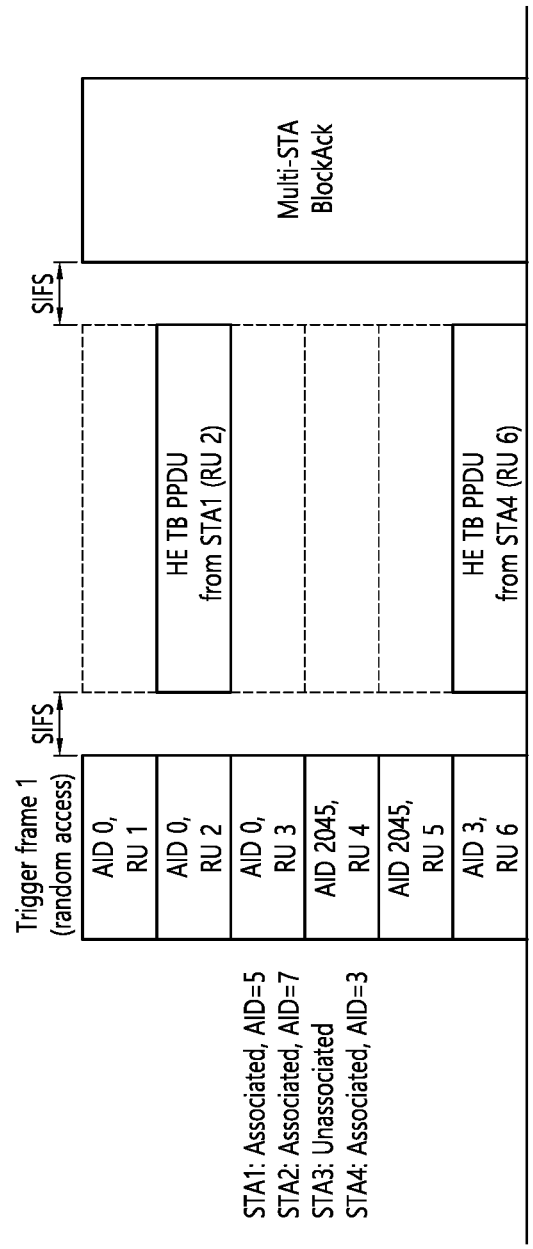
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
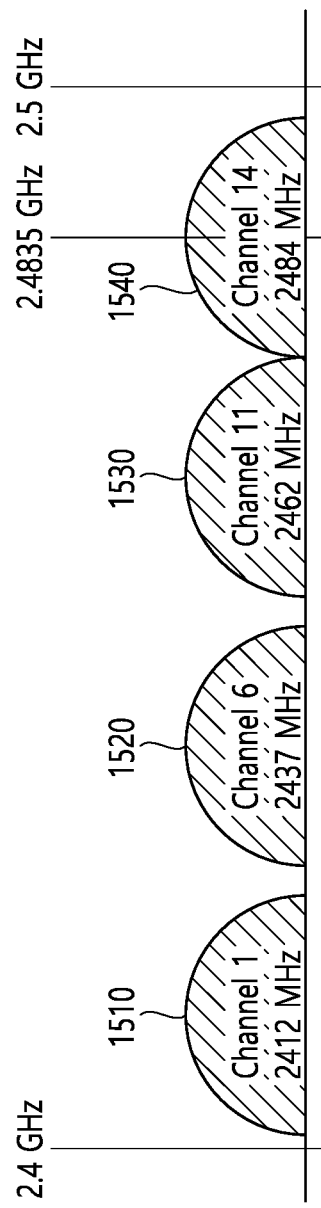
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
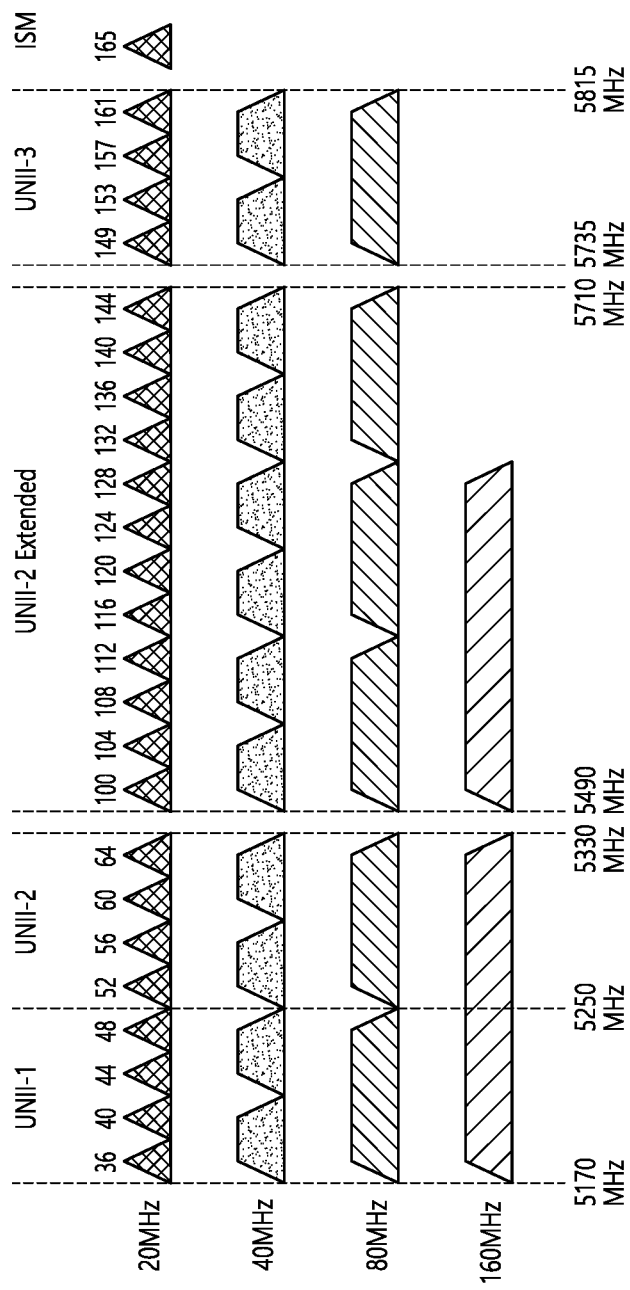
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNIT-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
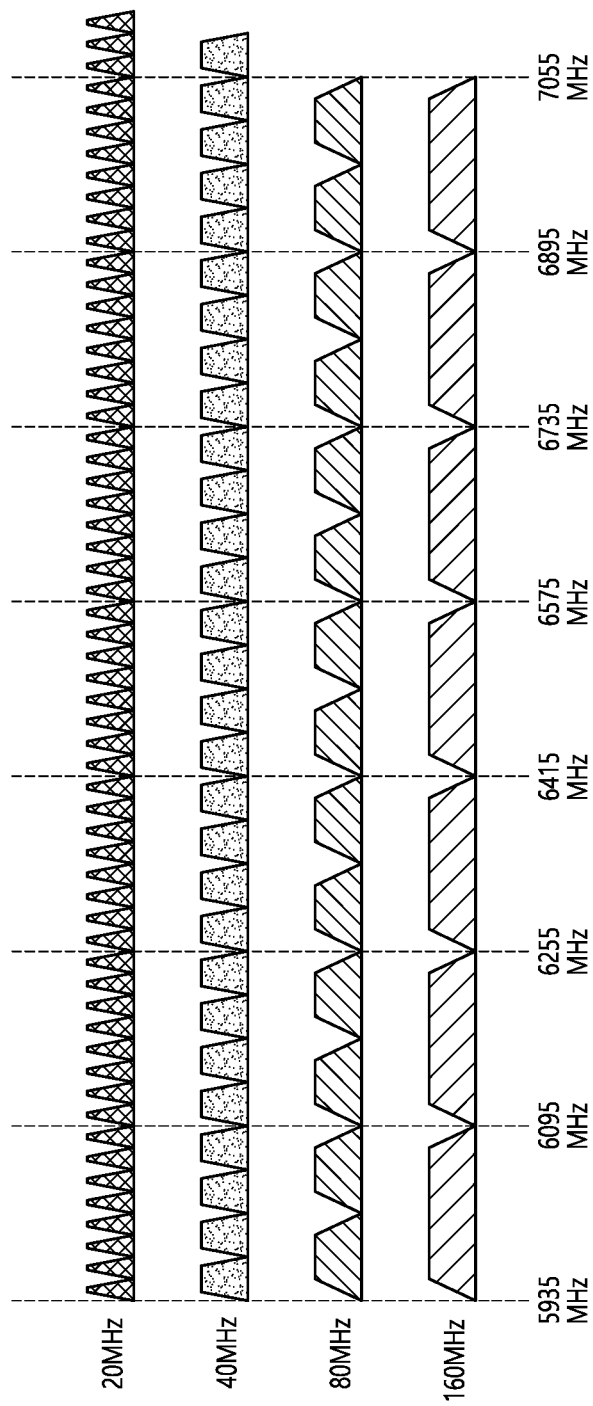
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may represent some or all of the PPDU types used in the EHT system. For example, the example of FIG. 18 may be used for both a single-user (SU) mode and a multi-user (MU) mode, or may be used only for the SU mode, or may be used only for the MU mode. For example, a trigger-based PPDU (TB) on the EHT system may be separately defined or configured based on the example of FIG. 18. The trigger frame described through at least one of FIGS. 10 to 14 and the UL-MU operation (e.g., the TB PPDU transmission operation) started by the trigger frame may be directly applied to the EHT system.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTF and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information related to whether a dual subcarrier modulation (DCM) scheme is applied to EHT-SIG; 4) a field including information related to the number of symbol used for EHT-SIG; 5) a field including information related to whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include the technical feature of the HE-SIG-B shown in the examples of FIGS. 8 to 9 as it is. The EHT-SIG may be referred to by various names such as a second SIG field, a second SIG, a second type SIG, a control signal, a control signal field, and a second (type) control signal.

The EHT-SIG may include N-bit information (e.g., 1-bit information) regarding whether the EHT-PPDU supports the SU mode or the MU mode.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8

μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \qquad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112:16:112)=\{M\}*(1+j)/\text{sqrt}(2) \qquad \text{<Equation 2>}$$

EHT-STF(0)=0

The EHT-STF for the 40 MHz PPDU may be configured based on the following equation. The following example may be the first type (i.e., 1×STF) sequence.

$$\text{EHT-STF}(-240:16:240)=\{M,0,-M\}*(1+j)/\text{sqrt}(2) \qquad \text{<Equation 3>}$$

The EHT-STF for the 80 MHz PPDU may be configured based on the following equation. The following example may be the first type (i.e., 1×STF) sequence.

$$\text{EHT-STF}(-496:16:496)=\{M,1,-M,0,-M,1,-M\}*(1+j)/\text{sqrt}(2) \qquad \text{<Equation 4>}$$

The EHT-STF for the 160 MHz PPDU may be configured based on the following equation. The following example may be the first type (i.e., 1×STF) sequence.

$$\text{EHT-STF}(-1008:16:1008)=\{M,1,-M,0,-M,1,-M,0,-M,-1,M,0,-M,1,-M\}*(1+j)/\text{sqrt}(2) \qquad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496:16:496)=\{-M,-1,M,0,-M,1,-M\}*(1+j)/\text{sqrt}(2) \qquad \text{<Equation 6>}$$

Equation 7 to Equation 11 below relate to an example of a second type (i.e., 2×STF) sequence.

$$\text{EHT-STF}(-120:8:120)=\{M,0,-M\}*(1+j)/\text{sqrt}(2) \qquad \text{<Equation 7>}$$

The EHT-STF for the 40 MHz PPDU may be configured based on the following equation.

$$\text{EHT-STF}(-248:8:248)=\{M,-1,-M,0,M,-1,M\}*(1+j)/\text{sqrt}(2) \qquad \text{<Equation 8>}$$

EHT-STF(−248)=0

EHT-STF(248)=0

The EHT-STF for the 80 MHz PPDU may be configured based on the following equation.

$$\text{EHT-STF}(-504:8:504)=\{M,-1,M,-1,-M,-1,M,0,-M,1,M,1,-M,1,-M\}*(1+j)/\text{sqrt}(2) \qquad \text{<Equation 9>}$$

The EHT-STF for the 160 MHz PPDU may be configured based on the following equation.

$$\text{EHT-STF}(-1016:16:1016)=\{M,-1,M,-1,-M,-1,M,0,-M,1,M,1,-M,1,-M,0,-M,1,-M,1,-M,1,-M,0,-M,1,M,1,-M,1,-M\}*(1+j)/\text{sqrt}(2) \qquad \text{<Equation 10>}$$

EHT-STF(−8)=0,EHT-STF(8)=0,

EHT-STF(−1016)=0,EHT-STF(1016)=0

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504:8:504)=\{-M,1,-M,1,M,1,-M,0,-M,1,M,1,-M,1,-M\}*(1+j)/\text{sqrt}(2) \qquad \text{<Equation 11>}$$

EHT-STF(−504)=0,

EHT-STF(504)=0

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frames, the management frame, and the data frame.

Figure 19:
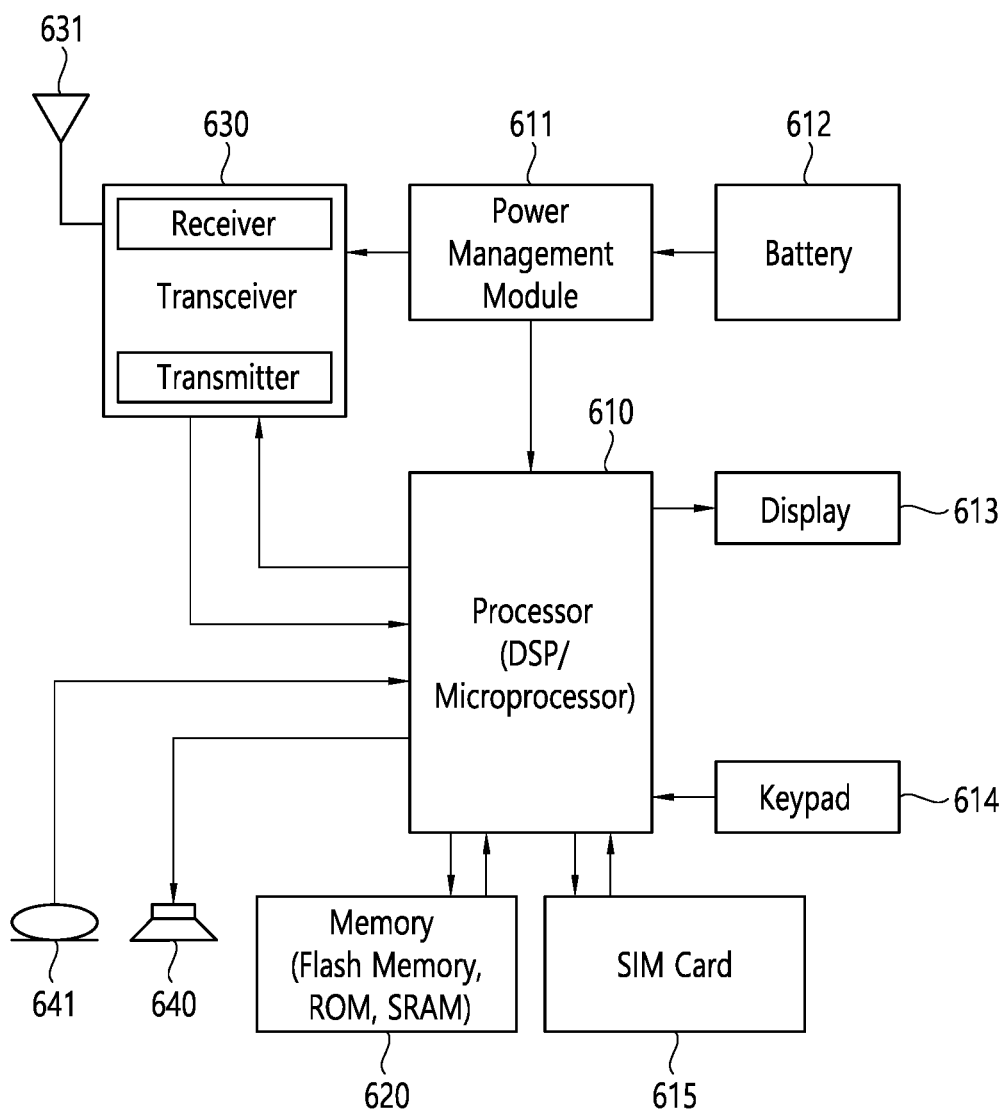
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
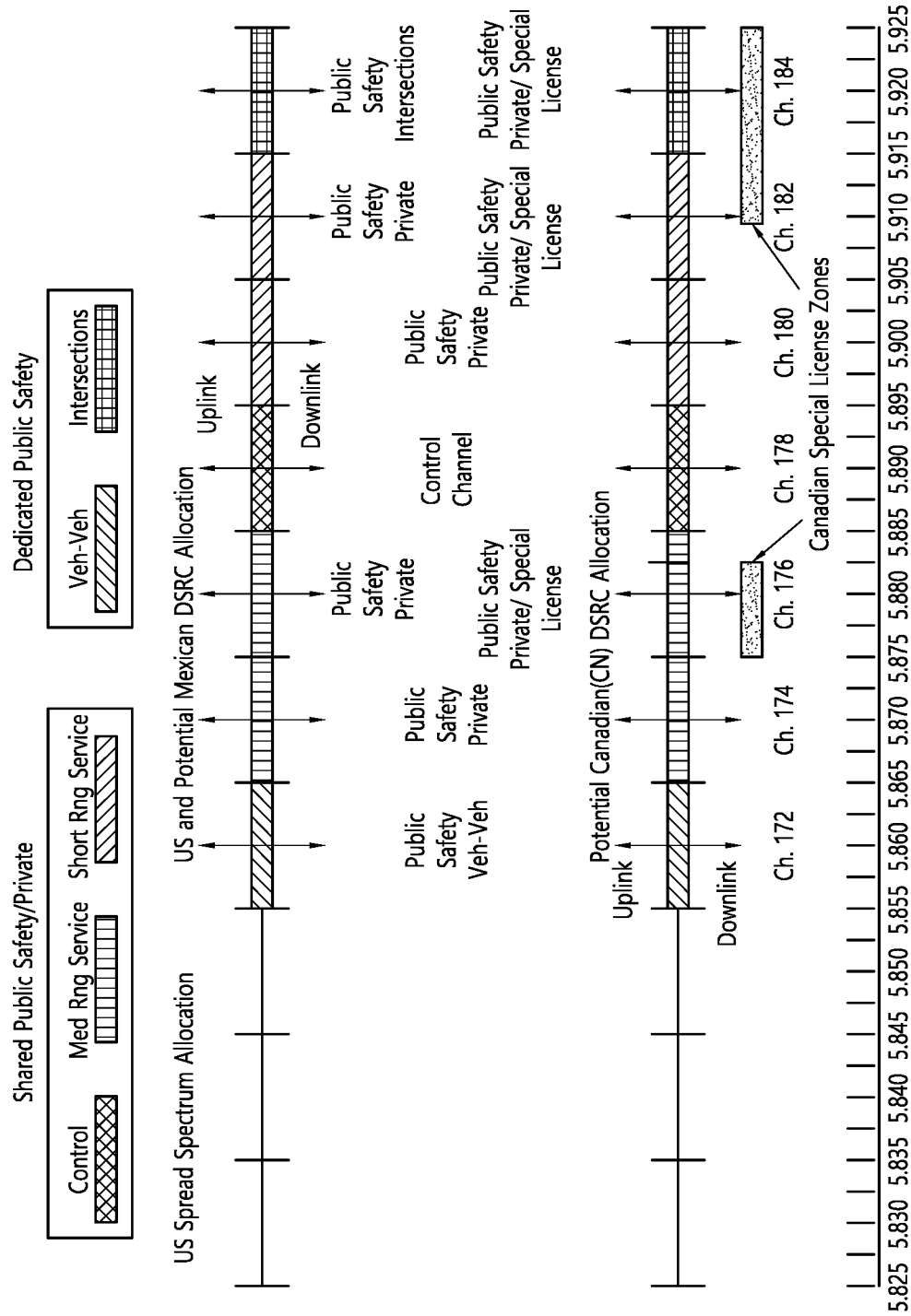
FIG. 20 shows a band plan of 5.9 GHz DSRC.

FIG. 20 shows a band plan of 5.9 GHz DSRC.

5.9 GHz DSRC is a short to medium range communications service that supports both public safety and private operations in roadside-to-vehicle and vehicle-to-vehicle communication environments. DSRC is devised as a complement to cellular communications by providing very high data transfer rates in situations where minimizing latency in the communication link and isolating relatively small communication zones are important. Additionally, PHY and MAC protocols are based on the revision of IEEE 802.11p for wireless access in a vehicular environment (WAVE).

<IEEE 802.11p>

802.11p uses a PHY of 802.11a by performing 2× downclocking on the PHY. That is, 802.11p transmits a signal by using a 10 MHz bandwidth and not a 20 MHz bandwidth. The numerology comparing 802.11a to 802.11p is as follows.

TABLE 5

|  | IEEE 802.11a | IEEE 802.11p |
| --- | --- | --- |
| Symbol duration | 4 us | 8 us |
| Guard period | 0.8 us | 1.6 us |
| Subcarrier spacing | 312.5 KHz | 156.25 KHz |
| OFDM subcarrier | 52 | 52 |
| Number of pilot | 4 | 4 |
| Default BW | 20 MHz | 10 MHz |
| Data rate (Mbps) | 6, 9,12,18, 24, 36, 48, 54 MbpS | 3, 4, 5, 6, 9, 12, 18, 24, 27 Mbps |
| Frequency band | 56 Hz ISM | 5.9 GHz dedicated |

Channels of a DSRC band include a control channel and a service channel, and each channel is capable of performing data transmission at 3, 4.5, 6, 9, 12, 18, 24, and 27 Mbps. If an option channel (or optional channel) of 20 MHz exists, transmission at 6, 9, 12, 18, 24, 36, 48, and 54 Mbps may be performed. 6, 9, and 12 Mbps should be supported in all services and channels. And, in case of a control channel, although a preamble is 3 Mbps, the message itself is 6 Mbps. In case channels 174 and 176 and channels 180 and 182 are authorized by a frequency regulation organization, the channel sets may be channels 175 and 181 of 20 MHz, respectively. The remaining channel should be reserved for future usage. A short message or notification data, public safety alarm data, and so on, are broadcasted to all On Board Units (OBUs) through the control channel. The control channel and the service channel have been isolated in order to maximize efficiency and quality of service and to reduce interference between services.

Channel number 178 is a control channel, which automatically performs search and receives notification or data transmission, warning messages, and so on, from a Road Side Unit (RSU). All data of the control channel should be transmitted within 200 ms and is repeated at a pre-defined cycle. In a control channel, public safety warnings have the highest priority over any other private messages. Private messages that are larger than 200 ms are transmitted through a service channel.

Private messages or long public safety messages, and so on, are transmitted through a service channel. In order to prevent collision (or conflict), a scheme for detecting channel status (i.e., Carrier Sense Multiple Access (CSMA)) is used prior to the transmission.

Hereinafter, EDCA parameters in an Outside Context of BSS (OCB) mode will be defined. An OCB mode denotes a state where direct communication between nodes can be performed without any procedure of association with an AP. The following shows a basic EDCA parameter set for STA operations, in case dot11OCBActivated is true.

TABLE 6

| AC | CWmin | CWmax | AIFSN | TX OP limit |
|---|---|---|---|---|
| AC_BK | aCWmin | aCWmax | 9 | 0 |
| AC_BE | aCWmax | aCWmax | 6 | 0 |
| AC_VI | (aCWmin + 1)/2 − 1 | aCWmin | 3 | 0 |
| AC_VO | (aCWmin + 1)/4 − 1 | (aCWmin + 1)/2 − 1 | 2 | 0 |

Characteristics of the OCB mode are as follows.
1. In a MAC header, To/From DS fields may be set to '0'.
2. Fields related to Address
   Individual or group destination MAC address may be used.
   A BSSID field may be the same as a wildcard BSSID. (BSSID field=wildcard BSSID)
   In a Data/Management frame, Address 1 may be an RA, Address 2 may be a TA, and Address 3 may be a wildcard BSSID.
3. An authentication process, an association process, or data confidentiality services of the IEEE 802.11 standard may not be used (or utilized).
4. A TXOP limit may be set to '0'.
5. Only a TC (TID) may be used.
6. STAs may not be required to synchronize to a common clock or use such mechanisms.
   STAs may maintain a timing synchronization function (TSF) timer for purposes other than synchronization
7. The STA may send Action frames, and, if the STA maintains a TSF Timer, the STA may transmit Timing Advertisement frames.
8. The STA may send control frames excluding subtype PS-Poll, CF-End, and CF-End+CFAck.
9. The STA may send data frames of subtype Data, Null, QoS Data, and QoS Null.
10. An STA having dot11OCBActivated that is equal to true should not join (or participate in) or start a BSS.

Format of 11p PPDU

Figure 21:
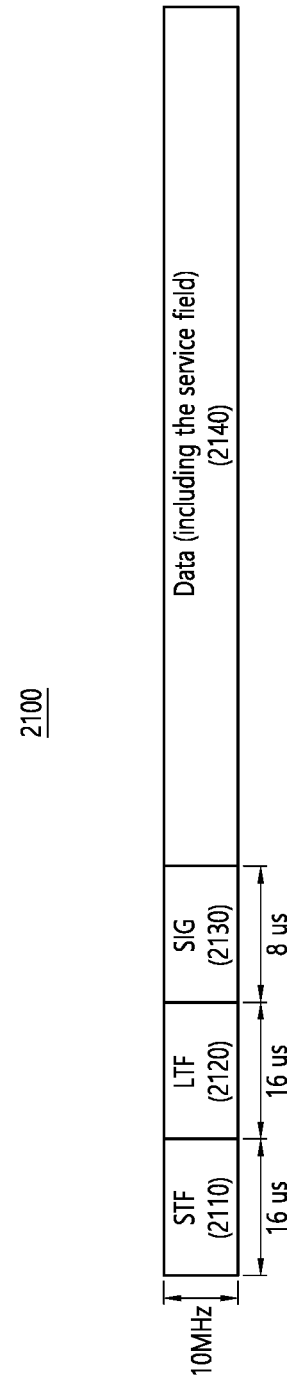
FIG. 21 shows a format of an 11p PPDU.

FIG. 21 shows a format of an 11p PPDU.

Referring to FIG. 21, a frame of the 802.11p standard (hereinafter referred to as 11p PPDU 2100) may support vehicle-to-vehicle (V2V) communication in a 5.9 GHz band. The 11p PPDU 2100 may include an STF 2110 for synchronization (sync) and Automatic Gain Control AGC, an LTF 2120 for channel estimation, and/or a SIG (or SIG field) 2130 including information related to a Data field 2140. The Data field 2140 may be configured to include 16 bits configuring the service field.

The 11p PPDU 2100 may be configured by applying the same OFDM numerology as the IEEE 802.11a standard for a 10 MHz bandwidth. For example, the IEEE 802.11p standard may be applied by 2× down-clocking the OFDM numerology for a 20 MHz bandwidth according to the IEEE 802.11a standard. Therefore, a symbol of the 11p PPDU 2100 may be configured to be longer than a symbol of a frame (or PPDU) of the IEEE 802.11a standard. A symbol of the 11p PPDU 2100 may have a symbol duration of 8 μs. The 11p PPDU 2100 may have a length that is two times longer than a frame according to the 802.11a standard in the aspect of time.

Format of NGV PPDU

Hereinafter, a technical characteristic that can provide interoperability of multiple system will be proposed. For example, multiple systems may include a system (IEEE 802.11bd standard) that is proposed for supporting throughput enhancement, coverage extension, and/or high speed for Vehicle-to-Everything (V2X) in a 5.9 GHz band, and/or a DSRC system that is based on the existing (or conventional) IEEE 802.11p standard.

In order to achieve smooth V2X support in a 5.9 GHz band, a technology for NGV considering throughput enhancement and high-speed support in the DSRC is being developed. FIG. 22 to FIG. 25 show the format of a frame (hereinafter referred to as NGV PPDU) according to the IEEE 802.11bd standard.

The NGV PPDU described below may include a preamble, a data field contiguous to the preamble, and a midamble contiguous to the data field. In addition, the NGV PPDU may include an additional data field contiguous to the midamble. The number or period of symbols of the midamble in the NGV PPDU may be set in various ways. For example, the preamble of the NGV PPDU may include L-STF, L-LTF, L-SIG, RL-SIG, NGV-SIG, RNGV-SIG, NGV-STF, and/or NGV-LTF. The NGV midamble may be configured in the same format as the NGV-LTF. The aforementioned L-SIG, RL-SIG, NGV-SIG, and/or RNGV-SIG may be referred to as an L-SIG field, an RL-SIG field, an NGV-SIG field, and/or an RNGV-SIG field, respectively.

According to an embodiment, the NGV part (for example, NGV-STF, NGV-LTF, and NGV-data) may consist of symbols having the same symbol length as the 11p PPDU. For example, one symbol length (or duration) of the NGV part may be set to 8 μs. That is, the subcarrier spacing of the NGV part may be set to 156.25 kHz.

Figure 22:
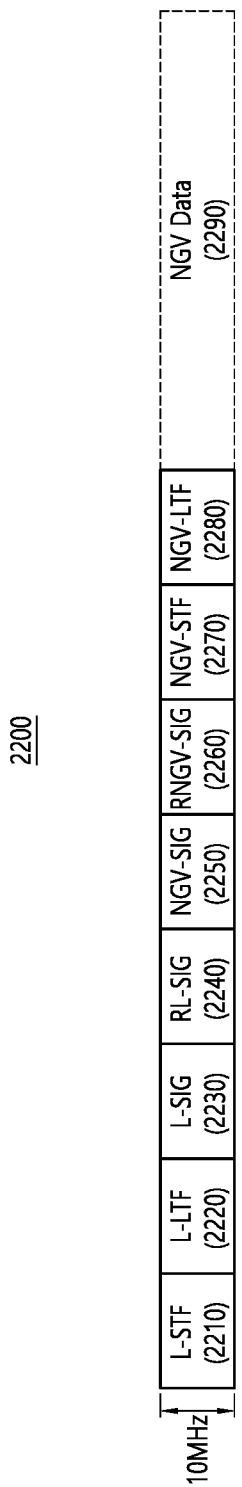
FIG. 22 shows the format of an NGV PPDU for 10 MHz transmissions.

FIG. 22 shows the format of an NGV PPDU for 10 MHz transmissions.

Referring to FIG. 22, for backward compatibility or interoperability with the IEEE 802.11p standard, the NGV PPDU 2200 may include fields (that is, L-STF, L-LTF, and/or L-SIG) of a frame (hereinafter, 11p PPDU) according to the IEEE 802.11p standard. For example, the NGV PPDU 2200 may include an L-STF 2210, an L-LTF 2220, or an L-SIG 2230. Additionally, the NGV PPDU may include an RL-SIG 2240, an NGV-SIG 2250, an RNGV-SIG 2260, an NGV-STF 2270, an NGV-LTF 2280, and/or an NGV Data 2290.

The RL-SIG 2240 may be contiguous to the L-SIG 2230. The RL-SIG 2240 may be a field in which the L-SIG 2230 is repeated. In other words, the RL-SIG 2240 may include the same information fields as the L-SIG 2230 and may be modulated in the same manner (for example, BPSK) as the L-SIG 2230.

The NGV-SIG 2250 may be related to transmission information. For example, the NGV-SIG 2250 may include transmission information. For example, the NGV-SIG 2250 may be set to 24 bits. For example, the NGV-SIG 2250 may include information on a Physical Layer (PHY) Version, information on a bandwidth, information on an MCS, information on the number of spatial streams, information on a midamble periodicity, information on an LTF format, information on an LDPC Extra OFDM Symbol, information on a CRC, and/or information on tail bits. BCC encoding based on a coding rate of 1/2 may be applied to the NGV-SIG 2250.

The RNGV-SIG 2260 may be contiguous to the NGV-SIG 2250. The RNGV-SIG 2260 may be a field in which the NGV-SIG 2250 is repeated. In other words, RNGV-SIG 2260 may include the same information fields as NGV-SIG 2250 and may be modulated in the same manner (for example, BPSK) as NGV-SIG 2250.

The NGV-STF 2270 may be configured by 2× downclocking a 20 MHz VHT-STF according to the IEEE 802.11ac standard. The NGV-LTF 2280 may be configured by 2× downclocking a 20 MHz VHT-LTF according to the IEEE 802.11ac standard.

The NGV-LTF 2280 may be set to at least one LTF format. For example, the NGV-LTF 2280 may be set to one of the NGV-LTF-1× format, the NGV-LTF-2× format, or the repeated NGV-LTF-2× format. Information on the LTF format used for the NGV-LTF 2280 may be included in the NGV-SIG 2250.

For example, the NGV-LTF-2× format may be set as a default format. For other example, the NGV-LTF-1× format may be used for high-efficiency transmission of one spatial stream. For another example, the repeated NGV-LTF-2× format may be used for extended range transmissions. The repeated NGV-LTF-2× format can be configured by repeating a symbol of the NGV-LTF-2× format excluding one pre-appended cyclic prefix (CP) and guard interval (GI) of 1.6 μs. The repeated NGV-LTF-2× format may be used when dual carrier modulation (DCM) and BPSK modulation are applied to the NGV data 2290. For example, when dual carrier modulation (DCM) and BPSK modulation are applied to the NGV data 2290, regardless of information about the LTF format included in the NGV-SIG 2250, the repeated NGV-LTF-2× format may be used/applied to the NGV-LTF 2280.

For example, in 10 MHz transmissions, a sequence of the NGV-LTF-1× format may be set as shown in Equation 12.

NVG-LTF-1×sequence=[1,0,1,0,−1,0,−1,0,1,0,1,0,1, 0,−1,0,1,0,1,0,1,0,1,0,1,0,0,0,−1,0,1,0,−1,0,−1, 0,−1,0,1,0,−1,0,−1,0,−1,0,1,0,1,0,−1]   <Equation 12>

For example, in 10 MHz transmissions, a sequence of the NGV-LTF-2× format may be set as in Equation 13.

NGV-LTF-2×sequence=[1,1,LTF_Left,0,LTF_right, −1,−1]   <Equation 13>

In Equation 13, LTF_left and LTF_right may be set as in Equation 14.

LFT_Left=[1,1,−1,−1,1,1,−1,1,−1,1,1,1,1,1,1,1,−1,−1,1, 1,−1,1,−1,1,1,1,1]   <Equation 14>

LFT_Right=[1,−1,−1,1,1,−1,1,−1,1,1,−1,−1,−1,−1,1,1, 1,−1,−1,1,−1,1,−1,1,1,1,1]

The NGV data 2290 may include a service field, PHY pad bits, and/or PSDU.

Although not shown, the NGV PPDU 2200 may include a midamble contiguous to the NGV data 2290. Also, the NGV PPDU 2200 may include an additional data field contiguous to the midamble.

The midamble may be used to perform additional channel estimation. That is, the midamble has an effect of reducing the effect of the Doppler shift.

The midamble may be inserted/configured in the NGV PPDU 2200 at a specified period. Information on the designated period may be included in the NGV-SIG 2250. For example, the NGV-SIG 2250 may include information on a midamble periodicity. The midamble periodicity may be set to one of 4, 8, or 16. For example, when the midamble periodicity is set to 4, the NGV PPDU 2200 may include a midamble for every 4 data symbols.

The midamble may be set in the same form (or format) as the NGV-LTF 2280. For example, the midamble may be set to one of an NGV-LTF-1× format, an NGV-LTF-2× format, or a repeated NGV-LTF-2× format. Information on the LTF format used for the midamble may be included in the NGV-SIG 2250.

Figure 23:
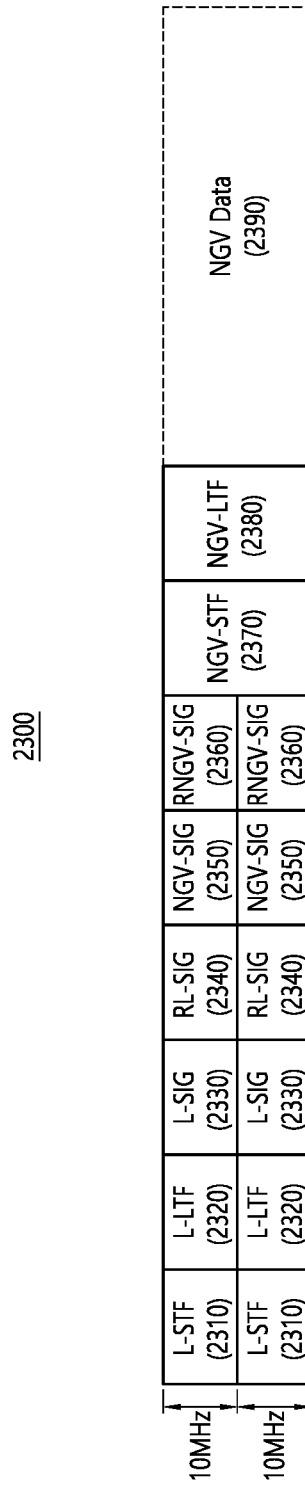
FIG. 23 shows a format of an NGV PPDU for 20 MHz transmissions.

FIG. 23 shows a format of an NGV PPDU for 20 MHz transmissions.

Referring to FIG. 23, the NGV PPDU 2300 may be configured at 20 MHz. The NGV PPDU 2300 may include L-STF 2310, L-LTF 2320, L-SIG 2330, RL-SIG 2340, NGV-SIG 2350, RNGV-SIG 2360, NGV-STF 2370, NGV-LTF 2380, and/or NGV Data 2390.

The L-STF 2310, the L-LTF 2320, or the L-SIG 2330 may be configured by being duplicated in units of 10 MHz. The L-STF 2310, the L-LTF 2320, or the L-SIG 2330 may be related to the L-STF 2210, the L-LTF 2220, or the L-SIG 2230 of FIG. 22.

According to an embodiment, the RL-SIG 2340, the NGV-SIG 2350, or the RNGV-SIG 2360 may also be configured to be duplicated in units of 10 MHz. RL-SIG 2340, NGV-SIG 2350, or RNGV-SIG 2360 may be related to RL-SIG 2240, NGV-SIG 2250, or RNGV-SIG 2260 of FIG. 22.

The NGV-STF 2370 may be configured by 2× downclocking the 40 MHz VHT-STF according to the IEEE 802.11ac standard. The NGV-LTF 2380 may be configured by 2× downclocking a 40 MHz VHT-LTF according to the IEEE 802.11ac standard.

The NGV-LTF 2380 may be set in at least one format. For example, the NGV-LTF 2380 may be set to one of the NGV-LTF-1× format, the NGV-LTF-2× format, or the repeated NGV-LTF-2× format.

For example, in 20 MHz transmissions, a sequence of the NGV-LTF-1× format may be set as in Equation 15.

NGV-LTF-1×sequence=[1,0,−1,0,1,0−1,0,−1,0,−1,0,1, 0,1,0,−1,0,1,0,1,0,1,0,1,0,−1,0,1,0,−1,0,−1, 0,−1,0,−1,0,1,0,−1,0,1,0,−1,0,1,0 1,0,1,0,1, 0,0,0,1,0,1,0,1,0,1,0,1,0,1,0,1,0,1,0,1,0,1,0,1, 0,1,0,1,0,1,0,1,0,−1,0,1,0,−1,0,−1,0,−1,0,−1, 0,1,0,−1,0,−1,0,−1,0,1,0,1]   <Equation 15>

For example, in 20 MHz transmissions, a sequence of the NGV-LTF-2× format may be set as shown in Equation 16.

NGV-LTF-2×sequence=[LTF_left,1,LTF_right,−1, −1,−1,1,0,0,0,−1,1,1,−1,LTF_left,1,LTF_right]   <Equation 16>

In Equation 16, LTF_left and LTF_right may refer to Equation 14.

The NGV data 2390 may include a service field, PHY pad bits, and/or PSDU. The NGV data 2390 may be related to the NGV data 2290 of FIG. 22.

Although not shown, similar to the NGV PPDU 2200 of FIG. 22, the NGV PPDU 2300 may include a midamble contiguous to the NGV data 2390. Also, the NGV PPDU 2300 may include an additional data field contiguous to the midamble.

Hereinafter, an example of the present specification relates to an NGV PPDU (or 11bd PPDU). The NGV PPDU may be used in various wireless communication systems, for example, in an IEEE 802.11bd wireless LAN system.

The NGV PPDU may be called by various names. For example, the NGV PPDU may be referred to as an NGV frame, an 11bd frame, an 11bd PPDU, an NGV signal, or the like. For another example, the NGV PPDU may be called by various names such as a first type PPDU, a transmission PPDU, a reception PPDU, a WLAN PPDU, or etc. Hereinafter, For the convenience of description, a frame of the IEEE 802.11bd standard may be referred to as an NGV PPDU. In addition, a PPDU according to the IEEE 802.11p standard may be referred to as an 11p PPDU.

Similarly, an STA supporting the IEEE 802.11bd standard may be referred to by various names. For example, an STA supporting the IEEE 802.11bd standard may be referred to as an 11bd STA, an NGV STA, a transmitting STA, or a receiving STA. Hereinafter, For the convenience of description, an STA supporting the IEEE 802.11bd standard may be referred to as an NGV STA. Specifically, the NGV STA that has received the frame may be referred to as a receiving STA, and the STA that has transmitted the frame may be referred to as a transmitting STA. In addition, an STA supporting the IEEE 802.11p standard may be referred to as an 11p STA. In addition, the 5.9 GHz band may be variously expressed as an NGV band, a reception band, a transmission band, and the like.

In the following specification, technical features related to the NGV PPDU format in which 11p PPDUs are repeatedly transmitted may be described. In Next Generation V2X Communication (NGV), an NGV PPDU format in which 11p PPDUs are repeatedly transmitted may be defined for OCB broadcasting. The interval between 11p PPDUs may be set to one of 0, 1 slot, SIFS, and PIFS, but may be not limited thereto. The interval between 11p PPDUs may be set in various ways.

Figure 24:
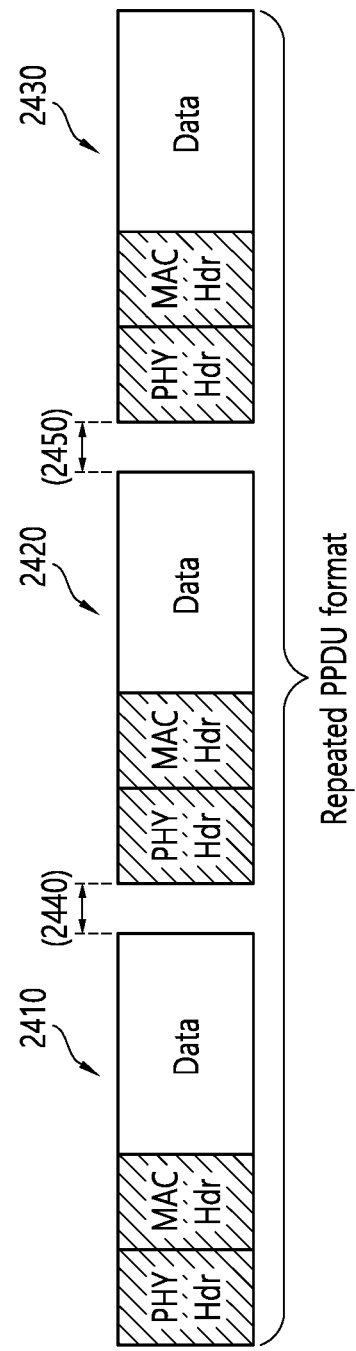
FIG. 24 is a diagram for explaining an example of a format in which an 11p PPDU is repeatedly transmitted.

FIG. 24 is a diagram for explaining an example of a format in which an 11p PPDU is repeatedly transmitted.

Referring to FIG. 24, a first PPDU 2410, a second PPDU 2420, and a third PPDU 2430 may be configured in a frame format of an 11p PPDU. That is, the first PPDU 2410, the second PPDU 2420, and the third PPDU 2430 may be related to the 11p PPDU 2100 shown in FIG. 21.

According to an embodiment, the first PPDU 2410, the second PPDU 2420, and the third PPDU 2430 may include the same data. The interval between the first PPDU 2410 and the second PPDU 2420 may be set as the first interval 2440. The interval between the second PPDU 2420 and the third PPDU 2430 may be set as the second interval 2450. The first interval 2440 and the second interval 2450 may be set in various ways. For example, the first interval 2440 and the second interval 2450 may be set to be the same. For example, the first interval 2440 and the second interval 2450 may be set to one of 0, 1 slot, SIFS, and PIFS.

A configuration in which the first PPDU 2410, the second PPDU 2420, and the third PPDU 2430 including the same data are continuously transmitted may be referred to as a repeated PPDU format. The repeated PPDU format may be transmitted from the NGV STA.

The NGV STA may repeatedly transmit/receive the same data. The NGV STA that has received the repeated PPDU format (that is, the receiving STA) may combine the first PPDU 2410, the second PPDU 2420, and the third PPDU 2430 set in the repeated PPDU format. Therefore, when the repeated PPDU format is transmitted/received, there is an effect of increasing the SNR.

The 11p STA may independently receive each 11p PPDU (for example, the first PPDU 2410, the second PPDU 2420, and the third PPDU 2430) as before. On the other hand, when transmitting the repeated PPDU format, the NGV STA must transmit information on whether the 11p PPDU is transmitted in the repeated PPDU format and how many times it is repeated. Accordingly, hereinafter, a technical feature of transmitting information on the repeated PPDU format may be proposed.

Contents that can be indicated for the Repeated PPDU format may be described below. The names of contents described below may be variously changed.

(1) Information on the Repeated PPDU Format: Information on the Repeated PPDU Format may mean information indicating whether the format of the PPDU is a repeated PPDU format.

(2) Information on the number of repeated PPDUs: Information on the number of repeated PPDUs may mean information on the number of repeated 11p PPDUs. Specifically, the information on the Number of repeated PPDUs may mean information about the number of repeated PPDUs remaining after the PPDU including the information.

(3) Information on Next PPDU Pointer: Information on Next PPDU Pointer may mean information on whether the same 11p PPDU exists after a predetermined interval. For example, the predetermined interval may be set in various ways. For example, the predetermined interval may include SIFS, PIFS, or 1 slot, but is not limited thereto.

According to an embodiment, the repeated PPDU format may be configured such that 11p PPDU is repeated. Therefore, the 11p STA should also be able to receive the PPDU in the repeated PPDU format. Therefore, when the 11p STA decodes the PPDU of the repeated PPDU format, information indicating the repeated PPDU format should be transmitted together to prevent a malfunction. In order to transmit information indicating the repeated PPDU format, contents that can indicate the above-described repeated PPDU format may be used.

(1) For example, in order to transmit information indicating that it is a repeated PPDU format, only information about the repeated format may be used.

(2) For example, in order to transmit information indicating that it is a repeated PPDU format, only information about the Next PPDU Pointer may be used.

(3) For example, in order to transmit information indicating that it is a repeated PPDU format, information on the repeated format and information on the number of repeated PPDUs may be used. For other example, in order to transmit information indicating that it is a repeated PPDU format, information on the repeated format and information on the Next PPDU Pointer may be used.

According to the example of (1) above, the number of repeated PPDUs should be negotiated or the number of repeated PPDUs should be predefined. According to the example of (2) described above, information regarding the existence of the next PPDU should be transmitted. Therefore, according to the example of (2), information on the repeated PPDU may be transmitted (or indicated) with the least overhead.

Hereinafter, in order to transmit information indicating the repeated PPDU format, an embodiment applicable when only information on the Next PPDU Pointer is used, an embodiment applicable when only information on the repeated format is used, and an embodiment applicable when information on the repeated format and information on the number of repeated PPDUs or Next PPDU Pointer are used may be sequentially described.

1. When Only Information about the Next PPDU Pointer is Used

According to an embodiment, only information about the Next PPDU Pointer may be used to transmit information indicating the repeated PPDU format. The NGV STA may receive information about the Next PPDU Pointer. For transmission of information on the Next PPDU Pointer, the Duration/ID field, Sequence Control, Retry field, or L-SIG field of the PHY header of the MAC header included in the conventional 11p PPDU may be used.

When information on the Next PPDU Pointer is transmitted, the repeated PPDU format may be indicated together. In other words, the NGV STA that has received the information on the Next PPDU Pointer may identify that the format of the received PPDU is a repeated PPDU format. For example, a field including information on Next PPDU Pointer may be called a repeated PPDU format (or Next PPDU pointer). The NGV STA may confirm that the received PPDU is in the repeated PPDU format and that the Next PPDU exists at the same time based on the field including the information on the Next PPDU Pointer.

As described above, information on the Next PPDU Pointer may be transmitted through the method. Hereinafter, embodiments in which information about the Next PPDU Pointer is transmitted may be described.

(1) The First Embodiment

According to the first embodiment, in order to transmit information on the Next PPDU Pointer, the Duration/ID field of the MAC header may be used.

By using two specific Duration values (here, the specific value includes 0) in the Duration/ID field, information on the Next PPDU Pointer may be indicated. For the convenience of description, the two duration values may be referred to as A and B values. For example, the A value may mean that the PPDU exists after a predetermined interval. The B value may mean that the PPDU does not exist after a certain interval. If there is only one 11p PPDU, the receiving STA may know that the transmitting STA is a STA with NGV standard (that is, an NGV STA) based on the B value.

According to an embodiment, the values of A and B may require various conditions. For example, an 11p STA that basically performs OCB broadcasting may set "0" in the Duration/ID field. Since the 11p STA transmits only one frame, there may be no problem even if the NGV STA receives it. Therefore, based on the A and B values, the NGV STA that has received the PPDU of the repeated PPDU format can confirm that the received PPDU was transmitted by the NGV STA.

However, when the value of the Duration/ID field is set to "0" or more as in the conventionally defined rule, the NGV STA may set the NAV based on the set value. However, in the repeated PPDU format, the value of the Duration/ID field should be set smaller than the interval between PPDUs in order to receive the next PPDU. For example, if the interval between PPDUs of the repeated PPDU format is SIFS (for example, 32 us in the 802.11p standard), the A and B values should be set smaller than the SIFS.

That is, when the interval between PPDUs of the repeated PPDU format is SIFS (for example, 32 us), the values of A and B that can be set in units of slots without exceeding the SIFS may be set as shown in Table 7. In Table 7, two values (that is, a value A when the next PPDU exists and a value B when the next PPDU does not exist) may be interchanged with each other, but is not limited thereto.

TABLE 7

| when the next PPDU does not exist | when the next PPDU does not exist |
|---|---|
| 2 slot (26 us) | 1.5 slot (18 us or 19 us) |
| 2 slot (26 us) | 1 slot (13 us) |
| 2 slot (26 us) | 0.5 slot (6 us or 7 us) |
| 2 slot (26 us ) | 0 slot (0 us, that is, conventional Broadcast 11 p PPDU) |
| 1.5 slot ( 18 us or 19 us) | 1 slot (13 us) |
| 1.5 slot (18 us or 19 us) | 0.5 slot (6 us or 7 us) |
| 1.5 slot (18 us or 19 us) | 0 slot (0 us, that is, conventional Broadcast 11 p PPDU) |
| 1 slot (13 us) | 0.5 slot (6 us or 7 us) |
| 1 slot (13 us) | 0 slot (0 us, that is, conventional Broadcast 11 p PPDU) |
| 0.5 slot (6 us or 7 us) | 0 slot (0 us, that is, conventional Broadcast 11 p PPDU) |

Referring to Table 7, the Duration/ID field of the MAC header may be set to one of two values. When the next PPDU exists, the value on the left in Table 7 may be used. When the next PPDU does not exist, the value on the right in Table 7 may be used.

Hereinafter, a specific example of the first embodiment may be described with reference to FIG. 25.

Figure 25:
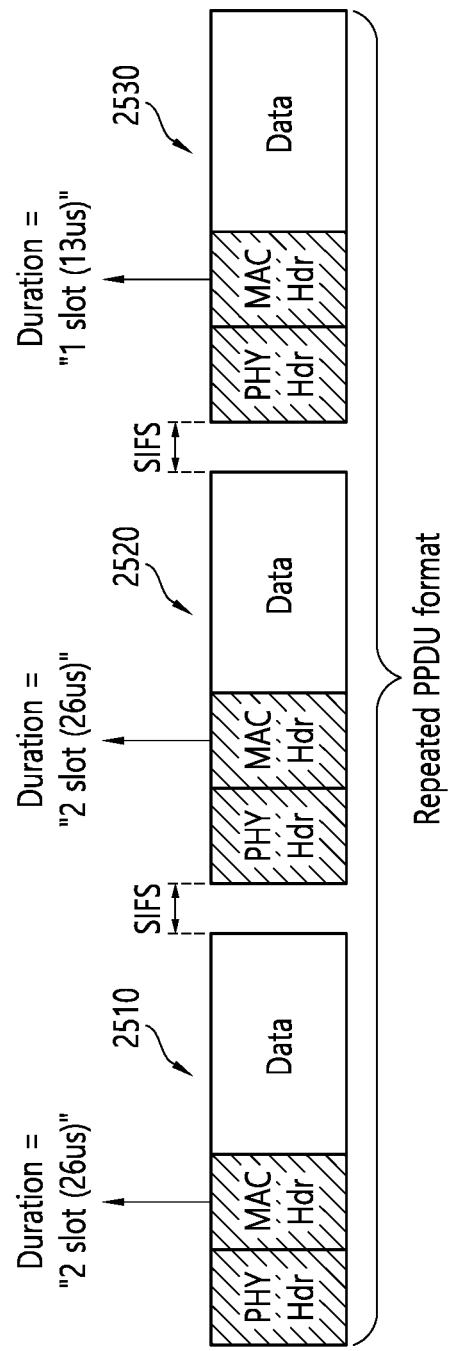
FIG. 25 shows an example in which information about the Next PPDU Pointer is transmitted based on the Duration/ID field.

FIG. 25 shows an example in which information about the Next PPDU Pointer is transmitted based on the Duration/ID field.

Referring to FIG. 25, a transmitting STA may transmit a first PPDU 2510, a second PPDU 2520, and a third PPDU 2530. The first PPDU 2510, the second PPDU 2520, and the third PPDU 2530 may be configured in an 11p PPDU format. The first PPDU 2510 to the third PPDU 2530 may include information about the Next PPDU Pointer. Information on the Next PPDU Pointer may be included in the Duration/ID field of the MAC header.

According to an embodiment, the Duration/ID field of the MAC header may be set to one of a value when a next PPDU exists (that is, A value) and a value when a next PPDU does not exist (that is, B value). For example, a value A may be set to a duration of 2 slots (for example, 26 us), a value B may be set to a duration of 1 slot (for example, 13 us), and an interval between PPDUs may be set to SIFS. In this case, since the A and B values are smaller than the SIFS, the 11p STA may not be affected.

When the receiving STA receives the first PPDU 2510, since the duration is indicated as 2 slots, the receiving STA may know that the second PPDU 2520 including the same data will be transmitted. Accordingly, the receiving STA may continue to receive the second PPDU 2520 after SIFS. Similarly, since the second PPDU 2520 also has a duration indicated as 2 slots, the receiving STA may receive the third PPDU 2530 also after SIFS. Since the last third PPDU 2530 indicates a duration of 1 slot, the receiving STA can know that the next PPDU after SIFS does not exist. Accordingly, the receiving STA may obtain a performance gain through combining the received PPDUs by using a total of three PPDUs including the same data (that is, the first PPDU 2510 to the third PPDU 2530).

FIG. 25 illustrates a case in which the value when the next PPDU exists (that is, A value) and the value when the next PPDU does not exist (that is, B value) are set to 2 slots and 1 slot, respectively, however, the present disclosure is not limited thereto, and the A value and the B value may be variously set.

(2) The Second Embodiment

According to the second embodiment, in order to transmit information on the Next PPDU Pointer, the Sequence Control field of the MAC header may be used.

According to the second embodiment, in order to transmit information on the Next PPDU Pointer, one specific sequence number or two sequence numbers may be used in the Sequence Control field. For example, when one sequence number is used, the sequence number may be called 'A'. For another example, when two sequence numbers are used, two sequence numbers may be referred to as 'A' and 'B', respectively.

When one sequence number is used in the Sequence Control field, 'A' may mean that the next PPDU exists after a predetermined interval. In addition, a sequence number other than 'A' may mean that the next PPDU does not exist after a predetermined interval.

When two sequence numbers are used in the Sequence Control field, 'A' may mean that the next PPDU exists after a predetermined interval. Also, 'B' may mean that the next PPDU does not exist after a predetermined interval. In this case, when only one 11p PPDU is transmitted, the receiving STA can confirm that the transmitting STA is a STA with NGV standard (that is, an NGV STA) based on the sequence number of the Sequence Control field being 'B'.

If sequence numbers other than 'A' are regarded as 'B', an embodiment in which one sequence number is used and an embodiment in which two sequence numbers are used in the sequence control field may be similar to each other.

Hereinafter, a specific example of the second embodiment may be described with reference to FIG. 26.

Figure 26:
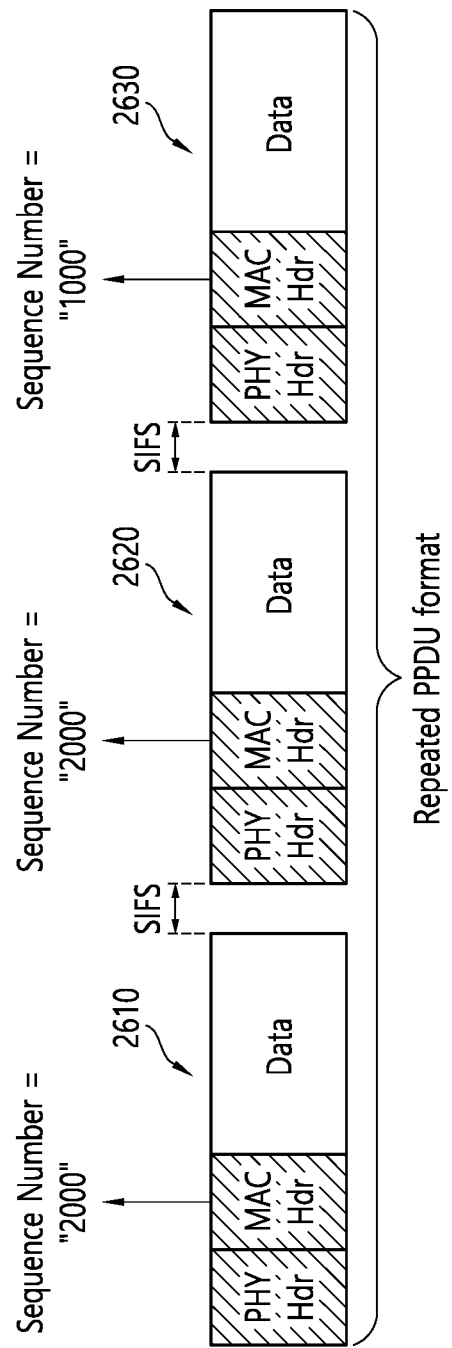
FIG. 26 shows an example in which information about the Next PPDU Pointer is transmitted based on the Sequence Control field.

FIG. 26 shows an example in which information about the Next PPDU Pointer is transmitted based on the Sequence Control field.

Referring to FIG. 26, a transmitting STA may transmit a first PPDU 2610, a second PPDU 2620, and a third PPDU 2630. The first PPDU 2610, the second PPDU 2620, and the third PPDU 2630 may be configured in an 11p PPDU format. The first PPDU 2610 to the third PPDU 2630 may include information about the Next PPDU Pointer. Information on the Next PPDU Pointer may be included in the Sequence Control field of the MAC header.

According to an embodiment, the Sequence Control field of the MAC header may be set to one of a sequence number when the next PPDU exists (that is, 'A') and a sequence number when the next PPDU does not exist (that is, 'B'). For example, 'A' may be set to "2000". 'B' may be set to "1000". The interval between PPDUs may be set to SIFS.

When the receiving STA receives the first PPDU 2610, since the sequence number (or sequence) is set to "2000", the receiving STA may know that the second PPDU 2620 including the same data will be transmitted. Accordingly, the receiving STA may continue to receive the second PPDU 2620 after SIFS. Similarly, since the sequence number of the second PPDU 2620 is also set to "2000", the receiving STA may also receive the third PPDU 2630 after SIFS. Since the sequence number is set to "1000" in the last third PPDU 2630, the receiving STA may know that the next PPDU does not exist after SIFS. Accordingly, the receiving STA may obtain a performance gain through combining the received PPDUs by using a total of the three PPDUs including the same data (that is, the first PPDU 2610 to the third PPDU 2630).

FIG. 26 illustrates a case in which the sequence number when the next PPDU exists (that is, 'A') and the sequence number when the next PPDU does not exist (that is, 'B') are set to "2000" and "1000", respectively. However, the present disclosure is not limited thereto, and 'A' and 'B' may be set in various ways.

(3) The Third Embodiment

According to the third embodiment, in order to transmit information on the Next PPDU Pointer, a Retry field (or Retry subfield) of the Frame Control field of the MAC header may be used.

The 11p STA may recognize a retransmission frame when the value of the Retry field is a first value (for example, "1"). Accordingly, in the repeated PPDU format, even if the value of the Retry field is set to a first value (for example, "1"), the 11p STA may decode the 11p PPDU of the repeated PPDU format.

Even if the 11p STA continuously receives PPDUs of the same data, it is recognized as an independent PPDU, and even if the Retry field is the first value (for example, "1"), it is only recognized as a PPDU having the same data, and a malfunction may not occur. In other words, when the Retry field (or Retry subfield) is used to transmit information about the Next PPDU Pointer, there is an effect that a malfunction does not occur even in the existing 11p STA.

According to the third embodiment, based on the value of the Retry field, the NGV STA may recognize the repeated PPDU format. For example, if the value of the Retry field is '1', it may mean that the next PPDU exists after a predetermined interval. For another example, if the value of the Retry field is '0', it may mean that the next PPDU does not exist after a predetermined interval.

Hereinafter, a specific example of the third embodiment may be described with reference to FIG. 27.

Figure 27:
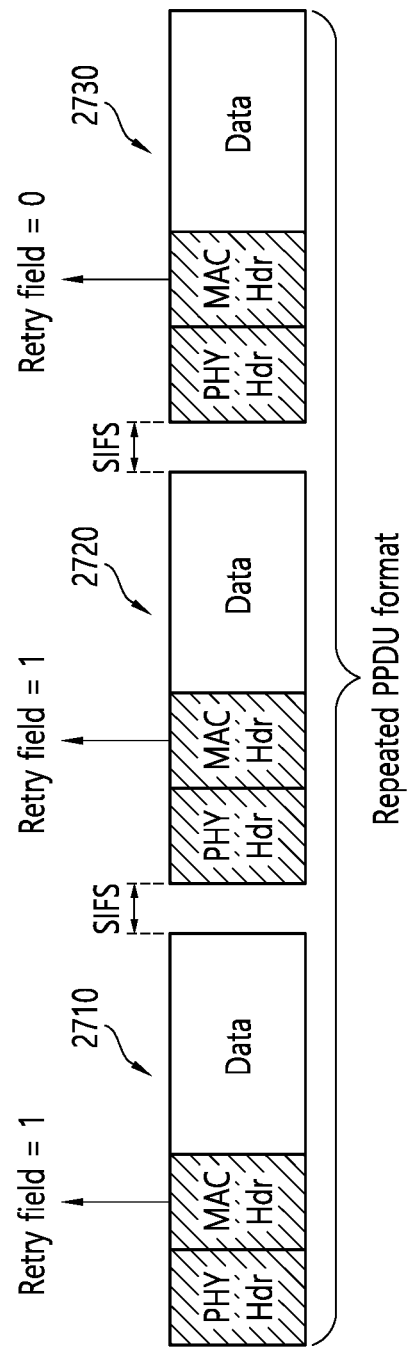
FIG. 27 shows an example in which information about the Next PPDU Pointer is transmitted based on the Retry field.

FIG. 27 shows an example in which information about the Next PPDU Pointer is transmitted based on the Retry field.

Referring to FIG. 27, a transmitting STA may transmit a first PPDU 2710, a second PPDU 2720, and a third PPDU 2730. The first PPDU 2710, the second PPDU 2720, and the third PPDU 2730 may be configured in an 11p PPDU format. The first PPDU 2710 to the third PPDU 2730 may include information about the Next PPDU Pointer. Information on the Next PPDU Pointer may be included in the Retry field of the Frame Control field included in the MAC header.

According to an embodiment, the Retry field may be set to a first value (for example, "1") when the next PPDU exists. The Retry field may be set to a second value (for example, "0") when the next PPDU does not exist When the receiving STA receives the first PPDU 2710, since the value of the Retry field is set to the first value (for example, "1"), the receiving STA can know that the second PPDU 2720 including the same data will be transmitted. Accordingly, the receiving STA may continue to receive the second PPDU 2720 after SIFS. Similarly, since the value of the Retry field of the second PPDU 2720 is also set to the first value (for example, "1"), the receiving STA may also receive the third PPDU 2730 after SIFS. Since the value of the Retry field in the last third PPDU 2730 is set to a second value (for example, "0"), the receiving STA can know that the next PPDU after SIFS does not exist. Accordingly, the receiving STA may obtain a performance gain through combining the received PPDUs by using a total of the three PPDUs including the same data (that is, the first PPDU 2710 to the third PPDU 2730).

FIG. 27 illustrates a case in which the value of the Retry field when the next PPDU exists and the value of the Retry field when the next PPDU does not exist are respectively set to "1" and "0". However, but the present specification is not limited thereto. According to an embodiment, the value of the Retry field when the next PPDU exists and the value of the Retry field when the next PPDU does not exist may be set to "0" and "1", respectively. Also, although FIG. 27 shows an embodiment in which the Retry field is used when the interval between PPDUs is SIFS, the present disclosure is not limited thereto. According to an embodiment, the interval between PPDUs may be set in various ways.

(4) The Fourth Embodiment

According to the fourth embodiment, in order to transmit information on the Next PPDU Pointer, the QoS Control field of the MAC header may be used.

According to the fourth embodiment, the Ack policy indicated by bits 5 to 6 of the QoS Control field or the A-MSDU present indicated by bit 7 may be interpreted as a repeated PPDU format. Accordingly, the NGV STA may check whether the format of the received PPDU is a repeated PPDU format based on bits 5 to 6 or bit 7 of the QoS Control field. For example, when one of bits 5 to 6 or bit 7 of the QoS Control field is set to "1", it may mean that another PPDU exists after a predetermined interval. For another example, when one of bits 5 to 6 or bit 7 of the QoS Control field is set to "0", it may mean that another PPDU does not exist after a predetermined interval. In this case, the 11p STA may recognize the PPDU as an independent PPDU even if it continuously receives the PPDU of the same data. Therefore, when the QoS Control field is used to transmit information about the Next PPDU Pointer, there is an effect that a malfunction does not occur even in the existing 11p STA.

Hereinafter, a specific example of the fourth embodiment may be described with reference to FIG. 28.

Figure 28:
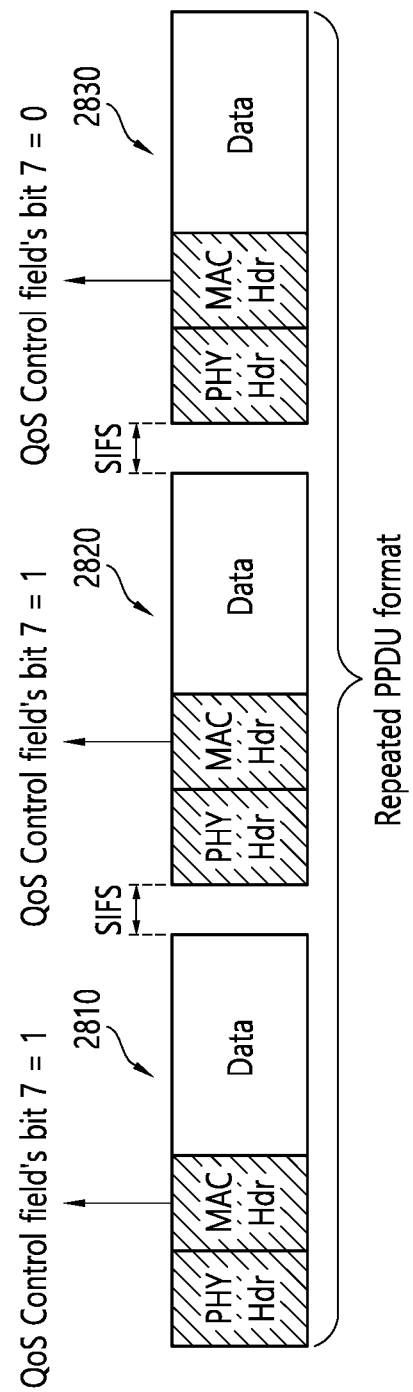
FIG. 28 shows an example in which information about the Next PPDU Pointer is transmitted based on the QoS Control field.

FIG. 28 shows an example in which information about the Next PPDU Pointer is transmitted based on the QoS Control field.

Referring to FIG. 28, a transmitting STA may transmit a first PPDU 2810, a second PPDU 2820, and a third PPDU 2830. The first PPDU 2810, the second PPDU 2820, and the third PPDU 2830 may be configured in an 11p PPDU format. The first PPDU 2810 to the third PPDU 2830 may include information about the Next PPDU Pointer. Information on the Next PPDU Pointer may be included in the bit 7 of the QoS control field included in the MAC header.

According to an embodiment, the bit 7 of the QoS control field may be set to a first value (for example, "1") when the next PPDU exists. The bit 7 of the QoS control field may be set to a second value (for example, "0") when the next PPDU does not exist.

When the receiving STA receives the first PPDU 2810, since the value of the bit 7 of the QoS control field is set to the first value (for example, "1"), the receiving STA may know that the second PPDU 2820 including the same data will be transmitted. Accordingly, the receiving STA may continue to receive the second PPDU 2820 after SIFS. Similarly, since the value of the bit 7 of the QoS control field of the second PPDU 2820 is also set to the first value (for example, "1"), the receiving STA may also receive the third PPDU 2830 after SIFS. Since the value of the bit 7 of the QoS control field in the last third PPDU 2830 is set to the second value (for example, "0"), the receiving STA may know that the next PPDU does not exist after SIFS. Accordingly, the receiving STA may obtain a performance gain through combining the received PPDUs by using a total of the three PPDUs including the same data (that is, the first PPDU 2810 to the third PPDU 2830).

FIG. 28 shows a case where the value of the bit 7 of the QoS control field when the next PPDU is present and the value of the bit 7 of the QoS control field when the next PPDU does not exist are set to "1" and "0", respectively. However, the present disclosure is not limited thereto. According to an embodiment, the value of the bit 7 of the QoS control field when the next PPDU exists and the value of the bit 7 of the QoS control field when the next PPDU does not exist may be set to "0" and "1", respectively. In addition, FIG. 28 shows an embodiment using the bit 7 of the QoS control field when the interval between PPDUs is SIFS, however, the present disclosure is not limited thereto. According to an embodiment, the interval between PPDUs may be set in various ways.

(5) The Fifth Embodiment

According to the fifth embodiment, a reserved bit of the L-SIG may be used to transmit information on the Next PPDU Pointer.

According to the fifth embodiment, since the 11p STA ignores the reserved bit of the L-SIG when decoding the PPDU, the reserved bit of the L-SIG may be used to transmit information for indicating the repeated PPDU format. In other words, the NGV STA may check whether the format of the received PPDU is the repeated PPDU format based on the reserved bit of the L-SIG. For example, when the reserved bit of the L-SIG is set to "1", it may mean that another PPDU exists after a predetermined interval. For another example, when the reserved bit of the L-SIG is set to "0", it may mean that another PPDU does not exist after a predetermined interval. In this case, the 11p STA may recognize the PPDU as an independent PPDU even if it continuously receives the PPDU of the same data. Accordingly, when the reserved bit of the L-SIG is used to transmit information on the Next PPDU Pointer, there is an effect that a malfunction does not occur even in the existing 11p STA.

Hereinafter, a specific example of the fifth embodiment may be described with reference to FIG. 29.

Figure 29:
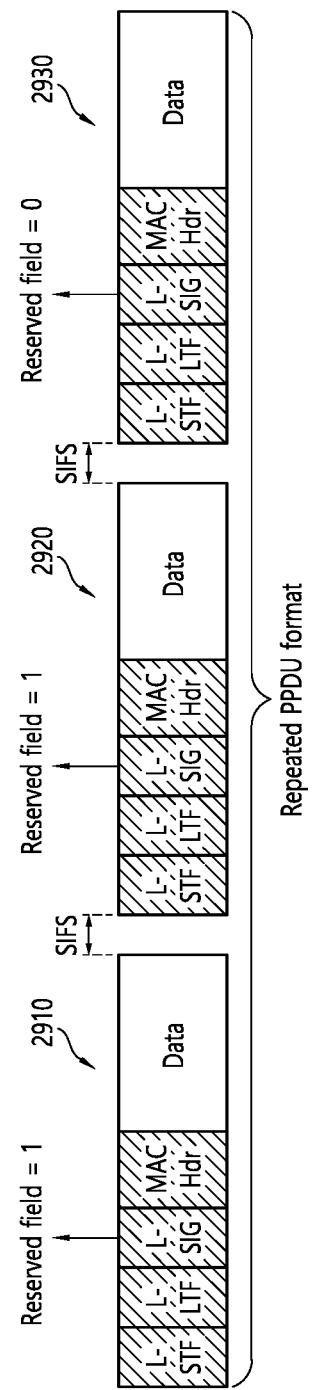
FIG. 29 shows an example in which information on the Next PPDU Pointer is transmitted based on the reserved bit of the L-SIG.

FIG. 29 shows an example in which information on the Next PPDU Pointer is transmitted based on the reserved bit of the L-SIG.

Referring to FIG. 29, a transmitting STA may transmit a first PPDU 2910, a second PPDU 2920, and a third PPDU 2930. The first PPDU 2910, the second PPDU 2920, and the third PPDU 2930 may be configured in an 11p PPDU format. The first PPDU 2910 to the third PPDU 2930 may include information about the Next PPDU Pointer. Information on the Next PPDU Pointer may be included in the reserved bit of the L-SIG.

According to an embodiment, the reserved bit of the L-SIG may be set to a first value (for example, "1") when the next PPDU exists. The reserved bit of the L-SIG may be set to a second value (for example, "0") when the next PPDU does not exist.

When the receiving STA receives the first PPDU 2910, since the value of the reserved bit of the L-SIG is set to the first value (for example, "1"), the receiving STA may know that the second PPDU 2920 including the same data will be transmitted. Accordingly, the receiving STA may continue to receive the second PPDU 2920 after SIFS. Similarly, since the value of the reserved bit of the L-SIG in the second PPDU 2920 is also set to the first value (for example, "1"), the receiving STA may also receive the third PPDU 2930 after SIFS. Since the value of the reserved bit of the L-SIG in the last third PPDU 2930 is set to the second value (for example, "0"), the receiving STA can know that the next PPDU after SIFS does not exist. Accordingly, the receiving STA may obtain a performance gain through combining the received PPDUs by using a total of the three PPDUs including the same data (that is, the first PPDU 2910 to the third PPDU 2930).

FIG. 29 illustrates a case in which the value of the reserved bit of the L-SIG when the next PPDU exists and the value of the reserved bit of the L-SIG when the next PPDU does not exist are set to "1" and "0", respectively. However, the present disclosure is not limited thereto. According to an embodiment, the value of the reserved bit of the L-SIG when the next PPDU exists and the value of the reserved bit of the L-SIG when the next PPDU does not exist may be set to "0" and "1", respectively. FIG. 29 shows an embodiment using the reserved bit of the L-SIG when the interval between PPDUs is SIFS, however, the present disclosure is not limited thereto. According to an embodiment, the interval between PPDUs may be set in various ways.

(6) The Sixth Embodiment

According to the sixth embodiment, an extra tone may be used to transmit information about the Next PPDU Pointer.

According to the sixth embodiment, information on the Next PPDU Pointer may be transmitted through the additional 2 tones of the index {−27, 27} or the additional 4 tones of the index {−28, −27, 27, 28}, which are not the tones used in the L-Part of the conventional 11p PPDU.

Figure 30:
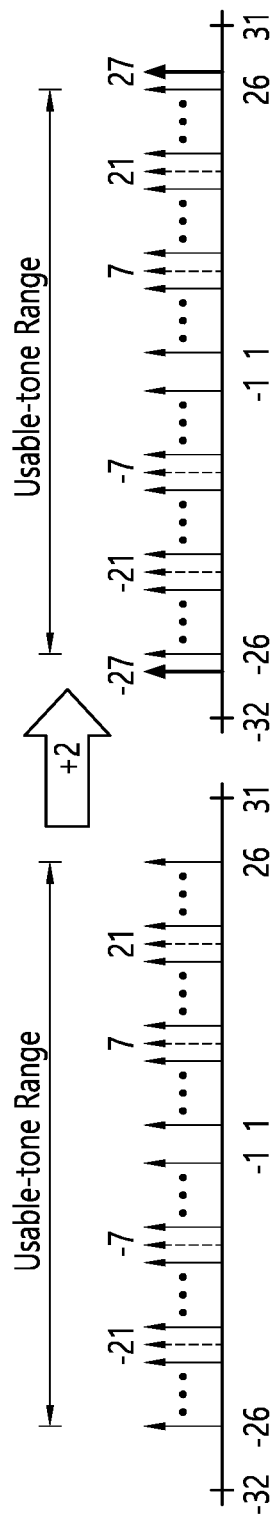
FIG. 30 shows an example of extra tone.

FIG. 30 shows an example of extra tone.

Referring to FIG. 30, in the L-Part of the conventional 11p PPDU, index (or subcarrier index) −26 to 26 (that is, 52 tones) may be used as available tones. In order to transmit information about the Next PPDU Pointer, the additional 2 tones of index {−27, 27} may be further used. Therefore, indexes from −27 to 27 (that is, 54 tons) can be used as usable tones.

Figure 31:
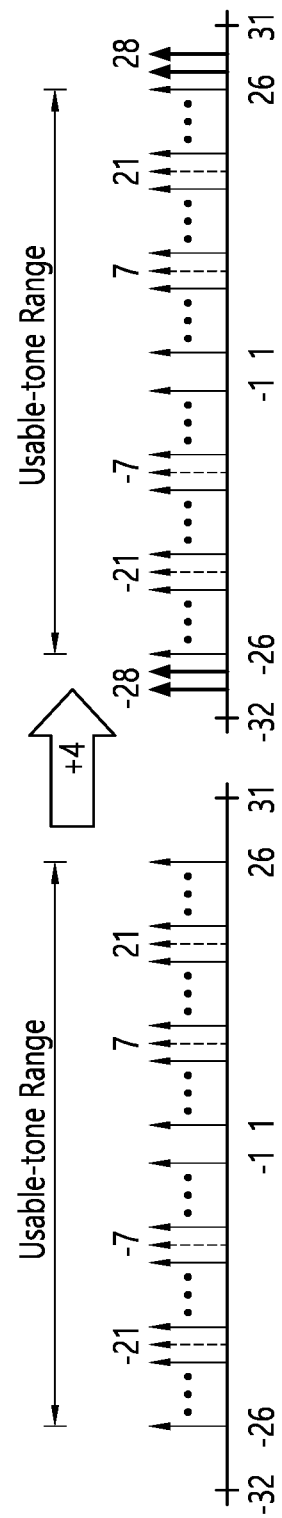
FIG. 31 shows another example of extra tone.

FIG. 31 shows another example of extra tone.

Referring to FIG. 31, in order to transmit information about the Next PPDU Pointer, the additional 4 tones of index {−28, −27, 27, 28} may be further used. Therefore, from index −28 to 28 (that is, 56 tones) can be used as usable tones.

Figure 32:
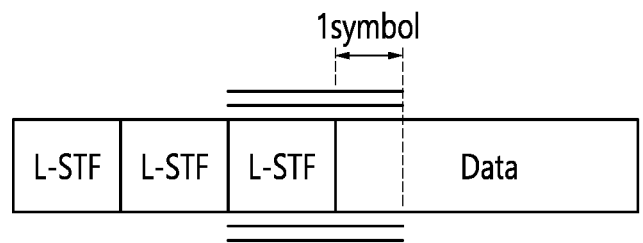
FIGS. 32 to 34 show examples of fields in which extra tone is used.
Figure 33:
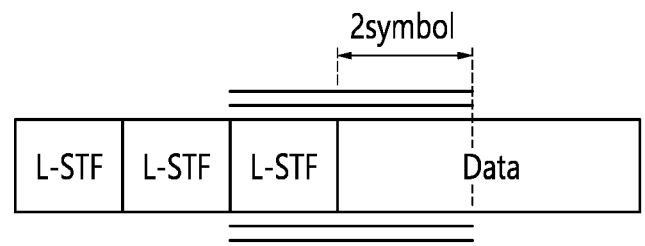
Figure 34:
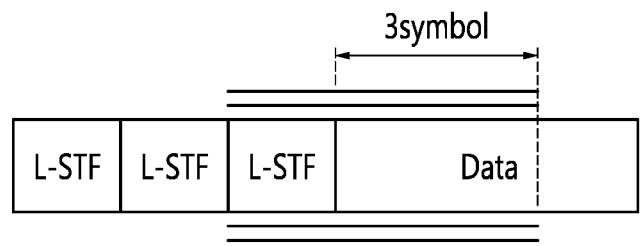

A position where the extra tone is further used may be set in various ways. In FIGS. 32 to 34, an example regarding a field in which extra tone is used may be described.

FIGS. 32 to 34 show examples of fields in which extra tone is used.

Referring to FIGS. 32 to 34, based on the field of the 11p PPDU, the extra tone may start from the L-SIG. However, the present disclosure is not limited thereto. Extra tone can be started from various fields. For example, the extra tone may start from L-LTF. For another example, the extra tone may start from the first symbol of the data field.

Reliability may increase as there are more data symbols using extra tone starting from L-SIG. However, the more data symbols that extra tone is used, the more overhead may occur. Therefore, it may be appropriate that about 1 to 3 data symbols for using the extra tone are used.

Accordingly, in FIG. 32, the extra tone may start from L-SIG. In addition, the number of data symbols used for the extra tone can be set to '1'. In FIG. 33, the extra tone may start from L-SIG. In addition, the number of data symbols for using the extra tone may be set to '2'. In FIG. 34, the extra tone may start from L-SIG. In addition, the number of data symbols for using the extra tone may be set to '3'.

Examples in which the number of data symbols for using an extra tone is set to '1' to '3' are illustrated in FIGS. 32 to 34, however, the present disclosure is not limited thereto. A data symbol in which the extra tone is used may start from various fields, and a data symbol in which the extra tone is used may be set in various ways.

According to the sixth embodiment, information on the Next PPDU Pointer may be transmitted/indicated in various ways through extra tone. Hereinafter, a detailed method of transmitting/indicating information on the Next PPDU Pointer through the extra tone may be described.

i) Method of Using 1 Bit Per 1 Tone Through Channel Estimation

In L-LTF or L-SIG, channel estimation may be additionally performed through extra tone. For example, 2 bits or 4 bits may be additionally used in the L-SIG. Accordingly, the receiving STA may identify that the format of the received PPDU is the repeated PPDU format based on the additionally used bit. For example, when the value of 1 bit among bits additionally used in the L-SIG is the first value (for example, "1"), the 1 bit may mean that the PPDU exists after a predetermined interval. When a value of 1 bit among bits additionally used in the L-SIG is a second value (for example, "0"), the 1 bit may mean that the PPDU does not exist after a predetermined interval. In this case, the 11p STA may recognize the PPDU as an independent PPDU even if it continuously receives the PPDU of the same data. Accordingly, when a bit additionally used in the L-SIG is used to transmit information on the Next PPDU Pointer, there is an effect that a malfunction does not occur even in the existing 11p STA.

ii) How to Use a Sequence for Each Tone

According to an embodiment, a specific sequence may be configured and transmitted through each Extra tone. Based on the sequence combination, the receiving STA may identify that the format of the received PPDU is a repeated PPDU format. For example, when "1" is derived through sequence combination in the receiving STA, it may mean that another PPDU exists after a predetermined interval. When "0" is derived through sequence combination in the receiving STA, it may mean that another PPDU does not exist after a predetermined interval.

According to an embodiment, a specific extra tone may not have the same sequence in L-SIG or data. For example, based on the −27 tone, the sequence set in the extra tone of the L-SIG and the sequence set in the extra tone of the data symbol may be set differently.

iii) Method for Using Power

Based on the power included (or loaded) in the extra tone, the receiving STA may identify that the format of the received PPDU is the repeated PPDU format. For example, when there is power included in the extra tone, it may mean that the PPDU exists after a predetermined interval. If there is no power included in the extra tone (or if it is "0"), it may mean that the PPDU does not exist after a predetermined interval.

2. When Only Information on the Repeated PPDU Format is Used

According to an embodiment, the receiving STA may receive information on the repeated PPDU format. For example, information on the repeated PPDU format may be included in the Sequence Control or Retry field of the MAC header of the conventional 11p PPDU. For another example, information on the repeated PPDU format may be included in the L-SIG field of the PHY header of the conventional 11p PPDU.

(7) The Seventh Embodiment

According to the seventh embodiment, in order to transmit information on the repeated PPDU format, the Duration/ID field of the MAC header may be used.

The transmitting STA may transmit information on the repeated PPDU format by using one specific Duration value in the Duration/ID field. When the Duration/ID field is set to the specific Duration value, the receiving STA may identify that the format of the received PPDU is a repeated PPDU format.

When information about the repeated PPDU format is transmitted, the number of repeated PPDUs should be predefined. However, due to the characteristics of V2X, the receiving STA may receive a PPDU of a repeated PPDU format in the middle. In this case, there is a problem in that the predefined number of repeated PPDUs may be different from the number of actually received PPDUs. The receiving STA may regard a PPDU that is no longer received as an error. The receiving STA may perform combining with only the received PPDU.

When a PPDU of the repeated PPDU format is transmitted, the value of the Duration/ID field should be set smaller than the interval between PPDUs in order to receive the next PPDU for the 11p STA. For example, if the interval between PPDUs of the repeated PPDU format is SIFS (for example, 32 us in the 802.11p standard), the value of the Duration/ID field should be set smaller than the SIFS.

For example, when the interval between the PPDUs is SIFS (32 us), possible values per slot, not exceeding 32 us, may be 0.5 slot (6 us or 7 us), 1 slot (13 us), 1.5 slot (18 us or 19 us), or 2 slot (26 us), etc. Accordingly, a value of the Duration/ID field may be set to at least one of 0.5 slot (6 us or 7 us), 1 slot (13 us), 1.5 slot (18 us or 19 us), or 2 slot (26 us). The value of the Duration/ID field is not limited to the above-described example, and may be set to various values.

Hereinafter, a specific example of the seventh embodiment may be described with reference to FIG. 35.

Figure 35:
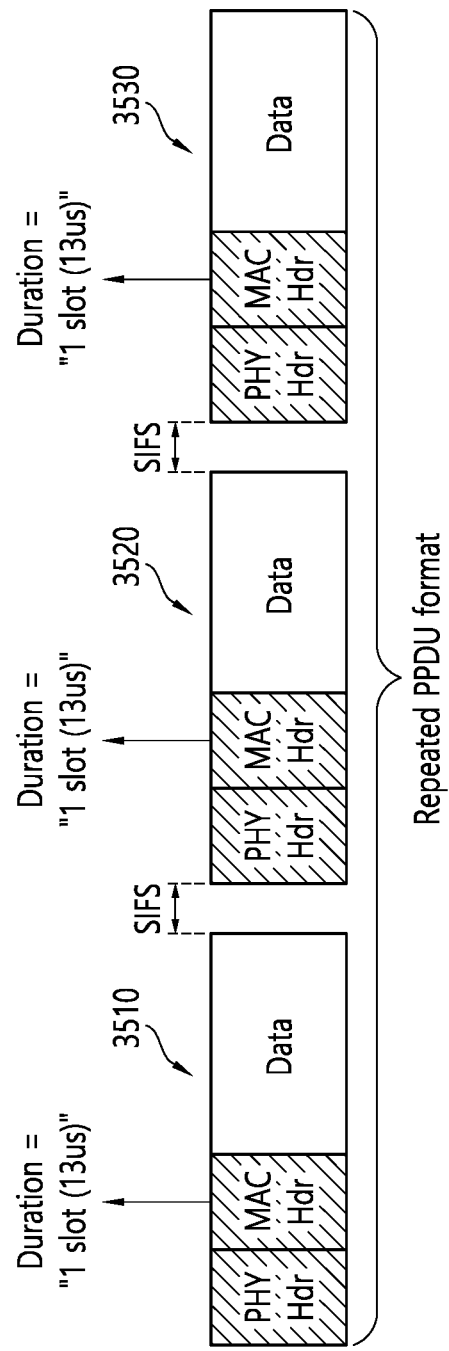
FIG. 35 shows an example in which information about the repeated PPDU format is transmitted based on the Duration/ID field.

FIG. 35 shows an example in which information about the repeated PPDU format is transmitted based on the Duration/ID field.

Referring to FIG. 35, a transmitting STA may transmit a first PPDU 3510, a second PPDU 3520, and a third PPDU 3530. The first PPDU 3510, the second PPDU 3520, and the third PPDU 3530 may be configured in an 11p PPDU format. The first PPDU 3510 to the third PPDU 3530 may include information about the repeated PPDU format. Information on the repeated PPDU format may be included in the Duration/ID field of the MAC header.

According to an embodiment, it may be predefined that the number of repeated PPDUs is three. According to an embodiment, the fact that the number of repeated PPDUs is three may be negotiated between the transmitting STA and the receiving STA in advance.

The receiving STA (or NGV STA) may identify that the Duration value of each PPDU is indicated by 1 slot. The receiving STA may recognize that the format of the first PPDU 3510 to the third PPDU 3530 is a repeated PPDU format. Accordingly, the receiving STA can recognize that a PPDU including a total of three identical data is repeated. After receiving the first PPDU 3510 to the third PPDU 3530, the receiving STA may obtain a performance gain through combining.

FIG. 35 shows an example in which the Duration value is set to 1 slot and the interval between PPDUs is set to SIFS, however, the present disclosure is not limited thereto. According to an embodiment, a value of the Duration/ID field and/or an interval between PPDUs may be set in various ways.

(8) The Eighth Embodiment

According to the eighth embodiment, in order to transmit information on the repeated PPDU format, the Sequence Control field of the MAC header may be used.

The transmitting STA may transmit information about the repeated PPDU format by using one specific sequence number (for example, "1000") in the Sequence Control field. When the Sequence Control field is set to the specific sequence number, the receiving STA may identify that the format of the received PPDU is the repeated PPDU format.

When information about the repeated PPDU format is transmitted, the number of repeated PPDUs should be predefined. However, due to the characteristics of V2X, the receiving STA may receive a PPDU of a repeated PPDU format in the middle. In this case, there is a problem in that the predefined number of repeated PPDUs may be different from the number of actually received PPDUs. The receiving STA may regard a PPDU that is no longer received as an error. The receiving STA may perform combining with only the received PPDU.

Hereinafter, a specific example of the eighth embodiment may be described with reference to FIG. 36.

Figure 36:
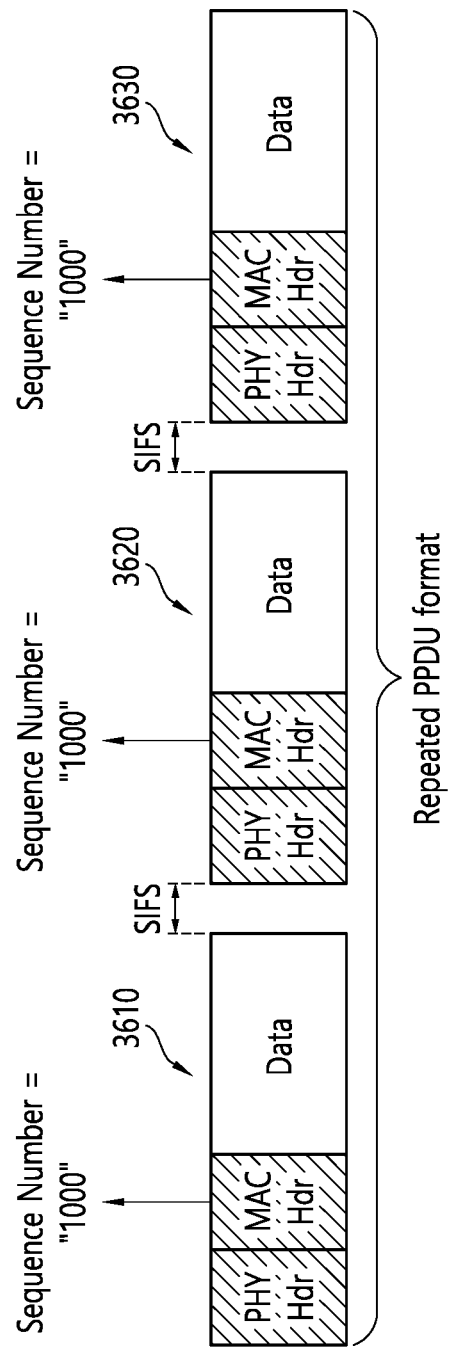
FIG. 36 shows an example in which information about the repeated PPDU format is transmitted based on the Sequence Control field.

FIG. 36 shows an example in which information about the repeated PPDU format is transmitted based on the Sequence Control field.

Referring to FIG. 36, a transmitting STA may transmit a first PPDU 3610, a second PPDU 3620, and a third PPDU 3630. The first PPDU 3610, the second PPDU 3620, and the third PPDU 3630 may be configured in an 11p PPDU format. The first PPDU 3610 to the third PPDU 3630 may include information about the repeated PPDU format. Information on the repeated PPDU format may be included in the Sequence Control field of the MAC header.

According to an embodiment, it may be predefined that the number of repeated PPDUs is three. According to an embodiment, the fact that the number of repeated PPDUs is three may be negotiated between the transmitting STA and the receiving STA in advance.

The receiving STA (or NGV STA) may identify that the sequence number of the Sequence Control field of each PPDU is set to "1000". The receiving STA may recognize that the format of the first PPDU 3610 to the third PPDU 3630 is a repeated PPDU format. Accordingly, the receiving STA can recognize that a PPDU including a total of three identical data is repeated. After receiving the first PPDU 3610 to the third PPDU 3630, the receiving STA may obtain a performance gain through combining.

FIG. 36 shows an example in which the sequence number of the Sequence Control field is set to "1000" and the interval between PPDUs is set to SIFS, however, the present disclosure is not limited thereto. According to an embodiment, the sequence number of the Sequence Control field and/or the interval between PPDUs may be set in various ways.

(9) The Ninth Embodiment

According to the ninth embodiment, in order to transmit information on the repeated PPDU format, a Retry field (or Retry subfield) of the Frame Control field of the MAC header may be used.

The 11p STA may recognize a retransmission frame when the value of the Retry field is a first value (for example, "1"). Accordingly, in the Repeated PPDU format, even if the value of the Retry field is set to the first value (for example, "1"), the 11p STA may decode the 11p PPDU of the Repeated PPDU format.

Even if the 11p STA continuously receives PPDUs of the same data, it may be recognized as an independent PPDU, and even if the Retry field is 1, it may only be recognized as a PPDU having the same data and thus not cause a malfunction. In other words, when the Retry field (or Retry subfield) is used to transmit information on the Repeated PPDU format, there is an effect that a malfunction does not occur even in the existing 11p STA.

According to the ninth embodiment, based on the value of the Retry field, the NGV STA may recognize the repeated PPDU format. For example, if the value of the Retry field is a first value (for example, "1"), the receiving STA (or NGV STA) may identify that the format of the received PPDU is the Repeated PPDU format. If the value of the Retry field is a second value (for example, "0"), the NGV STA may identify that the format of the received PPDU is not the Repeated PPDU format.

Hereinafter, a specific example of the ninth embodiment may be described with reference to FIG. 37.

Figure 37:
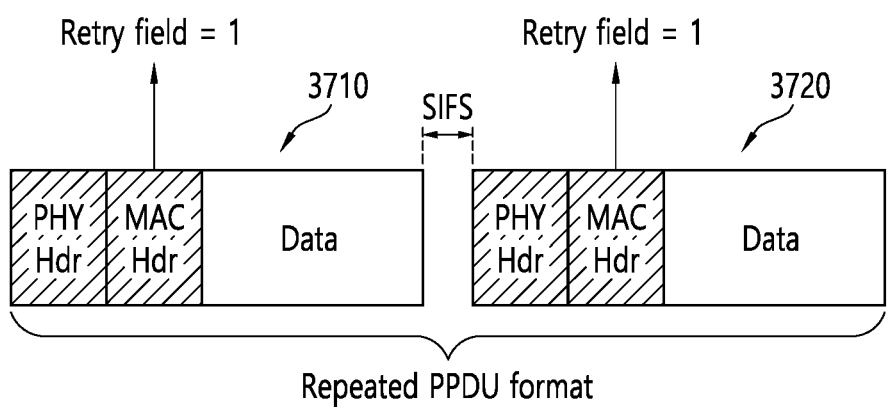
FIG. 37 shows an example in which information about the repeated PPDU format is transmitted based on the Retry field of the Frame Control field.

FIG. 37 shows an example in which information about the repeated PPDU format is transmitted based on the Retry field of the Frame Control field.

Referring to FIG. 37, a transmitting STA may transmit a first PPDU 3710 and a second PPDU 3720. The first PPDU 3710 and the second PPDU 3720 may be configured in an 11p PPDU format. The first PPDU 3710 and the second PPDU 3720 may include information about the repeated PPDU format. Information on the repeated PPDU format may be included in the Retry field of the Frame Control field in the MAC header.

According to an embodiment, it may be predefined that the number of repeated PPDUs is two. According to an embodiment, the fact that the number of repeated PPDUs is two may be negotiated between the transmitting STA and the receiving STA in advance.

The receiving STA (or NGV STA) may identify that the value of the Retry field of each PPDU is set to "1". The receiving STA may recognize that the formats of the first PPDU 3710 and the second PPDU 3720 are the repeated PPDU format. Accordingly, the receiving STA can recognize that the PPDU including two identical data is repeated. After receiving the first PPDU 3710 and the second PPDU 3720, the receiving STA may obtain a performance gain through combining.

FIG. 37 shows an example in which the value of the Retry field is set to "1" and the interval between PPDUs is set to SIFS, however, the present disclosure is not limited thereto. According to an embodiment, the value of the Retry field and/or the interval between PPDUs may be set in various ways.

(10) The Tenth Embodiment

According to the tenth embodiment, in order to transmit information on the repeated PPDU format, a reserved bit of the L-SIG of the PHY header may be used.

According to the tenth embodiment, since the 11p STA ignores the reserved bit of the L-SIG when decoding the PPDU, the reserved bit of the L-SIG may be used to transmit information about the repeated PPDU format. In other words, the NGV STA may identify whether the format of the received PPDU is the repeated PPDU format based on the reserved bit of the L-SIG.

For example, when the reserved bit of the L-SIG is set to "1", the receiving STA may identify that the format of the received PPDU is the repeated PPDU format. For another example, when the reserved bit of the L-SIG is set to "0", the receiving STA may identify that the format of the received PPDU is not the repeated PPDU format. In this case, the 11p STA may recognize the PPDU as an independent PPDU even though it continuously receives the PPDU of the same data. Therefore, when the reserved bit of the L-SIG is used to transmit information about the repeated PPDU format, there is an effect that a malfunction does not occur even in the existing 11p STA.

Hereinafter, a specific example of the tenth embodiment may be described with reference to FIG. 38.

Figure 38:
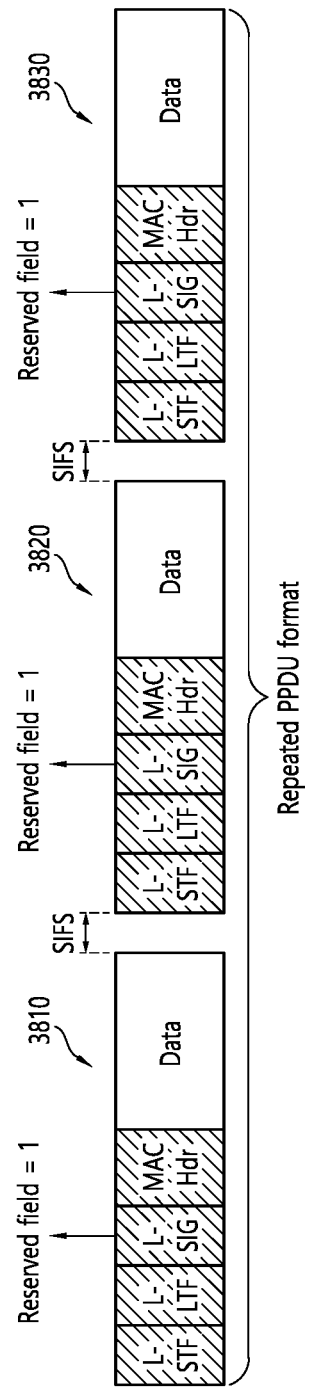
FIG. 38 shows an example in which information about the repeated PPDU format is transmitted based on the reserved bit of the L-SIG.

FIG. 38 shows an example in which information about the repeated PPDU format is transmitted based on the reserved bit of the L-SIG.

Referring to FIG. 38, a transmitting STA may transmit a first PPDU 3810, a second PPDU 3820, and a third PPDU 3830. The first PPDU 3810, the second PPDU 3820, and the third PPDU 3830 may be configured in an 11p PPDU format. The first PPDU 3810 to the third PPDU 3830 may include information on the repeated PPDU format. Information on the repeated PPDU format may be included in the reserved bit of the L-SIG.

According to an embodiment, it may be predefined that the number of repeated PPDUs is three. According to an embodiment, the fact that the number of repeated PPDUs is three may be negotiated between the transmitting STA and the receiving STA in advance.

The receiving STA (or NGV STA) may identify that the value of the reserved bit of the L-SIG in each PPDU is set to "1". The receiving STA may recognize that the format of the first PPDU 3810 to the third PPDU 3830 is a repeated PPDU format. Accordingly, the receiving STA can recognize that a PPDU including a total of three identical data is repeated. After receiving the first PPDU 3810 to the third PPDU 3830, the receiving STA may obtain a performance gain through combining.

FIG. 38 shows an example in which the value of the reserved bit of the L-SIG is set to "1" and the interval between PPDUs is set to SIFS, however, the present disclosure is not limited thereto. According to an embodiment, the value of the reserved bit and/or the interval between PPDUs may be set in various ways.

3. When Information on a Repeated Format and Information on the Number of Repeated PPDUs or Information on a Next PPDU Pointer is Used According to an embodiment, after information indicating that the repeated PPDU format is transmitted, information on a Next PPDU pointer or information on a Number of repeated PPDUs may be transmitted.

(11) The Eleventh Embodiment

According to the eleventh embodiment, in order to transmit information about the repeated PPDU format, a Duration/ID field may be used. In addition, in order to transmit information about the Next PPDU Pointer or information about the Number of repeated PPDUs, a Sequence Control field may be used.

The transmitting STA may transmit information on the repeated PPDU format by using a specific Duration value in the Duration/ID field. When the Duration/ID field is set to the specific Duration value, the receiving STA may identify that the format of the received PPDU is a repeated PPDU format. That is, the receiving STA can recognize that the received 11p PPDU has been transmitted by the NGV STA (that is, the transmitting STA). However, the next PPDU of the received PPDU may not necessarily exist. That is, whether the next PPDU of the received PPDU exists may be indicated based on the Sequence Control field.

However, when the value of the Duration/ID field is set to "0" or more as in the conventionally defined rule, the NGV STA may set the NAV based on the set value. However, in the repeated PPDU format, the value of the Duration/ID field should be set smaller than the interval between PPDUs in order to receive the next PPDU. For example, if the interval between PPDUs of the repeated PPDU format is SIFS (for example, 32 us in the 802.11p standard), the value of the Duration/ID field should be set smaller than the SIFS.

For example, when the interval between the PPDUs is SIFS (32 us), possible values per slot, Not exceeding 32 us, may be 0.5 slot (6 us or 7 us), 1 slot (13 us), 1.5 slot (18 us or 19 us), or 2 slot (26 us), etc. Accordingly, a value of the Duration/ID field may be set to at least one of 0.5 slot (6 us or 7 us), 1 slot (13 us), 1.5 slot (18 us or 19 us), or 2 slot (26 us). The value of the Duration/ID field is not limited to the above-described example, and may be set to various values.

According to an embodiment, in the Sequence Control field, information on the Next PPDU Pointer or information on the Number of repeated PPDUs may be transmitted through one or more specific sequence numbers.

i) According to an embodiment, information on the Next PPDU Pointer may be transmitted through one specific sequence number. For example, if the Sequence Control field is set to a specific sequence number, it may mean that the PPDU exists after a predetermined interval. If the Sequence Control field is not set to the specific sequence number, it may mean that the PPDU does not exist.

ii) According to an embodiment, information on the Next PPDU Pointer may be transmitted through two specific sequence numbers. For example, two specific sequence numbers may be called 'A' and 'B'. When the Sequence Control field is set to 'A', it may mean that the PPDU exists after a predetermined interval. If the Sequence Control field is set to 'B', it may mean that the PPDU does not exist.

iii) According to an embodiment, information about the Number of repeated PPDUs may be transmitted through the Sequence Control field. For example, as many sequence numbers as the maximum supportable number in the repeated PPDU format may be used. Each sequence number may mean the number of repeated PPDUs remaining in the future.

For example, a specific sequence number may be set to three (that is, 'A', 'B', 'C'). In this case, it may be configured that 'A' means that the number of repeated PPDUs remaining in the future is 2, 'B' means that the number of repeated PPDUs remaining in the future is 1, and 'C' means that the number of repeated PPDUs remaining in the future is 0.

Hereinafter, a specific example of the eleventh embodiment may be described with reference to FIG. 39.

Figure 39:
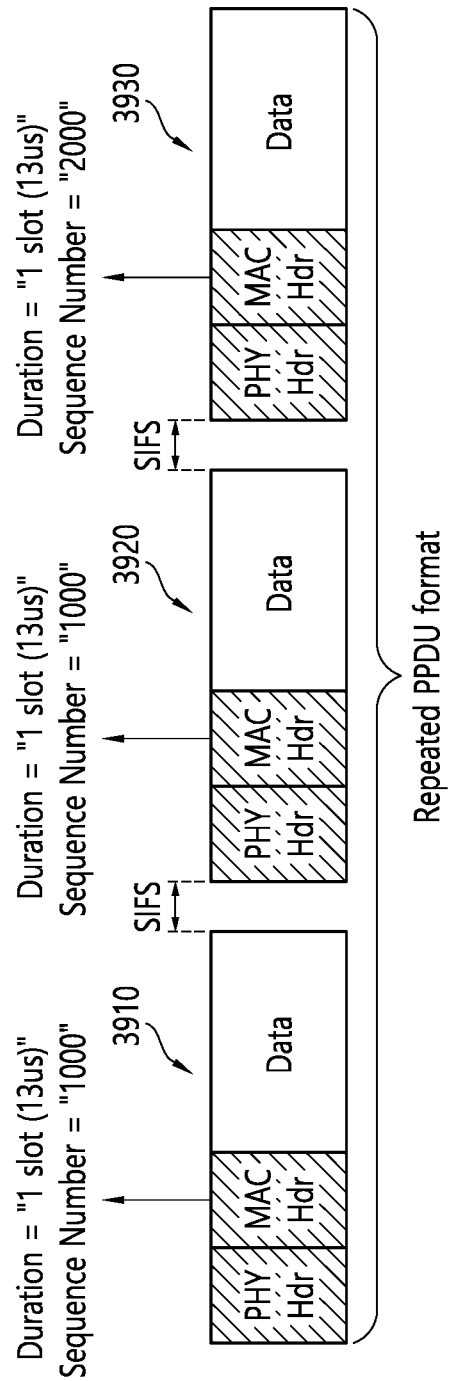
FIG. 39 shows an example in which information on a repeated PPDU format is transmitted based on the Duration/ID field and information on a Next PPDU Pointer is transmitted based on the Sequence Control field.

FIG. 39 shows an example in which information on a repeated PPDU format is transmitted based on the Duration/ID field and information on a Next PPDU Pointer is transmitted based on the Sequence Control field.

Referring to FIG. 39, a transmitting STA may transmit a first PPDU 3910, a second PPDU 3920, and a third PPDU 3930. The first PPDU 3910, the second PPDU 3920, and the third PPDU 3930 may be configured in an 11p PPDU format. The first PPDU 3910 to the third PPDU 3930 may include information on the repeated PPDU format and information on the Next PPDU Pointer. Information on the repeated PPDU format may be included in the Duration/ID field of the MAC header. Information on the Next PPDU Pointer may be included in the Sequence Control field.

The receiving STA (or NGV STA) may identify that the Duration value of each PPDU is indicated by 1 slot. The receiving STA may recognize that the format of the first PPDU 3910 to the third PPDU 3930 is a repeated PPDU format.

In addition, when the receiving STA receives the first PPDU 3910, since the sequence number (or sequence) is set to "1000", the receiving STA can recognize that the second PPDU 3920 including the same data will be transmitted. Accordingly, the receiving STA may continue to receive the second PPDU 3920 after SIFS. Similarly, since the sequence number of the second PPDU 3920 is set to "1000", the receiving STA may also receive the third PPDU 3930 after SIFS. Since the sequence number is set to "2000" in the last third PPDU 3930, the receiving STA can recognize that the next PPDU does not exist after SIFS. Accordingly, the receiving STA may obtain a performance gain through combining the received PPDUs by using a total of the three PPDUs including the same data (that is, the first PPDU 3910 to the third PPDU 3930).

The value of the Duration/ID field (that is, 1 slot (13 us)) and the sequence number (that is, "1000") of the Sequence Control field shown in FIG. 39 are examples, and the present disclosure is not limited thereto. In order to transmit information on the repeated PPDU format and information on the Next PPDU Pointer, the value of the Duration/ID field and the sequence number of the Sequence Control field may be set in various ways. In addition, although an example in which the interval between PPDUs is set to SIFS is illustrated in FIG. 39, the present disclosure is not limited thereto. According to an embodiment, the interval between PPDUs could be set in various ways.

Hereinafter, a specific example of the eleventh embodiment may be described with reference to FIG. 40.

Figure 40:
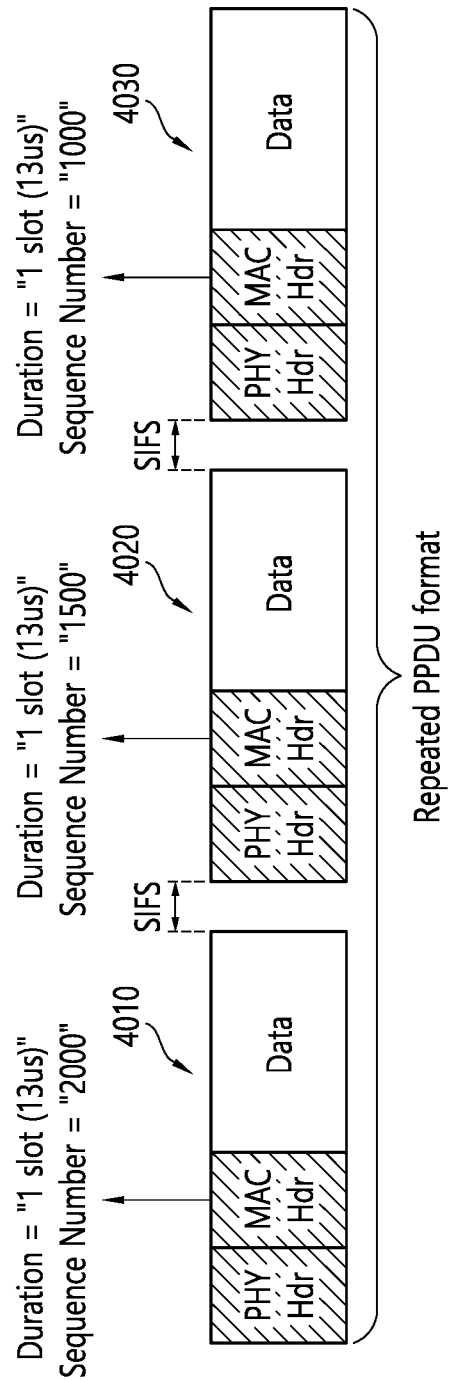
FIG. 40 shows an example in which information on the repeated PPDU format is transmitted based on the Duration/ID field, and information on the Number of repeated PPDUs is transmitted based on the Sequence Control field.

FIG. 40 shows an example in which information on the repeated PPDU format is transmitted based on the Duration/ID field, and information on the Number of repeated PPDUs is transmitted based on the Sequence Control field.

Referring to FIG. 40, a transmitting STA may transmit a first PPDU 4010, a second PPDU 4020, and a third PPDU 4030. The first PPDU 4010, the second PPDU 4020, and the third PPDU 4030 may be configured in an 11p PPDU format. The first PPDU 4010 to the third PPDU 4030 may include information on the repeated PPDU format and information on the Next PPDU Pointer. Information on the repeated PPDU format may be included in the Duration/ID field of the MAC header. Information about the number of repeated PPDUs may be included in the Sequence Control field.

The receiving STA (or the NGV STA) may identify that the Duration value of each PPDU is indicated by 1 slot. The receiving STA may recognize that the format of the first PPDU 4010 to the third PPDU 4030 is a repeated PPDU format.

In addition, when the receiving STA receives the first PPDU 4010, since the sequence number (or sequence) is set to "2000", the receiving STA can identify that two more PPDUs including the same data will be transmitted. Accordingly, the receiving STA may continue to receive the second PPDU 4020 after SIFS. Similarly, since the sequence number in the second PPDU 4020 is set to "1500", the receiving STA may recognize that one more PPDU including the same data will be transmitted. The receiving STA may also receive the third PPDU 4030 after SIFS. Since the sequence number in the last third PPDU 4030 is set to "1000", the receiving STA can recognize that the third PPDU 4030 is the last PPDU of the repeated PPDU format. Accordingly, the receiving STA may obtain a performance gain through combining the received PPDUs by using a total of the three PPDUs including the same data (that is, the first PPDU 4010 to the third PPDU 4030).

The value of the Duration/ID field (that is, 1 slot (13 us)) and the sequence number (that is, "1000", "1500", or "2000") of the Sequence Control field shown in FIG. 40 are an example, and the present disclosure is not limited thereto. In order to transmit information on the repeated PPDU format and information on the Number of repeated PPDUs, the value of the Duration/ID field and the sequence number of the Sequence Control field may be set in various ways. In addition, although an example in which the interval between PPDUs is set to SIFS is illustrated in FIG. 40, the present disclosure is not limited thereto. According to an embodiment, the interval between PPDUs may be set in various ways.

(12) The Twelfth Embodiment

According to the twelfth embodiment, in order to transmit information about the repeated PPDU format, a Duration/ID field may be used. In addition, in order to transmit information on a Next PPDU Pointer or information on the Number of repeated PPDUs, a Retry field may be used.

The transmitting STA may transmit information about the repeated PPDU format by using a specific Duration value in the Duration/ID field. When the Duration/ID field is set to the specific Duration value, the receiving STA may identify that the format of the received PPDU is a repeated PPDU format. That is, the receiving STA can know that the received 11p PPDU has been transmitted by the NGV STA (that is, the transmitting STA). However, the next PPDU of the received PPDU may not necessarily exist. That is, whether the next PPDU of the received PPDU exists may be indicated based on the Retry field.

However, when the value of the Duration/ID field is set to "0" or more as in the conventionally defined rule, the NGV STA may set the NAV based on the set value. However, in the repeated PPDU format, the value of the Duration/ID field should be set smaller than the interval between PPDUs in order to receive the next PPDU. For example, if the interval between PPDUs of the repeated PPDU format is SIFS (for example, 32 us in the 802.11p standard), the value of the Duration/ID field should be set smaller than the SIFS.

For example, when the interval between the PPDUs is SIFS (32 us), possible values per slot, not exceeding 32 us, may be 0.5 slot (6 us or 7 us), 1 slot (13 us), 1.5 slot (18 us or 19 us), or 2 slot (26 us), etc. Accordingly, a value of the Duration/ID field may be set to at least one of 0.5 slot (6 us or 7 us), 1 slot (13 us), 1.5 slot (18 us or 19 us), or 2 slot (26 us). The value of the Duration/ID field is not limited to the above-described example, and may be set to various values.

Hereinafter, an example in which information on the Next PPDU Pointer or information on the Number of repeated PPDUs is indicated/transmitted based on the Retry field may be described below.

i) According to an embodiment, information on the Next PPDU Pointer may be indicated/transmitted based on the Retry field. For example, if the value of the Retry field is a first value (for example, "1"), it may mean that the PPDU exists after a predetermined interval. If the value of the Retry field is a second value (for example, "0"), it may mean that the PPDU does not exist.

ii) According to an embodiment, information on the Number of repeated PPDUs may be indicated/transmitted based on the Retry field. For example, if the value of the Retry field is a first value (for example, "1"), it may mean that the number of PPDUs remaining in the future is one. If the value of the Retry field is a second value (for example, "0"), it may mean that the number of PPDUs remaining in the future is 0. When information on the number of repeated PPDUs is transmitted based on the Retry field, the information on the number of repeated PPDUs may indicate that the remaining number of PPDUs is one of 0 and 1.

Hereinafter, a specific example of the twelfth embodiment may be described with reference to FIG. 41.

Figure 41:
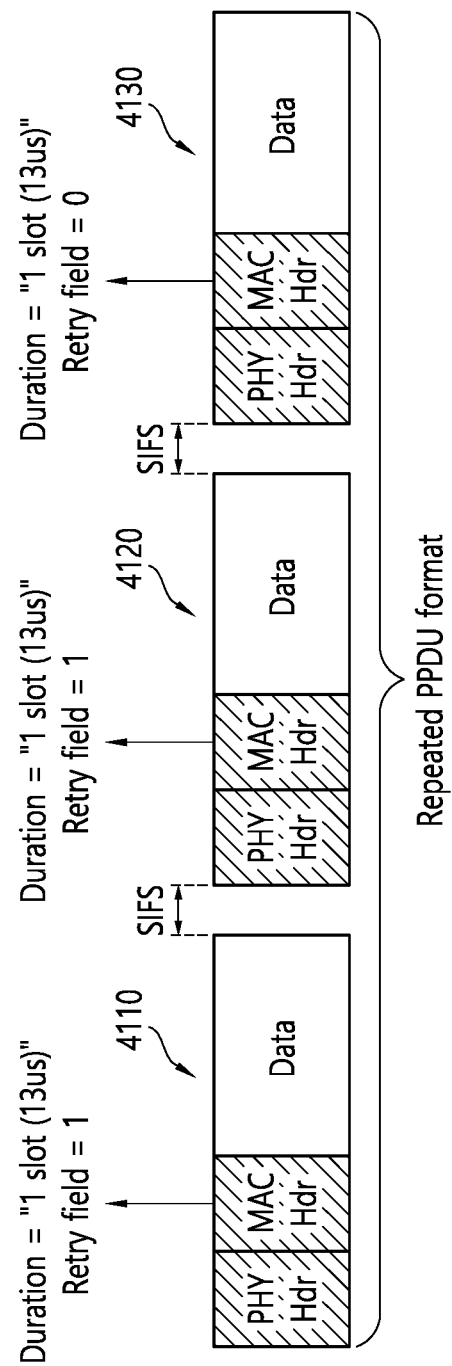
FIG. 41 illustrates an example in which information on a repeated PPDU format is transmitted based on the Duration/ID field and information on a Next PPDU Pointer is transmitted based on the Retry field.

FIG. 41 illustrates an example in which information on a repeated PPDU format is transmitted based on the Duration/ID field and information on a Next PPDU Pointer is transmitted based on the Retry field.

Referring to FIG. 41, a transmitting STA may transmit a first PPDU 4110, a second PPDU 4120, and a third PPDU 4130. The first PPDU 4110, the second PPDU 4120, and the third PPDU 4130 may be configured in an 11p PPDU format. The first PPDU 4110 to the third PPDU 4130 may include information on the repeated PPDU format and information on the Next PPDU Pointer. Information on the repeated PPDU format may be included in the Duration/ID field of the MAC header. Information on the Next PPDU Pointer may be included in the Retry field.

The receiving STA (or the NGV STA) may identify that the Duration value of each PPDU is indicated by 1 slot (13 us). The receiving STA may recognize that the format of the first PPDU 4110 to the third PPDU 4130 is a repeated PPDU format.

In addition, when the receiving STA receives the first PPDU 4110, since the value of the Retry field is set to "1", the receiving STA can recognize that the second PPDU 4120 including the same data will be transmitted. Accordingly, the receiving STA may continue to receive the second PPDU 4120 after SIFS. Similarly, since the value of the Retry field of the second PPDU 4120 is set to "1", the receiving STA may also receive the third PPDU 4130 after SIFS. Since the value of the Retry field in the last third PPDU 4130 is set to "0", the receiving STA can know that the next PPDU after SIFS does not exist. Accordingly, the receiving STA may obtain a performance gain through combining the received PPDUs by using a total of three PPDUs including the same data (that is, the first PPDU 4110 to the third PPDU 4130).

The value of the Duration/ID field (that is, 1 slot (13 us)) and the value of the Retry field (that is, "1" or "0") shown in FIG. 41 are an example, and the present disclosure is not limited thereto. In order to transmit information on the repeated PPDU format and information on the Next PPDU Pointer, the value of the Duration/ID field and the value of the Retry field may be set in various ways. In addition, although an example in which the interval between PPDUs is set to SIFS is illustrated in FIG. 41, the present disclosure is not limited thereto. According to an embodiment, the interval between PPDUs may be set in various ways.

Hereinafter, a specific example of the twelfth embodiment may be described with reference to FIG. 42.

Figure 42:
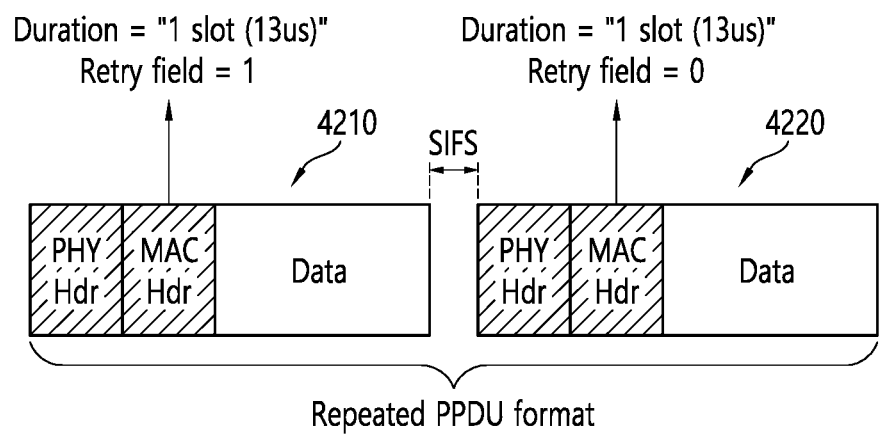
FIG. 42 shows an example in which information on a repeated PPDU format is transmitted based on the Duration/ID field, and information on the Number of repeated PPDUs is transmitted based on the Retry field.

FIG. 42 shows an example in which information on a repeated PPDU format is transmitted based on the Duration/ID field, and information on the Number of repeated PPDUs is transmitted based on the Retry field.

Referring to FIG. 42, a transmitting STA may transmit a first PPDU 4210 and a second PPDU 4220. The first PPDU 4210 and the second PPDU 4220 may be configured in an 11p PPDU format. The first PPDU 4210 and the second PPDU 4220 may include information on the repeated PPDU format and information on the Number of repeated PPDUs. Information on the repeated PPDU format may be included in the Duration/ID field of the MAC header. Information on the number of repeated PPDUs may be included in the Retry field.

The receiving STA (or the NGV STA) may identify that the Duration value of each PPDU is indicated by 1 slot. The receiving STA may know that the formats of the first PPDU 4210 and the second PPDU 4220 are the repeated PPDU format.

In addition, when the receiving STA receives the first PPDU 4210, since the value of the Retry field is set to "1", the receiving STA may find out that one more PPDU including the same data will be transmitted. Accordingly, the receiving STA may continue to receive the second PPDU 4220 after SIFS. Since the value of the Retry field in the second PPDU 4220 is set to "0", the receiving STA can know that the second PPDU 4220 is the last PPDU of the repeated PPDU format. Accordingly, the receiving STA may obtain a performance gain through combining the received PPDUs by using a total of two PPDUs including the same data (that is, the first PPDU 4210 and the second PPDU 4220).

The value of the Duration/ID field (that is, 1 slot (13 us)) and the value of the Retry field (that is, "1" or "0") shown in FIG. 42 are an example, and the present disclosure is not limited thereto. In order to transmit information about the repeated PPDU format and information about the Number of repeated PPDUs, the value of the Duration/ID field and the value of the Retry field may be set in various ways. In addition, although an example in which the interval between PPDUs is set to SIFS is illustrated in FIG. 42, the present disclosure is not limited thereto. According to an embodiment, the interval between PPDUs may be set in various ways.

(13) The Thirteenth Embodiment

According to the thirteenth embodiment, in order to transmit information about the repeated PPDU format, a Duration/ID field may be used. In addition, in order to transmit information about the Next PPDU Pointer or information about the Number of repeated PPDUs, a Frame body field may be used.

The transmitting STA may transmit information about the repeated PPDU format by using a specific Duration value in the Duration/ID field. When the Duration/ID field is set to the specific Duration value, the receiving STA may identify that the format of the received PPDU is a repeated PPDU format. That is, the receiving STA can know that the received 11p PPDU has been transmitted by the NGV STA (that is, the transmitting STA). However, the next PPDU of the received PPDU may not necessarily exist. That is, whether the next PPDU of the received PPDU exists may be indicated based on the Sequence Control field.

However, when the value of the Duration/ID field is set to "0" or more as in the conventionally defined rule, the NGV STA may set the NAV based on the set value. However, in the repeated PPDU format, the value of the Duration/ID field should be set smaller than the interval between PPDUs in order to receive the next PPDU. For example, if the interval between PPDUs of the repeated PPDU format is SIFS (for example, 32 us in the 802.11p standard), the value of the Duration/ID field should be set smaller than the SIFS.

For example, when the interval between the PPDUs is SIFS (32 us), possible values per slot, not exceeding 32 us, may be 0.5 slot (6 us or 7 us), 1 slot (13 us), 1.5 slot (18 us or 19 us), or 2 slot (26 us), etc. Accordingly, a value of the Duration/ID field may be set to at least one of 0.5 slot (6 us or 7 us), 1 slot (13 us), 1.5 slot (18 us or 19 us), or 2 slot (26 us). The value of the Duration/ID field is not limited to the above-described example, and may be set to various values.

According to an embodiment, in order to transmit information on the Next PPDU Pointer or information on the Number of repeated PPDUs, in the frame body field, at least one bit before actual information data begins may be utilized. The NGV STA that receives the PPDU (that is, the receiving STA) has identified that the format of the received PPDU is the repeated PPDU format based on the Duration/ID field. Accordingly, the NGV STA may check information about the Next PPDU Pointer or information about the Number of repeated PPDUs by checking at least one bit of the beginning of the frame body.

i) According to an embodiment, information about the Next PPDU Pointer may be transmitted through 1 bit before the actual information data starts. For example, when the 1 bit is set to a first value (for example, "1"), it may mean that the PPDU exists after a predetermined interval. When the 1 bit is set to the second value (for example, "0"), it may mean that the PPDU does not exist.

iii) According to an embodiment, information on the number of repeated PPDUs may be transmitted through at least one bit before actual information data starts. For example, at least one bit as many as the maximum supportable number in the repeated PPDU format may be used. In other words, the number of at least one bit may be set to the maximum supportable number in the repeated PPDU format.

For example, a value that can be set to at least one bit may mean the number of repeated PPDUs remaining in the future. For example, information on the number of repeated PPDUs may be transmitted through 2 bits before actual information data starts. If the 2 bit is set to "00", the number of repeated PPDUs remaining in the future may mean 0. If the 2 bit is set to "01", the number of repeated PPDUs remaining in the future may mean one. If the 2 bit is set to "10", the number of repeated PPDUs remaining in the future may mean two.

Hereinafter, a specific example of the thirteenth embodiment may be described with reference to FIG. 43.

Figure 43:
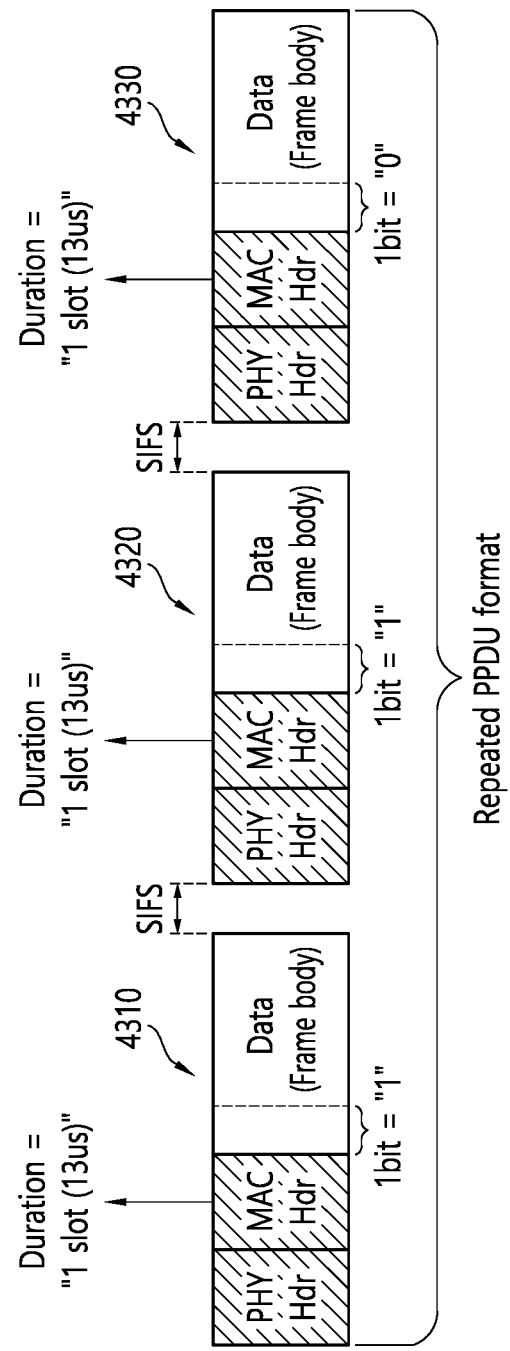
FIG. 43 shows an example in which information on the repeated PPDU format is transmitted based on the Duration/ID field, and information on the Next PPDU Pointer is transmitted based on 1 bit before actual information data starts.

FIG. 43 shows an example in which information on the repeated PPDU format is transmitted based on the Duration/ID field, and information on the Next PPDU Pointer is transmitted based on 1 bit before actual information data starts.

Referring to FIG. 43, a transmitting STA may transmit a first PPDU 4310, a second PPDU 4320, and a third PPDU 4330. The first PPDU 4310, the second PPDU 4320, and the third PPDU 4330 may be configured in an 11p PPDU format. The first PPDU 4310 to the third PPDU 4330 may include information on the repeated PPDU format and information on the Next PPDU Pointer. Information on the repeated PPDU format may be included in the Duration/ID field of the MAC header. Information on the Next PPDU Pointer may be included in 1 bit before the actual information data starts.

The receiving STA (or NGV STA) may confirm that the Duration value of each PPDU is indicated by 1 slot (13 us).

The receiving STA may know that the format of the first PPDU 4310 to the third PPDU 4330 is a repeated PPDU format.

In addition, when the receiving STA receives the first PPDU 4310, since the value of 1 bit before the actual information data starts is set to "1", the receiving STA may know that the second PPDU 4320 including the same data will be transmitted. Accordingly, the receiving STA may continue to receive the second PPDU 4320 after SIFS. In a similar way, since the value of the 1 bit is set to "1" in the second PPDU 4320, the receiving STA may also receive the third PPDU 4330 after SIFS. Since the value of 1 bit in the last third PPDU 4330 is set to "0", the receiving STA can know that the next PPDU does not exist after SIFS. Accordingly, the receiving STA may obtain a performance gain through combining the received PPDUs by using a total of three PPDUs including the same data (that is, the first PPDU 4310 to the third PPDU 4330).

The value of the Duration/ID field shown in FIG. 43 (that is, 1 slot (13 us)) and the value of 1 bit before the actual information data starts (that is, "1" or "0") are an example, and the present disclosure is not limited thereto. In order to transmit information on the repeated PPDU format and information on the Next PPDU Pointer, the value of the Duration/ID field and the value of the 1 bit may be set in various ways. In addition, in FIG. 43, an example in which the interval between PPDUs is set to SIFS is shown, however, the present disclosure is not limited thereto. According to an embodiment, the interval between PPDUs may be set in various ways.

Hereinafter, a specific example of the thirteenth embodiment may be described with reference to FIG. 44.

Figure 44:
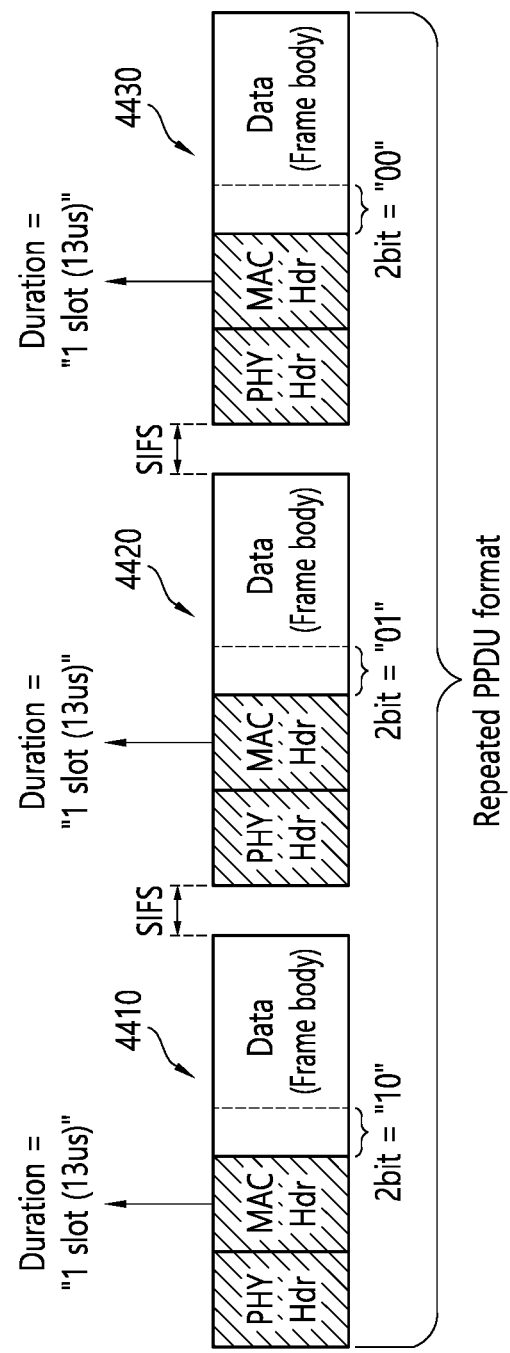
FIG. 44 shows an example in which information on the repeated PPDU format is transmitted based on the Duration/ID field, and information on the Number of repeated PPDUs is transmitted based on 2 bits before actual information data starts.

FIG. 44 shows an example in which information on the repeated PPDU format is transmitted based on the Duration/ID field, and information on the Number of repeated PPDUs is transmitted based on 2 bits before actual information data starts.

Referring to FIG. 44, a transmitting STA may transmit a first PPDU 4410, a second PPDU 4420, and a third PPDU 4430. The first PPDU 4410 to the third PPDU 4430 may be configured in an 11p PPDU format. The first PPDU 4410 to the third PPDU 4430 may include information on the repeated PPDU format and information on the Number of repeated PPDUs. Information on the repeated PPDU format may be included in the Duration/ID field of the MAC header. Information on the number of repeated PPDUs may be included in 2 bits before the actual information data starts.

The receiving STA (or NGV STA) may confirm that the Duration value of each PPDU is indicated by 1 slot. The receiving STA may know that the formats of the first PPDU 4410, the second PPDU 4420, and the third PPDU 4430 are the repeated PPDU format.

In addition, when the receiving STA receives the first PPDU 4410, since the value of 2 bits before the actual information data starts is set to "10", the receiving STA may know that two more PPDUs including the same data will be transmitted. Accordingly, the receiving STA may continue to receive the second PPDU 4420 after SIFS. Similarly, since the value of 2 bits in the second PPDU 4420 is set to "01", the receiving STA may know that one more PPDU including the same data will be transmitted. The receiving STA may also receive the third PPDU 4430 after SIFS. Since the value of 2 bits in the last third PPDU 4430 is set to "00", the receiving STA may know that the third PPDU 4430 is the last PPDU of the repeated PPDU format. Accordingly, the receiving STA may obtain a performance gain through combining the received PPDUs by using a total of three PPDUs including the same data (that is, the first PPDU 4410 to the third PPDU 4430).

The value of the Duration/ID field shown in FIG. 44 (that is, 1 slot (13 us)) and the value of 2 bits before the actual information data starts (that is, "10", "01" or "00") are examples, and the present disclosure is not limited thereto. In order to transmit information on the repeated PPDU format and information on the number of repeated PPDUs, the value of the Duration/ID field and the value of 2 bits may be set in various ways. In addition, in FIG. 44, an example in which the interval between PPDUs is set to SIFS is shown, however, the present disclosure is not limited thereto. According to an embodiment, the interval between PPDUs may be set in various ways.

(14) The Fourteenth Embodiment

According to the fourteenth embodiment, in order to transmit information on the repeated PPDU format, a Sequence Control field may be used. In addition, in order to transmit information on the Next PPDU Pointer or information on the number of repeated PPDUs, a Retry field may be used.

The transmitting STA may transmit information on the repeated PPDU format by using a specific sequence number (for example, "2000") in the Sequence Control field. When the Sequence Control field is set to the specific sequence number, the receiving STA may identify that the format of the received PPDU is a repeated PPDU format. That is, the receiving STA may know that the received 11p PPDU has been transmitted by the NGV STA (that is, the transmitting STA). However, the next PPDU of the received PPDU may not necessarily exist. That is, whether the next PPDU of the received PPDU exists may be indicated based on the Retry field.

Hereinafter, an example in which information on the Next PPDU Pointer or information on the number of repeated PPDUs is indicated/transmitted based on the Retry field may be described below.

i) According to an embodiment, information on the Next PPDU Pointer may be indicated/transmitted based on the Retry field. For example, if the value of the Retry field is a first value (for example, "1"), it may mean that the PPDU exists after a predetermined interval. If the value of the Retry field is a second value (for example, "0"), it may mean that the PPDU does not exist.

ii) According to an embodiment, information on the Number of repeated PPDUs may be indicated/transmitted based on the Retry field. For example, if the value of the Retry field is a first value (for example, "1"), it may mean that the number of PPDUs remaining in the future is one. If the value of the Retry field is a second value (for example, "0"), it may mean that the number of PPDUs remaining in the future is 0. When information on the number of repeated PPDUs is transmitted based on the Retry field, the information on the number of repeated PPDUs may indicate one of 0 and 1 of the remaining number of PPDUs.

Hereinafter, a specific example of the fourteenth embodiment may be described with reference to FIG. 45.

Figure 45:
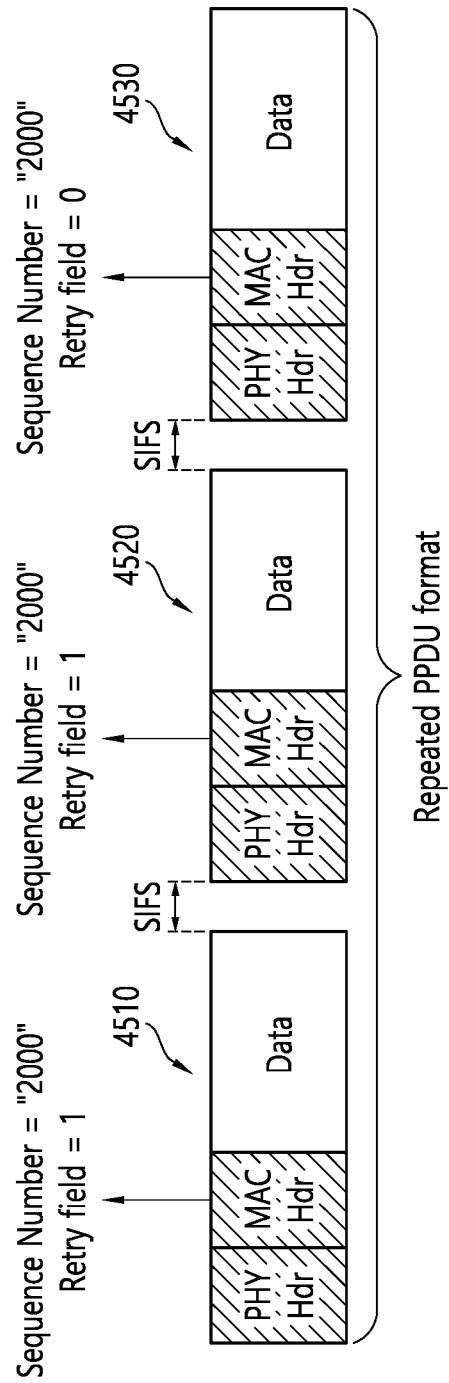
FIG. 45 shows an example in which information on the repeated PPDU format is transmitted based on the Sequence Control field and information on the Next PPDU Pointer is transmitted based on the Retry field.

FIG. 45 shows an example in which information on the repeated PPDU format is transmitted based on the Sequence Control field and information on the Next PPDU Pointer is transmitted based on the Retry field.

Referring to FIG. 45, a transmitting STA may transmit a first PPDU 4510, a second PPDU 4520, and a third PPDU 4530. The first PPDU 4510, the second PPDU 4520, and the third PPDU 4530 may be configured in an 11p PPDU format. The first PPDU 4510 to the third PPDU 4530 may include information on the repeated PPDU format and information on the Next PPDU Pointer. Information on the repeated PPDU format may be included in the Sequence Control field of the MAC header. Information on the Next PPDU Pointer may be included in the Retry field.

The receiving STA (or NGV STA) may identify that the sequence number of the Sequence Control field of each PPDU is indicated as "2000". The receiving STA may know that the format of the first PPDU 4510 to the third PPDU 4530 is a repeated PPDU format.

In addition, when the receiving STA receives the first PPDU 4510, since the value of the Retry field is set to "1", the receiving STA may know that the second PPDU 4520 including the same data will be transmitted. Accordingly, the receiving STA may continue to receive the second PPDU 4520 after SIFS. Similarly, since the value of the Retry field of the second PPDU 4520 is also set to "1", the receiving STA may also receive the third PPDU 4530 after SIFS. Since the value of the Retry field in the last third PPDU 4530 is set to "0", the receiving STA can know that the next PPDU after SIFS does not exist. Accordingly, the receiving STA may obtain a performance gain through combining the received PPDUs by using a total of three PPDUs including the same data (that is, the first PPDU 4510 to the third PPDU 4530).

The sequence number (that is, "2000") of the sequence control field and the value of the retry field (that is, "1" or "0") shown in FIG. 45 are an example, and the present disclosure is not limited thereto. In order to transmit information on the repeated PPDU format and information on the Next PPDU Pointer, the sequence number of the Sequence Control field and the value of the Retry field may be set in various ways. In addition, in FIG. 45, an example in which the interval between PPDUs is set to SIFS is shown, the present disclosure is not limited thereto. According to an embodiment, the interval between PPDUs may be set in various ways.

Hereinafter, a specific example of the fourteenth embodiment may be described with reference to FIG. 46.

Figure 46:
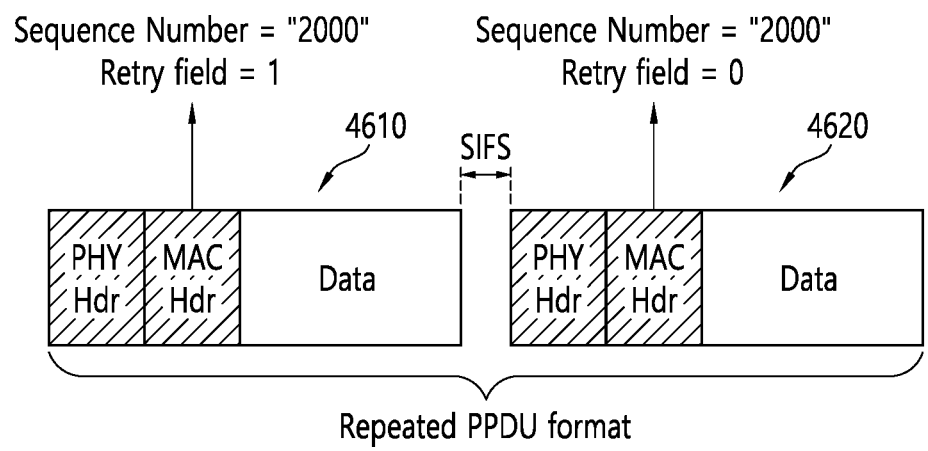
FIG. 46 shows an example in which information on the repeated PPDU format is transmitted based on the Sequence Control field and information on the Number of repeated PPDUs is transmitted based on the Retry field.

FIG. 46 shows an example in which information on the repeated PPDU format is transmitted based on the Sequence Control field and information on the Number of repeated PPDUs is transmitted based on the Retry field.

Referring to FIG. 46, a transmitting STA may transmit a first PPDU 4610 and a second PPDU 4620. The first PPDU 4610 and the second PPDU 4620 may be configured in an 11p PPDU format. The first PPDU 4610 and the second PPDU 4620 may include information on the repeated PPDU format and information on the Number of repeated PPDUs. Information on the repeated PPDU format may be included in the Sequence Control field of the MAC header. Information about the number of repeated PPDUs may be included in the Retry field.

The receiving STA (or NGV STA) may confirm that the sequence number of the Sequence Control field of each PPDU is indicated as "2000". The receiving STA may know that the formats of the first PPDU 4610 and the second PPDU 4620 are the repeated PPDU format.

Also, when the receiving STA receives the first PPDU 4610, since the value of the Retry field is set to "1", the receiving STA may know that one more PPDU including the same data will be transmitted. Accordingly, the receiving STA may continue to receive the second PPDU 4620 after SIFS. Since the value of the Retry field in the second PPDU 4620 is set to "0", the receiving STA can know that the second PPDU 4620 is the last PPDU of the repeated PPDU format. Accordingly, the receiving STA may obtain a performance gain through combining the received PPDUs by using a total of two PPDUs including the same data (that is, the first PPDU 4610 and the second PPDU 4620).

The sequence number (that is, "2000") of the sequence control field and the value of the retry field (that is, "1" or "0") shown in FIG. 46 are an example, and the present disclosure is not limited thereto. In order to transmit information on the repeated PPDU format and information on the number of repeated PPDUs, the sequence number of the Sequence Control field and the value of the Retry field may be set in various ways. In addition, in FIG. 46, an example in which the interval between PPDUs is set to SIFS is shown, however, the present disclosure is not limited thereto. According to an embodiment, the interval between PPDUs may be set in various ways.

(15) The Fifteenth Embodiment

According to the fifteenth embodiment, in order to transmit information about the repeated PPDU format, a Sequence Control field may be used. In addition, in order to transmit information on the Next PPDU Pointer or information on the number of repeated PPDUs, a Frame body field may be used.

The transmitting STA may transmit information on the repeated PPDU format by using a specific sequence number (for example, "1000") in the Sequence Control field. When the Sequence Control field is set to the specific sequence number, the receiving STA may identify that the format of the received PPDU is a repeated PPDU format. That is, the receiving STA can know that the received 11p PPDU has been transmitted by the NGV STA (that is, the transmitting STA). However, the next PPDU of the received PPDU may not necessarily exist. That is, whether the next PPDU of the received PPDU exists may be indicated based on the Frame body field.

According to an embodiment, in order to transmit information on the Next PPDU Pointer or information on the Number of repeated PPDUs, at least one bit before the actual information data starts may be used in the Frame body field. The NGV STA that receives the PPDU (that is, the receiving STA) has identified that the format of the received PPDU is the repeated PPDU format based on the Sequence Control field. Accordingly, the NGV STA may check information about the Next PPDU Pointer or information about the number of repeated PPDUs by checking at least one bit of the beginning of the frame body.

i) According to an embodiment, information about the Next PPDU Pointer may be transmitted through 1 bit before the actual information data starts. For example, when the 1 bit is set to a first value (for example, "1"), it may mean that the PPDU exists after a predetermined interval. When the 1 bit is set to the second value (for example, "0"), it may mean that the PPDU does not exist.

ii) According to an embodiment, information on the number of repeated PPDUs may be transmitted through at least one bit before the actual information data starts. For example, at least one bit as many as the maximum supportable number in the repeated PPDU format may be used. In other words, the number of at least one bit may be set to the maximum supportable number in the repeated PPDU format.

For example, a value that can be set to at least one bit may mean the number of repeated PPDUs remaining in the future. For example, information on the number of repeated PPDUs may be transmitted through 2 bits before actual information data starts. If the 2 bit is set to "00", the number of repeated PPDUs remaining in the future may mean 0. If the 2 bit is set to "01", the number of repeated PPDUs remaining in the future may mean one. If the 2 bit is set to "10", the number of repeated PPDUs remaining in the future may mean two.

Hereinafter, a specific example of the fifteenth embodiment may be described with reference to FIG. 47.

Figure 47:
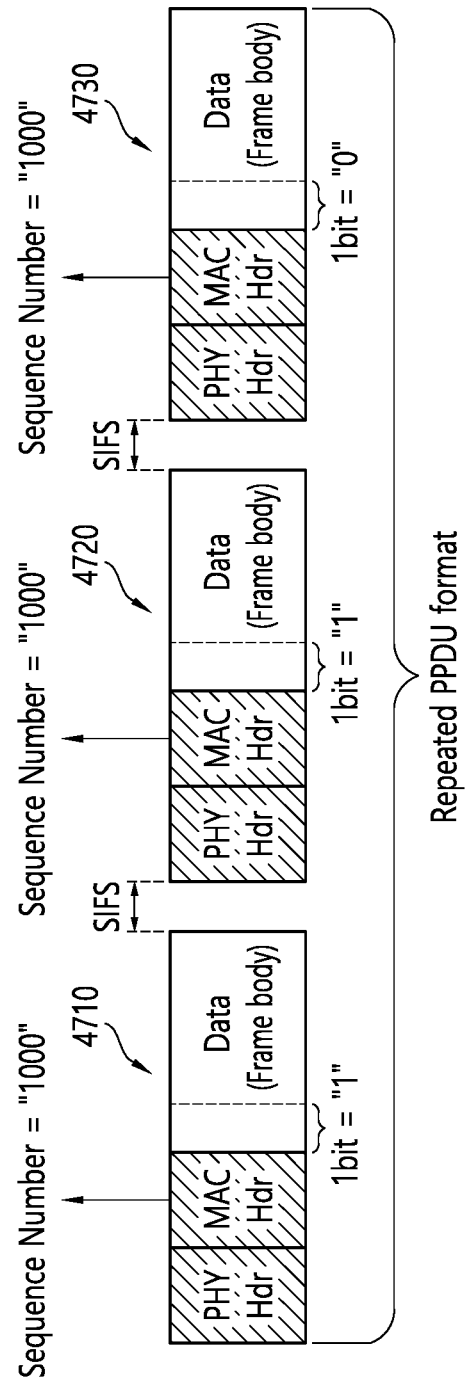
FIG. 47 shows an example in which information on the repeated PPDU format is transmitted based on the Sequence Control field, and information on the Next PPDU Pointer is transmitted based on 1 bit before actual information data starts.

FIG. 47 shows an example in which information on the repeated PPDU format is transmitted based on the Sequence Control field, and information on the Next PPDU Pointer is transmitted based on 1 bit before actual information data starts.

Referring to FIG. 47, a transmitting STA may transmit a first PPDU 4710, a second PPDU 4720, and a third PPDU 4730. The first PPDU 4710, the second PPDU 4720, and the third PPDU 4730 may be configured in an 11p PPDU format. The first PPDU 4710 to the third PPDU 4730 may include information on the repeated PPDU format and information on the Next PPDU Pointer. Information on the repeated PPDU format may be included in the Sequence Control field of the MAC header. Information on the Next PPDU Pointer may be included in 1 bit before the actual information data starts.

The receiving STA (or NGV STA) may identify that the sequence number of the Sequence Control field of each PPDU is indicated as "1000". The receiving STA may know that the format of the first PPDU 4710 to the third PPDU 4730 is a repeated PPDU format.

In addition, when the receiving STA receives the first PPDU 4710, since the value of 1 bit before the actual information data starts is set to "1", the receiving STA may know that the second PPDU 4720 including the same data will be transmitted. Accordingly, the receiving STA may continue to receive the second PPDU 4720 after SIFS. Similarly, since the value of the 1 bit is set to "1" in the second PPDU 4720, the receiving STA may also receive the third PPDU 4730 after SIFS. Since the value of 1 bit in the last third PPDU 4730 is set to "0", the receiving STA can know that the next PPDU after SIFS does not exist. Accordingly, the receiving STA may obtain a performance gain through combining the received PPDUs by using a total of three PPDUs including the same data (that is, the first PPDU 4710 to the third PPDU 4730).

The sequence number (that is, "1000") of the Sequence Control field and the value of 1 bit before the actual information data starts (that is, "1" or "0") shown in FIG. 47 are an example, and the present disclosure is not limited thereto. In order to transmit information on the repeated PPDU format and information on the Next PPDU Pointer, the sequence number of the Sequence Control field and the value of 1 bit may be set in various ways. Also, in FIG. 47, an example in which the interval between PPDUs is set to SIFS is shown, however, the present disclosure is not limited thereto. According to an embodiment, the interval between PPDUs may be set in various ways.

Hereinafter, a specific example of the fifteenth embodiment may be described with reference to FIG. 48.

Figure 48:
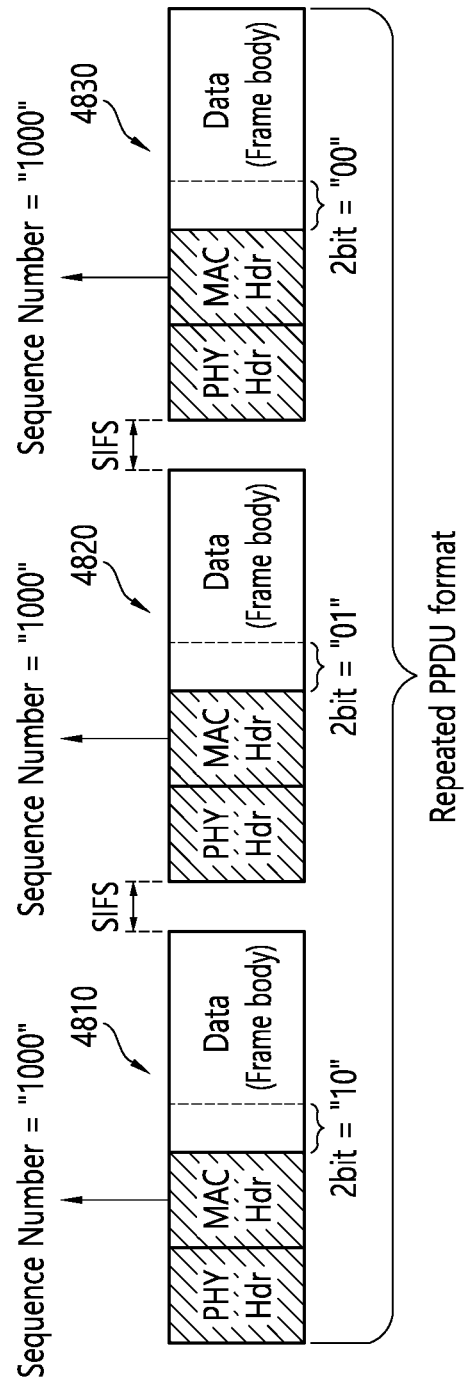
FIG. 48 shows an example in which information on the repeated PPDU format is transmitted based on the Sequence Control field, and information on the Number of repeated PPDUs is transmitted based on 2 bits before actual information data starts.

FIG. 48 shows an example in which information on the repeated PPDU format is transmitted based on the Sequence Control field, and information on the Number of repeated PPDUs is transmitted based on 2 bits before actual information data starts.

Referring to FIG. 48, a transmitting STA may transmit a first PPDU 4810, a second PPDU 4820, and a third PPDU 4830. The first PPDU 4810 to the third PPDU 4830 may be configured in an 11p PPDU format. The first PPDU 4810 to the third PPDU 4830 may include information on the repeated PPDU format and information on the number of repeated PPDUs. Information on the repeated PPDU format may be included in the Sequence Control field of the MAC header. Information about the number of repeated PPDUs may be included in 2 bits before the actual information data starts.

The receiving STA (or NGV STA) may identify that the sequence number of the Sequence Control field of each PPDU is indicated as "1000". The receiving STA may know that the format of the first PPDU 4810 to the third PPDU 4830 is a repeated PPDU format.

In addition, when the receiving STA receives the first PPDU 4810, since the value of 2 bits before the actual information data starts is set to "10", the receiving STA may know that two more PPDUs including the same data will be transmitted. Accordingly, the receiving STA may continue to receive the second PPDU 4820 after SIFS. Similarly, since the value of 2 bits in the second PPDU 4820 is set to "01", the receiving STA may know that one more PPDU including the same data will be transmitted. The receiving STA may also receive the third PPDU 4830 after SIFS. Since the value of 2 bits in the last third PPDU 4830 is set to "00", the receiving STA can know that the third PPDU 4830 is the last PPDU of the repeated PPDU format. Accordingly, the receiving STA may obtain a performance gain through combining the received PPDUs by using a total of three PPDUs including the same data (that is, the first PPDU 4810 to the third PPDU 4830).

The sequence number (that is, "1000") of the Sequence Control field shown in FIG. 48 and the value of 2 bits before the actual information data starts (that is, "10", "01" or "00") are an example, and the present disclosure is not limited thereto. In order to transmit information on the repeated PPDU format and information on the number of repeated PPDUs, the sequence number of the Sequence Control field and the value of 2 bits may be set in various ways. In addition, in FIG. 48, an example in which the interval between PPDUs is set to SIFS is shown, however, the present disclosure is not limited thereto. According to an embodiment, the interval between PPDUs may be set in various ways.

(16) The Sixteenth Embodiment

According to the sixteenth embodiment, in order to transmit information on the repeated PPDU format, a Retry field (or Retry subfield) of the Frame Control field of the MAC header may be used. In addition, in order to transmit information about the Next PPDU Pointer or information about the number of repeated PPDUs, a Duration/ID field may be used.

The transmitting STA may transmit information about the repeated PPDU format through the Retry field. For example, if the value of the Retry field is a first value (for example, "1"), the receiving STA (or NGV STA) may identify that the format of the received PPDU is the Repeated PPDU format. If the value of the Retry field is a second value (for example, "0"), the NGV STA may identify that the format of the received PPDU is not the Repeated PPDU format. That is, the receiving STA can know that the received 11p PPDU has been transmitted by the NGV STA (that is, the transmitting STA). However, the next PPDU of the received PPDU may not necessarily exist. That is, whether the next PPDU of the received PPDU exists may be indicated based on the Duration/ID field.

In order to transmit information about the Next PPDU Pointer or information about the Number of repeated PPDUs, the Duration/ID field may be used. In this case, in order not to affect the 11p STA, the value of the Duration/ID field should be set smaller than the interval between PPDUs. For example, if the interval between PPDUs of the repeated PPDU format is SIFS (for example, 32 us in the 802.11p standard), the value of the Duration/ID field should be set smaller than the SIFS.

For example, when the interval between the PPDUs is SIFS (32 us), possible values per slot, not exceeding 32 us, may be 0.5 slot (6 us or 7 us), 1 slot (13 us), 1.5 slot (18 us or 19 us), or 2 slot (26 us), etc. Accordingly, a value of the Duration/ID field may be set to at least one of 0.5 slot (6 us or 7 us), 1 slot (13 us), 1.5 slot (18 us or 19 us), or 2 slot (26 us). The value of the Duration/ID field is not limited to the above-described example, and may be set to various values.

According to an embodiment, information on the Next PPDU Pointer or information on the number of repeated PPDU may be transmitted through at least one value of the Duration/ID field.

i) According to an embodiment, in the Duration/ID field, information about the Next PPDU Pointer may be transmitted through one specific duration value (hereinafter, the first value). For example, if the Duration/ID field is set to the first value, it may mean that the PPDU exists after a predetermined interval. If the Duration/ID field is not set to the first value, it may mean that the PPDU does not exist.

ii) According to an embodiment, in the Duration/ID field, information on the Next PPDU Pointer may be transmitted through two specific duration values. For example, two duration values may be referred to as 'A' and 'B'. When the Duration/ID field is set to 'A', it may mean that the PPDU exists after a predetermined interval. If the Duration/ID field is set to 'B', it may mean that the PPDU does not exist.

iii) According to an embodiment, information about the number of repeated PPDUs may be transmitted through the Duration/ID field. For example, the value of the Duration/ID field as many as the maximum supported number in the repeated PPDU format may be used. The value of each Duration/ID field may mean the number of repeated PPDUs remaining in the future.

As an example, three values of the Duration/ID field may be set (that is, 'A', 'B', 'C'). In this case, 'A' may be set to mean two repeated PPDUs remaining in the future, 'B' may be set to mean one repeated PPDU remaining in the future, and 'C' may be set to mean zero repeated PPDU remaining in the future.

Hereinafter, a specific example of the sixteenth embodiment may be described with reference to FIG. 49.

Figure 49:
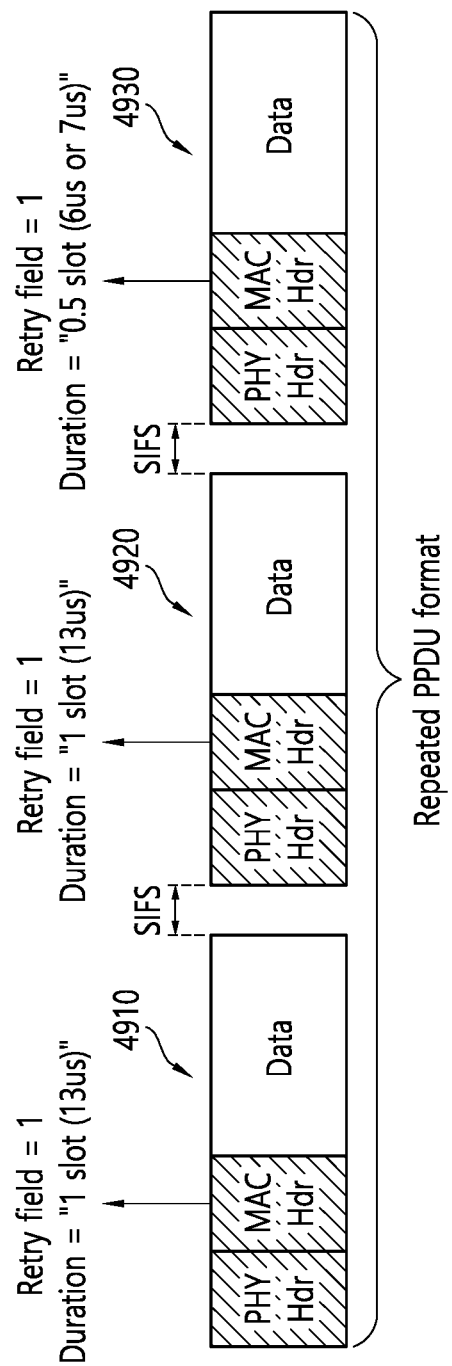
FIG. 49 shows an example in which information on the repeated PPDU format is transmitted based on the Retry field, and information on the Next PPDU Pointer is transmitted based on the Duration/ID field.

FIG. 49 shows an example in which information on the repeated PPDU format is transmitted based on the Retry field, and information on the Next PPDU Pointer is transmitted based on the Duration/ID field.

Referring to FIG. 49, a transmitting STA may transmit a first PPDU 4910, a second PPDU 4920, and a third PPDU 4930. The first PPDU 4910, the second PPDU 4920, and the third PPDU 4930 may be configured in an 11p PPDU format. The first PPDU 4910 to the third PPDU 4930 may include information on the repeated PPDU format and information on the Next PPDU Pointer. Information on the repeated PPDU format may be included in the Retry field. Information on the Next PPDU Pointer may be included in the Duration/ID field.

The receiving STA (or NGV STA) may identify that the value of the Retry field of each PPDU is indicated as "1".

The receiving STA may know that the format of the first PPDU 4910 to the third PPDU 4930 is a repeated PPDU format.

In addition, when the receiving STA receives the first PPDU 4910, since the value of the Duration/ID field is set to 1 slot (13 us), the receiving STA may know that the second PPDU 4920 including the same data will be transmitted. Accordingly, the receiving STA may continue to receive the second PPDU 4920 after SIFS. Similarly, since the value of the Duration/ID field of the second PPDU 4920 is also set to 1 slot (13 us), the receiving STA may also receive the third PPDU 4930 after SIFS. Since the value of the Duration/ID field in the last third PPDU 4930 is set to 0.5 slot (6 us or 7 us), the receiving STA can know that the next PPDU does not exist after SIFS. Accordingly, the receiving STA may obtain a performance gain through combining the received PPDUs by using a total of three PPDUs including the same data (that is, the first PPDU 4910 to the third PPDU 4930).

The value of the Retry field (that is, "1") and the value of the Duration/ID field (that is, 1 slot or 0.5 slot) shown in FIG. 49 are an example, and the present is not limited thereto. In order to transmit information on the repeated PPDU format and information on the Next PPDU Pointer, the value of the Retry field and the value of the Duration/ID field may be set in various ways. In addition, in FIG. 49, an example in which the interval between PPDUs is set to SIFS is shown, however, the present disclosure is not limited thereto. According to an embodiment, the interval between PPDUs may be set in various ways.

(17) The Seventeenth Embodiment

According to the seventeenth embodiment, in order to transmit information on the repeated PPDU format, a Retry field (or Retry subfield) of the Frame Control field of the MAC header may be used. In addition, in order to transmit information about the Next PPDU Pointer or information about the number of repeated PPDUs, a Sequence Control field may be used.

The transmitting STA may transmit information about the repeated PPDU format through the Retry field. For example, if the value of the Retry field is a first value (for example, "1"), the receiving STA (or NGV STA) may identify that the format of the received PPDU is the Repeated PPDU format. If the value of the Retry field is a second value (for example, "0"), the NGV STA may identify that the format of the received PPDU is not the Repeated PPDU format. That is, the receiving STA can know that the received 11p PPDU has been transmitted by the NGV STA (that is, the transmitting STA). However, the next PPDU of the received PPDU may not necessarily exist. That is, whether the next PPDU of the received PPDU exists may be indicated based on the Sequence Control field.

According to an embodiment, information on a Next PPDU Pointer or information on a number of repeated PPDU may be transmitted through at least one sequence number of the Sequence Control field.

i) According to an embodiment, in the Sequence Control field, information on the Next PPDU Pointer may be transmitted through a specific sequence number. For example, if the Sequence Control field is set to a specific sequence number, it may mean that the PPDU exists after a predetermined interval. If the Sequence Control field is not set to a specific sequence number, it may mean that the PPDU does not exist.

ii) According to an embodiment, in the Sequence Control field, information on the Next PPDU Pointer may be transmitted through two specific sequence numbers. For example, two specific sequence numbers may be called 'A' and 'B'. When the Sequence Control field is set to 'A', it may mean that the PPDU exists after a predetermined interval. If the Sequence Control field is set to 'B', it may mean that the PPDU does not exist.

iii) According to an embodiment, information about the number of repeated PPDUs may be transmitted through the Sequence Control field. For example, in the repeated PPDU format, the maximum number of sequence numbers that can be supported may be used. The sequence number of each Sequence Control field may mean the number of repeated PPDUs remaining in the future.

For example, three sequence numbers (that is, 'A', 'B', and 'C') that can configure the Sequence Control field may be set. In this case, 'A' may be set to mean two repeated PPDUs remaining in the future, 'B' may be set to mean one repeated PPDU remaining in the future, and 'C' may be set to mean zero repeated PPDU remaining in the future.

Hereinafter, a specific example of the seventeenth embodiment may be described with reference to FIG. 50.

Figure 50:
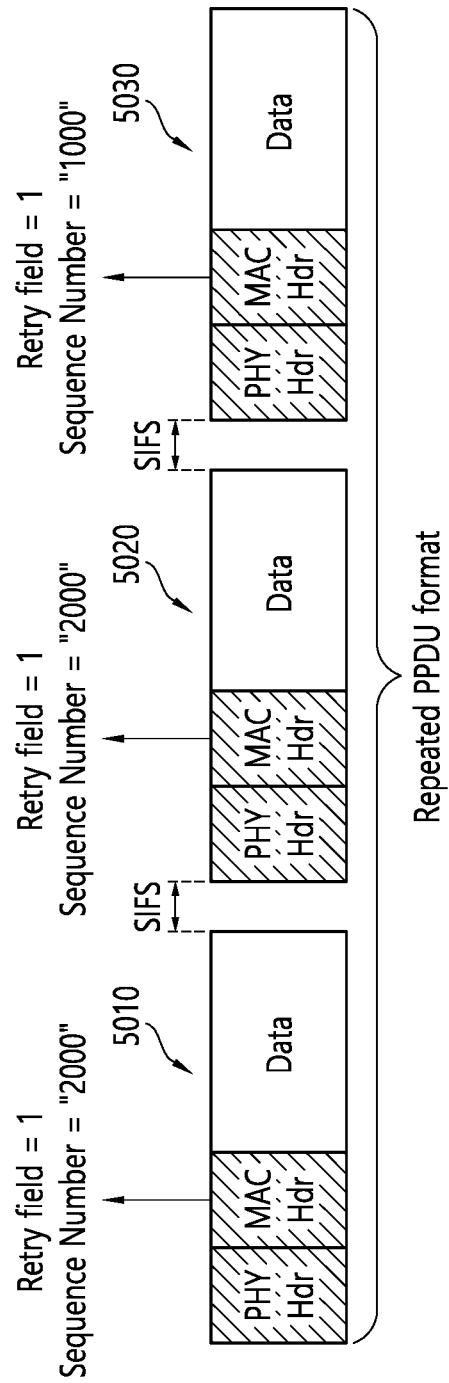
FIG. 50 shows an example in which information on the repeated PPDU format is transmitted based on the Retry field and information on the Next PPDU Pointer is transmitted based on the Sequence Control field.

FIG. 50 shows an example in which information on the repeated PPDU format is transmitted based on the Retry field and information on the Next PPDU Pointer is transmitted based on the Sequence Control field.

Referring to FIG. 50, a transmitting STA may transmit a first PPDU 5010, a second PPDU 5020, and a third PPDU 5030. The first PPDU 5010, the second PPDU 5020, and the third PPDU 5030 may be configured in an 11p PPDU format. The first PPDU 5010 to the third PPDU 5030 may include information on the repeated PPDU format and information on the Next PPDU Pointer. Information on the repeated PPDU format may be included in the Retry field. Information on the Next PPDU Pointer may be included in the Sequence Control field.

The receiving STA (or NGV STA) may identify that the value of the Retry field of each PPDU is indicated as "1". The receiving STA may know that the format of the first PPDU 5010 to the third PPDU 5030 is a repeated PPDU format.

In addition, when the receiving STA receives the first PPDU 5010, since the sequence number (or sequence) is set to "2000", the receiving STA may know that the second PPDU 5020 including the same data will be transmitted. Accordingly, the receiving STA may continue to receive the second PPDU 5020 after SIFS. Similarly, since the sequence number of the second PPDU 5020 is also set to "2000", the receiving STA may also receive the third PPDU 5030 after SIFS. Since the sequence number is set to "1000" in the last third PPDU 5030, the receiving STA can know that the next PPDU does not exist after SIFS. Accordingly, the receiving STA may obtain a performance gain through combining the received PPDUs by using a total of three PPDUs including the same data (that is, the first PPDU 5010 to the third PPDU 5030).

The value of the Retry field (that is, "1") and the sequence number (that is, "1000" or "2000") of the Sequence Control field shown in FIG. 50 are an example, and the present disclosure is not limited thereto. In order to transmit information on the repeated PPDU format and information on the Next PPDU Pointer, the value of the Retry field and the sequence number of the Sequence Control field may be set in various ways. In addition, in FIG. 50, an example in which the interval between PPDUs is set to SIFS is shown, the present disclosure is not limited thereto. According to an embodiment, the interval between PPDUs may be set in various ways.

(18) The Eighteenth Embodiment

According to the eighteenth embodiment, in order to transmit information on the repeated PPDU format, a Retry field (or Retry subfield) of the Frame Control field of the MAC header may be used. In addition, in order to transmit information about the Next PPDU Pointer or information about the number of repeated PPDUs, a Frame body field may be used.

The transmitting STA may transmit information about the repeated PPDU format through the Retry field. For example, if the value of the Retry field is a first value (for example, "1"), the receiving STA (or NGV STA) may identify that the format of the received PPDU is the Repeated PPDU format. If the value of the Retry field is a second value (for example, "0"), the NGV STA may identify that the format of the received PPDU is not the Repeated PPDU format. That is, the receiving STA can know that the received 11p PPDU has been transmitted by the NGV STA (that is, the transmitting STA). However, the next PPDU of the received PPDU may not necessarily exist. That is, whether the next PPDU of the received PPDU exists may be indicated based on the Frame body field.

According to an embodiment, in order to transmit information on the Next PPDU Pointer or information on the number of repeated PPDUs, at least one bit before the actual information data starts may be used in the Frame body field. The NGV STA that receives the PPDU (that is, the receiving STA) has identified that the format of the received PPDU is the repeated PPDU format based on the Retry field. Accordingly, the NGV STA may check information about the Next PPDU Pointer or information about the number of repeated PPDUs by checking at least one bit of the beginning of the frame body.

i) According to an embodiment, information about the Next PPDU Pointer may be transmitted through 1 bit before the actual information data starts. For example, when the 1 bit is set to a first value (for example, "1"), it may mean that the PPDU exists after a predetermined interval. When the 1 bit is set to the second value (for example, "0"), it may mean that the PPDU does not exist.

ii) According to an embodiment, information on the number of repeated PPDUs may be transmitted through at least one bit before the actual information data starts. For example, at least one bit as many as the maximum supportable number in the repeated PPDU format may be used. In other words, the number of at least one bit may be set to the maximum supportable number in the repeated PPDU format.

For example, a value that can be set to at least one bit may mean the number of repeated PPDUs remaining in the future. As an example, information on the number of repeated PPDUs may be transmitted through 2 bits before actual information data starts. If the 2 bit is set to "00", the number of repeated PPDUs remaining in the future may mean 0. If the 2 bit is set to "01", the number of repeated PPDUs remaining in the future may mean one. If the 2 bit is set to "10", the number of repeated PPDUs remaining in the future may mean two.

Hereinafter, a specific example of the eighteenth embodiment may be described with reference to FIG. 51.

Figure 51:
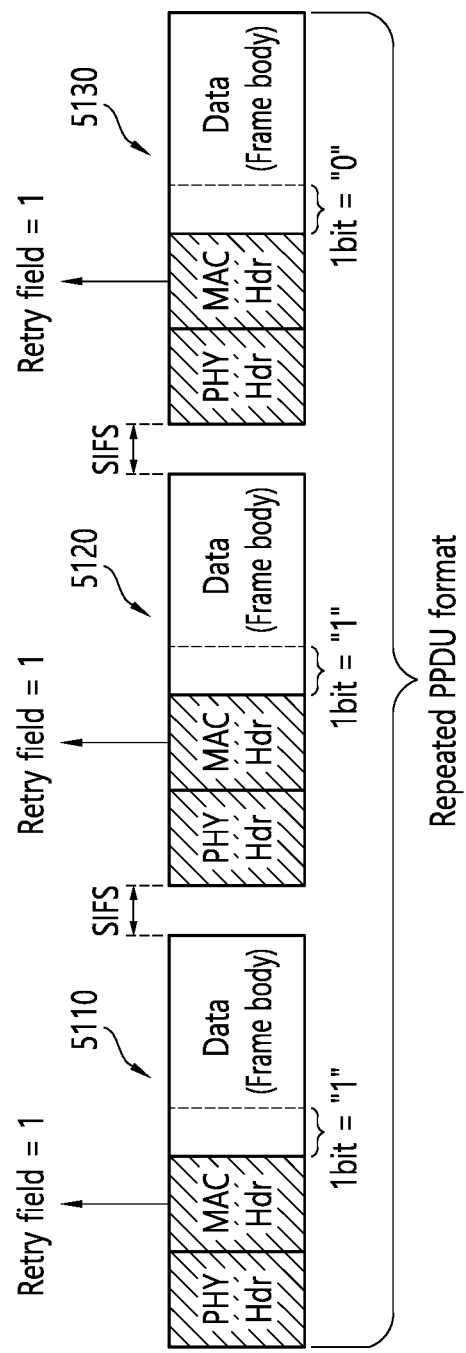
FIG. 51 shows an example in which information on the repeated PPDU format is transmitted based on the Retry field, and information on the Next PPDU Pointer is transmitted based on 1 bit before actual information data starts.

FIG. 51 shows an example in which information on the repeated PPDU format is transmitted based on the Retry field, and information on the Next PPDU Pointer is transmitted based on 1 bit before actual information data starts.

Referring to FIG. 51, a transmitting STA may transmit a first PPDU 5110, a second PPDU 5120, and a third PPDU 5130. The first PPDU 5110, the second PPDU 5120, and the third PPDU 5130 may be configured in an 11p PPDU format. The first PPDU 5110 to the third PPDU 5130 may include information on the repeated PPDU format and information on the Next PPDU Pointer. Information on the repeated PPDU format may be included in the Retry field. Information on the Next PPDU Pointer may be included in 1 bit before the actual information data starts.

The receiving STA (or NGV STA) may identify that the value of the Retry field of each PPDU is indicated as "1". The receiving STA may know that the format of the first PPDU 5110 to the third PPDU 5130 is the repeated PPDU format.

In addition, when the receiving STA receives the first PPDU 5110, since the value of 1 bit before the actual information data starts is set to "1", the receiving STA may know that the second PPDU 5120 including the same data will be transmitted. Accordingly, the receiving STA may continue to receive the second PPDU 5120 after SIFS. Similarly, since the value of the 1 bit is set to "1" in the second PPDU 5120, the receiving STA may also receive the third PPDU 5130 after SIFS. Since the value of 1 bit in the last third PPDU 5130 is set to "0", the receiving STA can know that the next PPDU does not exist after SIFS. Accordingly, the receiving STA may obtain a performance gain through combining the received PPDUs by using a total of three PPDUs including the same data (that is, the first PPDU 5110 to the third PPDU 5130).

As shown in FIG. 51, the value of the retry field (that is, "1") and the value of 1 bit before the actual information data starts (that is, "1" or "0") are an example, and the present disclosure is not limited thereto. In order to transmit information on the repeated PPDU format and information on the Next PPDU Pointer, the value of the Retry field and the value of the 1 bit may be set in various ways. In addition, in FIG. 51, an example in which the interval between PPDUs is set to SIFS is shown, however, the present disclosure is not limited thereto. According to an embodiment, the interval between PPDUs may be set in various ways.

Hereinafter, a specific example of the eighteenth embodiment may be described with reference to FIG. 52.

Figure 52:
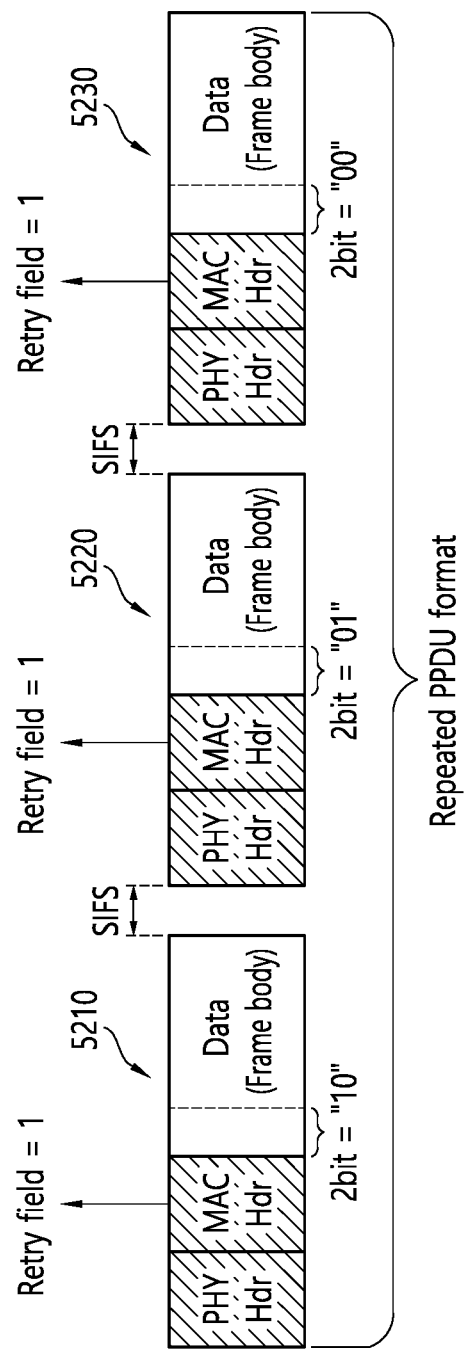
FIG. 52 shows an example in which information on the repeated PPDU format is transmitted based on the Retry field, and information on the number of repeated PPDUs is transmitted based on 2 bits before actual information data starts.

FIG. 52 shows an example in which information on the repeated PPDU format is transmitted based on the Retry field, and information on the number of repeated PPDUs is transmitted based on 2 bits before actual information data starts.

Referring to FIG. 52, a transmitting STA may transmit a first PPDU 5210, a second PPDU 5220, and a third PPDU 5230. The first PPDU 5210 to the third PPDU 5230 may be configured in an 11p PPDU format. The first PPDU 5210 to the third PPDU 5230 may include information on the repeated PPDU format and information on the number of repeated PPDUs. Information on the repeated PPDU format may be included in the Retry field of the MAC header. Information about the number of repeated PPDUs may be included in 2 bits before the actual information data starts.

The receiving STA (or NGV STA) may identify that the value of the Retry field of each PPDU is indicated/set to "1". The receiving STA may know that the format of the first PPDU 5210 to the third PPDU 5230 is a repeated PPDU format.

In addition, when the receiving STA receives the first PPDU 5210, since the value of 2 bits before the actual information data starts is set to "10", the receiving STA may know that two more PPDUs including the same data will be transmitted. Accordingly, the receiving STA may continue to receive the second PPDU 5220 after SIFS. Similarly, since the value of 2 bits in the second PPDU 5220 is set to "01", the receiving STA may know that one more PPDU including the same data will be transmitted. The receiving STA may also receive the third PPDU 5230 after SIFS. Since the value of 2 bits in the last third PPDU 5230 is set to "00", the receiving STA can know that the third PPDU 5230 is the last PPDU of the repeated PPDU format. Accordingly, the receiving STA may obtain a performance gain through combining the received PPDUs by using a total of three PPDUs including the same data (that is, the first PPDU 5210 to the third PPDU 5230).

The value of the Retry field shown in FIG. 52 (that is, "1") and the value of 2 bits before the actual information data starts (that is, "10", "01" or "00") are an example, and the present disclosure is not limited thereto. In order to transmit information on the repeated PPDU format and information on the number of repeated PPDUs, the value of the Retry field and the value of 2 bits may be set in various ways. In addition, in FIG. 52, an example in which the interval between PPDUs is set to SIFS is illustrated, however, the present disclosure is not limited thereto. According to an embodiment, the interval between PPDUs may be set in various ways.

4. Example for Reducing Decoding Overhead

Hereinafter, an embodiment for reducing decoding overhead when decoding a PPDU in a repeated PPDU format may be described. The receiving STA (that is, the NGV STA) may identify that the format of the received PPDU is the repeated PPDU format based on MAC or PHY signaling. In order for the receiving STA to identify that the format of the received PPDU is a repeated PPDU format based on MAC or PHY signaling, the first to eighteenth embodiments may be applied, but the present disclosure is not limited thereto. The receiving STA may identify that the format of the received PPDU is the repeated PPDU format based on various methods.

The receiving STA may succeed in decoding one of the PPDUs transmitted in the repeated PPDU format. Then, the receiving STA may not need to decode the next received PPDU. Accordingly, the receiving STA may filter the next received PPDU. Hereinafter, an embodiment in which the receiving STA filters the next received PPDU may be described. According to an embodiment, a filtering process of the 802.11ac standard or the 802.11ax standard may be applied to the filtering process.

The receiving STA may perform filtering in the following order.

i) The receiving STA may succeed in decoding one PPDU (hereinafter, a first PPDU) among PPDUs of the repeated PPDU format.

ii) The receiving STA may identify, based on the first PPDU, that there is a PPDU following the first PPDU (hereinafter, referred to as a second PPDU). Thereafter, the receiving STA may receive the second PPDU and identify that the second PPDU is in the Repeated PPDU format. The receiving STA may stop decoding the second PPDU. The receiving STA may predict a time to defer channel access based on the length obtained/extracted from the second PPDU.

iii) The receiving STA may defer channel access without further decoding the second PPDU based on the predicted time.

Figure 53:
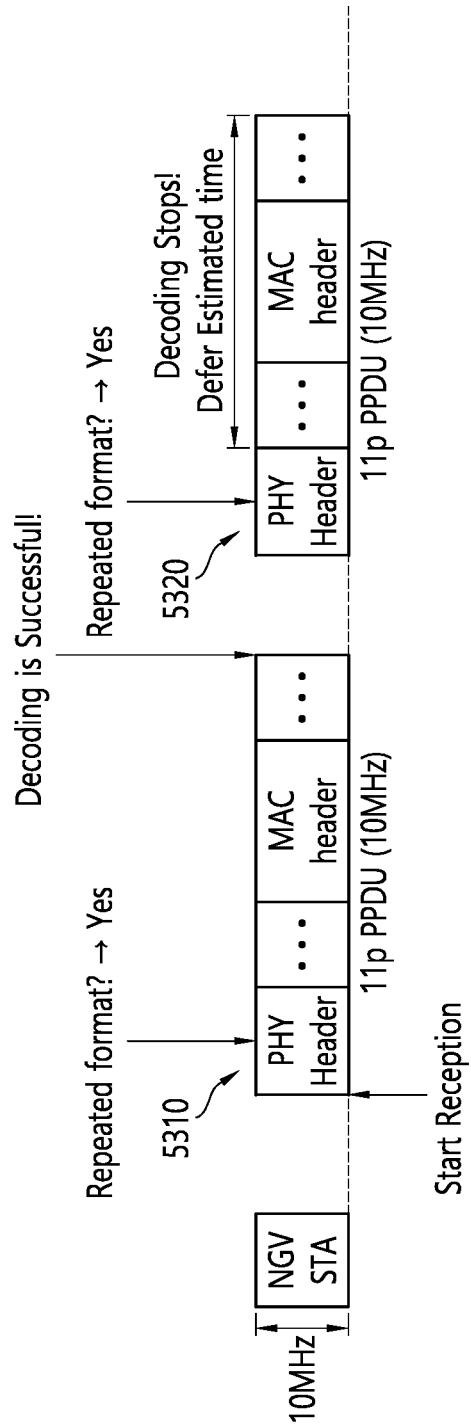
FIG. 53 is a diagram for explaining the process of filtering a PPDU of a repeated PPDU format in an NGV STA.

FIG. 53 is a diagram for explaining the process of filtering a PPDU of a repeated PPDU format in an NGV STA.

Referring to FIG. 53, the first PPDU 5310 and the second PPDU 5320 may be configured in an 11p PPDU format. The first PPDU 5310 and the second PPDU 5320 may include information about the repeated PPDU format. In addition, the first PPDU 5310 and the second PPDU 5320 may include information on the Next PPDU Pointer or information on the number of repeated PPDUs.

According to an embodiment, the NGV STA may receive the first PPDU 5310. The NGV STA may succeed in decoding the first PPDU 5310. The NGV STA may identify that the format of the first PPDU 5310 is a repeated PPDU format based on the first PPDU 5310. The same PPDU as the first PPDU 5310 is to be transmitted, and since the decoding of the first PPDU 5310 is successful, the NGV STA no longer needs to decode the same PPDU.

After receiving the first PPDU 5310, the NGV STA may receive the second PPDU 5320 after a specified interval. The specified interval may be set in various ways. For example, the specified interval may be set to SIFS.

The NGV STA may identify that the format of the first PPDU 5310 is a repeated PPDU format based on the second PPDU 5320. Accordingly, the NGV STA may stop decoding the second PPDU 5320. The NGV STA may defer channel access for a time (for example, RXTIME) predicted from the time extracted/obtained from the second PPDU 5320. After the transmission of the second PPDU 5320 is finished, the NGV STA may resume channel access.

Figure 54:
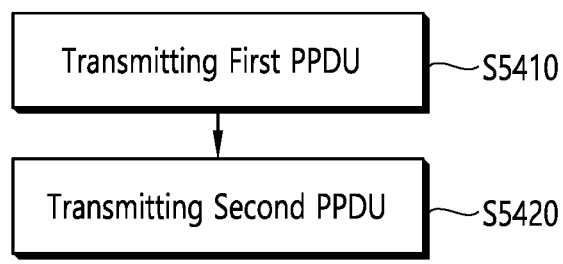
FIG. 54 is a flowchart for describing an operation of a transmitting STA.

FIG. 54 is a flowchart for describing an operation of a transmitting STA.

Referring to FIG. 54, in step S5410, a transmitting STA may transmit a first PPDU. According to an embodiment, the transmitting STA may generate a first PPDU. The transmitting STA may transmit the generated first PPDU. According to an embodiment, the first PPDU may be configured in a repeated PPDU format.

According to an embodiment, the first PPDU may include at least one symbol. For example, the first PPDU may include at least one field, and the field may include at least one symbol.

According to an embodiment, at least one symbol may include at least one extra tone.

For example, at least one symbol may include an L-SIG. For another example, the at least one symbol may include an L-SIG and at least a portion of a data field. For another example, the at least one symbol may include at least a portion of a data field.

For example, the at least one extra tone may be set to one of a first value and a second value. The first value may include "1". The second value may include "0".

For example, the subcarrier index of at least one extra tone may be set to [−27, 27]. That is, at least one extra tone may be set to 2 tones. For other example, the subcarrier index of at least one extra tone may be set to [−28, −27, 27, 28]. That is, at least one extra tone may be set to 4 tones.

According to an embodiment, the transmitting STA may set at least one extra tone to a specified sequence. For example, when the transmitting STA transmits the first PPDU of the repeated PPDU format, in the first PPDU, at least one extra tone may be set to a specified sequence.

According to an embodiment, the transmitting STA may set at least one extra tone to specified sequences. For example, when the transmitting STA transmits the first PPDU of the repeated PPDU format, at least one extra tone of the L-SIG symbol of the first PPDU may be set as the first sequence. In addition, the transmitting STA may set at least one extra tone of the data symbol of the first PPDU as the second sequence.

According to an embodiment, the transmitting STA may include power in at least one extra tone. For example, when the transmitting STA transmits the first PPDU of the repeated PPDU format, power may be included in at least one extra tone of the first PPDU.

In step S5420, the transmitting STA may transmit a second PPDU. According to an embodiment, the transmitting STA may transmit the second PPDU including the same data as the first PPDU. For example, the second PPDU may be configured the same as the first PPDU. Also, the second PPDU may be configured in the same repeated PPDU format as the first PPDU. According to an embodiment, the interval between the first PPDU and the second PPDU may be set in various ways. For example, the interval between the first PPDU and the second PPDU may be set to SIFS.

According to an embodiment, the first PPDU and the second PPDU may be transmitted based on 156.25 kHz frequency spacing. In addition, the first PPDU and the second PPDU may be transmitted through a 5.9 GHz band.

According to an embodiment, the transmitting STA may support a PPDU of a first type and a PPDU of a second type. For example, the first type of PPDU may include a legacy PPDU. The second type of PPDU may include a Next Generation Vehicular network (NGV) PPDU. For example, the first type of PPDU may be referred to as an 11p PPDU. The first type of PPDU may be related to the 11p PPDU 2100 of FIG. 21. The second type of PPDU may be related to the NGV PPDU 2200 of FIG. 22.

For example, the first PPDU and the second PPDU may be configured as the first type of PPDU. For example, the first PPDU and the second PPDU may be set to 10 MHz.

Figure 55:
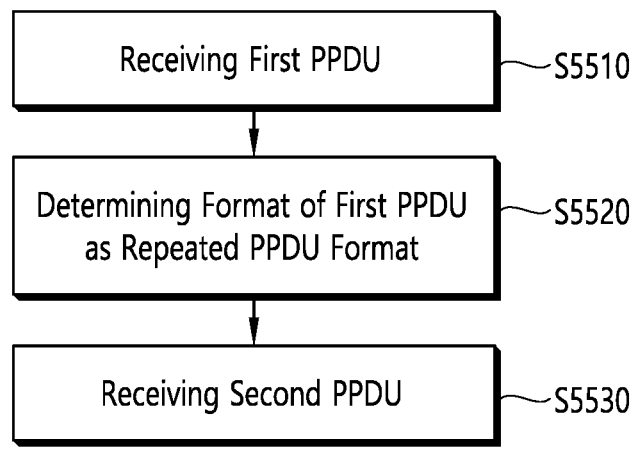
FIG. 55 is a flowchart describing an operation of a receiving STA.

FIG. 55 is a flowchart describing an operation of a receiving STA.

Referring to FIG. 55, in step S5510, the receiving STA may receive a first PPDU. According to an embodiment, the receiving STA may receive the first PPDU from the transmitting STA.

According to an embodiment, the first PPDU may include at least one symbol. For example, the first PPDU may include at least one field, and the field may include at least one symbol.

According to an embodiment, at least one symbol may include at least one extra tone.

For example, at least one symbol may include an L-SIG. For another example, the at least one symbol may include an L-SIG and at least a portion of a data field. For another example, the at least one symbol may include at least a portion of a data field.

For example, the at least one extra tone may be set to one of a first value and a second value. The first value may include "1". The second value may include "0".

For example, the subcarrier index of at least one extra tone may be set to [−27, 27]. That is, at least one extra tone may be set to 2 tones. For another example, the subcarrier index of at least one extra tone may be set to [−28, −27, 27, 28]. That is, at least one extra tone may be set to 4 tones.

In step S5520, the receiving STA may determine the format of the first PPDU as the repeated PPDU format. According to an embodiment, the receiving STA may determine the format of the first PPDU as the repeated PPDU format based on at least one extra tone.

According to an embodiment, the receiving STA may check whether the average power of at least one extra tone exceeds a specified value. For example, the receiving STA may check the power of each of the at least one extra tone. The receiving STA may check whether the average power exceeds a specified value, based on each power of the at least one extra tone. The receiving STA may determine the format of the first PPDU as the repeated PPDU format based on whether the average power of the at least one extra tone exceeds a specified value.

According to an embodiment, the receiving STA may check whether at least one extra tone is set to a specified sequence. When the format of the first PPDU is set to the repeated PPDU format, the at least one extra tone may be set to a specified sequence. Accordingly, the receiving STA may determine the format of the first PPDU as the repeated PPDU format based on whether at least one extra tone is set to a specified sequence.

According to an embodiment, the receiving STA may check the number of PPDUs including the same data as the first PPDU, based on the first PPDU. For example, when the format of the first PPDU is the repeated PPDU format, a plurality of PPDUs including the same data as the first PPDU may be transmitted from the transmitting STA. The first PPDU may include information on how many PPDUs including the same data as the first PPDU are to be transmitted. Accordingly, the receiving STA may identify the number of PPDUs including the same data as the first PPDU, based on the first PPDU.

In step S5530, the receiving STA may receive the second PPDU. According to an embodiment, the receiving STA may receive, from the transmitting STA, a second PPDU including the same data as the first PPDU based on the format of the first PPDU.

According to an embodiment, the receiving STA may determine the format of the second PPDU as the repeated PPDU format based on the second PPDU. Thereafter, the receiving STA may stop decoding the second PPDU. The receiving STA may defer channel access based on the length of the second PPDU.

According to an embodiment, the receiving STA may combine the first PPDU and the second PPDU. The receiving STA may obtain a performance gain by combining the first PPDU and the second PPDU including the same data.

According to an embodiment, the first PPDU and the second PPDU may be received based on 156.25 kHz frequency spacing. In addition, the first PPDU and the second PPDU may be received through a 5.9 GHz band.

According to an embodiment, the receiving STA may support a PPDU of a first type and a PPDU of a second type. For example, the first type of PPDU may include a legacy PPDU. The second type of PPDU may include a Next Generation Vehicular network (NGV) PPDU. For example, the first type of PPDU may be referred to as an 11p PPDU. The first type of PPDU may be related to the 11p PPDU 2100 of FIG. 21. The second type of PPDU may be related to the NGV PPDU 2200 of FIG. 22.

For example, the first PPDU and the second PPDU may be configured as the first type of PPDU. For example, the first PPDU and the second PPDU may be set to 10 MHz.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, an apparatus herein may include a memory and a processor operatively coupled to the memory. The processor may be configured to receive a first Physical Protocol Data Unit (PPDU) from a transmitting STA. The processor may be configured to determine the format of the first PPDU as a repeated PPDU format based on at least one extra tone included in at least one symbol of the first PPDU. Based on the format of the PPDU, the processor may be configured to receive a second PPDU including the same data as the first PPDU. The first PPDU and the second PPDU may be received through a 5.9 GHz band based on a frequency spacing of 156.25 kHz.

The technical features of the present specification may be implemented based on a computer readable medium (CRM). For example, CRM proposed by the present specification may store instructions for performing operations. The operations may include receiving a first Physical Protocol Data Unit (PPDU) from a transmitting STA, wherein at least one symbol of the first PPDU includes at least one extra tone; determining the format of the first PPDU as a repeated PPDU format based on the at least one extra tone; and receiving a second PPDU including the same data as the first PPDU based on the format of the first PPDU, wherein the first PPDU and the second PPDU are received through a 5.9 GHz band based on a frequency spacing of 156.25 kHz. The instructions stored in the CRM of the present specification may be executed by at least one processor. At least one processor related to the CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The technical features of the present specification described above are applicable to various applications or business models. For example, the UE, terminal, STA, transmitter, receiver, processor, and/or transceiver described herein may be applied to a vehicle supporting autonomous driving or a conventional vehicle supporting autonomous driving.

Figure 56:
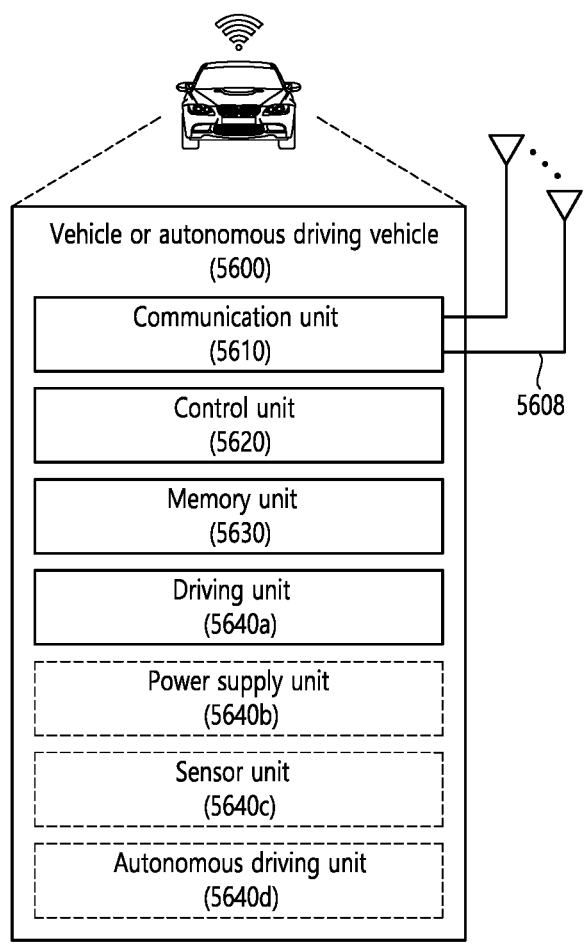
FIG. 56 shows an example of a vehicle or an autonomous driving vehicle applied to this specification.

FIG. 56 shows an example of a vehicle or an autonomous driving vehicle applied to this specification. The vehicle or autonomous driving vehicle may be implemented as a mobile robot, a vehicle, a train, an aerial vehicle (AV), a ship, and the like.

The memory unit 5630 illustrated in FIG. 56 may be included in the memories 112 and 122 illustrated in FIG. 1. Also, the communication unit 5610 illustrated in FIG. 56 may be included in the transceivers 113 and 123 and/or the processors 111 and 121 illustrated in FIG. 1. In addition, the remaining devices shown in FIG. 56 may be included in the processors 111 and 121 shown in FIG. 1.

Referring to FIG. 56, the vehicle or autonomous vehicle 5600 includes an antenna unit 5608, a communication unit 5610, a control unit 5620, a memory unit 5630, a driving unit 5640a, a power supply unit 5640b, and a sensor unit 5640c, and/or an autonomous driving unit 5640d. The antenna unit 5608 may be configured as a part of the communication unit 5610.

The communication unit 5610 may transmit and receive signals (for example, data, control signals, etc.) with external devices such as other vehicles, base stations (for example, base stations, roadside units, etc.), servers, and the like. The controller 5620 may perform various operations by controlling elements of the vehicle or the autonomous driving vehicle 5600. The controller 5620 may include an Electronic Control Unit (ECU). The driving unit 5640a may cause the vehicle or the autonomous driving vehicle 5600 to run on the ground. The driving unit 5640a may include an engine, a motor, a power train, a wheel, a brake, a steering device, and the like. The power supply unit 5640b supplies power to the vehicle or the autonomous driving vehicle 5600 and may include a wired/wireless charging circuit, a battery, and the like. The sensor unit 5640c may obtain vehicle state, surrounding environment information, user information, and the like. The sensor unit 5640c includes an inertial measurement unit (IMU) sensor, a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, a pedal position sensor, and the like. The autonomous driving unit 5640d may implement a technology for maintaining a driving lane, a technology for automatically adjusting speed such as adaptive cruise control, a technology for automatically driving along a predetermined route, a technology for automatically setting a route when a destination is set, and the like.

For example, the communication unit 5610 may receive map data, traffic information data, and the like from an external server. The autonomous driving unit 5640d may generate an autonomous driving route and a driving plan based on the acquired data. The controller 5620 may control the driving unit 5640a to move the vehicle or the autonomous driving vehicle 5600 along the autonomous driving path (for example, speed/direction adjustment) according to the driving plan. During autonomous driving, the communication unit 5610 may non-periodically/periodically acquire the latest traffic information data from an external server and acquire surrounding traffic information data from nearby vehicles. Also, during autonomous driving, the sensor unit 5640c may acquire vehicle state and surrounding environment information. The autonomous driving unit 5640d may update the autonomous driving route and driving plan based on the newly acquired data/information. The communication unit 5610 may transmit information about a vehicle location, an autonomous driving route, a driving plan, and the like to an external server. The external server may predict traffic information data in advance using AI technology or the like based on information collected from the vehicle or autonomous driving vehicles, and may provide the predicted traffic information data to the vehicle or autonomous driving vehicles.

An embodiment of this specification includes an example of FIG. 57 described below.

Figure 57:
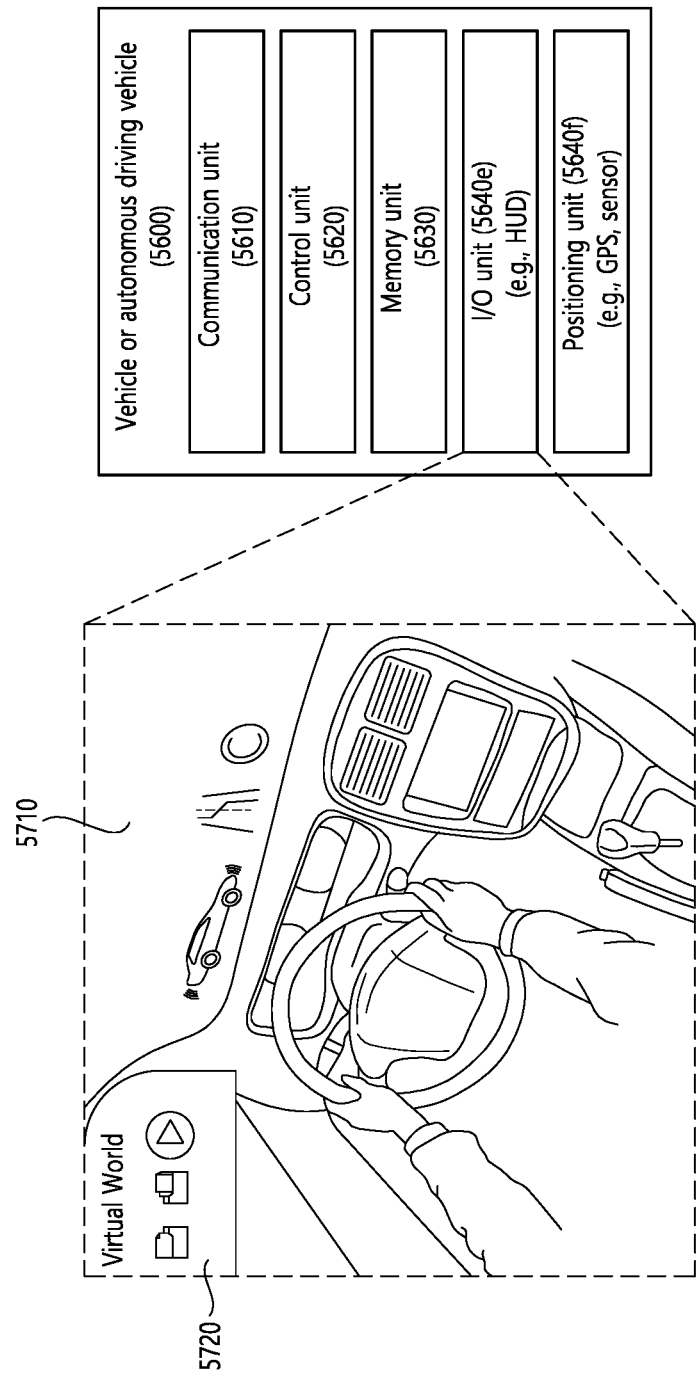
FIG. 57 shows an example of a vehicle based on the present specification.

FIG. 57 shows an example of a vehicle based on the present specification. The vehicle may also be implemented as a means of transportation, a train, an air vehicle, a ship, and the like.

Referring to FIG. 57, a vehicle 5600 may include a communication unit 5610, a control unit 5620, a memory unit 5630, an input/output unit 5640e, and a position measurement unit 5640f. Each block/unit/device shown in FIG. 57 may be the same as the block/unit/device shown in FIG. 56.

The communication unit 5610 may transmit/receive signals (for example, data, control signals, etc.) with other vehicles or external devices such as a base station. The controller 5620 may control components of the vehicle 5600 to perform various operations. The memory unit 5630 may store data/parameters/programs/codes/commands supporting various functions of the vehicle 5600. The input/output unit 5640e may output an AR/VR object based on information in the memory unit 5630. The input/output unit 5640e may include a HUD. The location measurement unit 5640f may obtain location information of the vehicle 5600. The location information may include absolute location information of the vehicle 5600, location information within a driving line, acceleration information, location information with respect to a neighboring vehicle, and the like. The location measurement unit 5640f may include a GPS and various sensors.

For example, the communication unit 5610 of the vehicle 5600 may receive map information, traffic information, and the like from an external server and store them in the memory unit 5630. The location measurement unit 5640f may obtain vehicle location information through GPS and various sensors and store them in the memory unit 5630. The controller 5620 may generate a virtual object based on map information, traffic information, and vehicle location information, and the input/output unit 5640e may display the generated virtual object on a vehicle window (5710, 5720). Also, the controller 5620 may determine whether the vehicle 5600 is normally operating within the driving line based on the vehicle location information. When the vehicle 5600 deviates from the driving line abnormally, the control unit 5620 may display a warning on the windshield of the vehicle through the input/output unit 5640e. Also, the control unit 5620 may broadcast a warning message regarding driving abnormalities to surrounding vehicles through the communication unit 5610. Depending on the situation, the controller 5620 may transmit, through the communication unit 561, the location information of the vehicle and Information about driving/vehicle abnormalities.

The foregoing technical features of this specification are applicable to various applications or business models.

For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network system, the method comprising:
   receiving, by a receiving STA from a transmitting STA, a first Physical Protocol Data Unit (PPDU), wherein at least one symbol of the first PPDU includes at least one extra tone;
   determining, by the receiving STA, the format of the first PPDU as a repeated PPDU format based on the at least one extra tone; and
   receiving, by the receiving STA from the transmitting STA, a second PPDU including the same data as the first PPDU based on the format of the first PPDU, wherein the first PPDU and the second PPDU are received through a 5.9 GHz band based on a frequency spacing of 156.25 kHz.

2. The method of claim 1, wherein a subcarrier index of the at least one extra tone is set to [−27, 27].

3. The method of claim 1, wherein a subcarrier index of the at least one extra tone is set to [−28, −27, 27, 28].

4. The method of claim 1, wherein the at least one extra tone is set to one of a first value and a second value.

5. The method of claim 1, wherein the method further comprises,
   checking, by the receiving STA, whether average power of the at least one extra tone exceeds a specified value.

6. The method of claim 1, wherein the method further comprises,
   checking, by the receiving STA, whether the at least one extra tone is set to a specified sequence.

7. The method of claim 1, wherein the method further comprises,
   determining, by the receiving STA, a number of PPDU including the same data as the first PPDU, based on the first PPDU.

8. The method of claim 1, wherein the at least one symbol includes at least a portion of a data field and an L-SIG field.

9. The method of claim 1, wherein the first PPDU and the second PPDU are set to 10 MHz.

10. The method of claim 1, wherein the receiving STA supports the first type of PPDU and the second type of PPDU, and
    wherein the first PPDU and the second PPDU are configured as the first type of PPDU.

11. The method of claim 10, wherein the first type of PPDU includes a legacy PPDU, and
    wherein the second type of PPDU includes a Next Generation Vehicular network (NGV) PPDU.

12. The method of claim 1, wherein the method further comprises,
    determining, by the receiving STA, a format of the second PPDU as a repeated PPDU format based on the second PPDU;
    stopping, by the receiving STA, decoding the second PPDU; and
    deferring, by the receiving STA, channel access based on a length of the second PPDU.

13. A method in a wireless local area network system, the method comprising:
    transmitting, by the transmitting STA, a first Physical Protocol Data Unit (PPDU), wherein at least one symbol of the first PPDU includes at least one extra tone; and transmitting, by the transmitting STA, a second PPDU including the same data as the first PPDU, wherein the first PPDU and the second PPDU are transmitted through a 5.9 GHZ band based on a frequency spacing of 156.25 kHz.

14. A receiving STA in a wireless local area network system, the receiving STA comprises,
a transceiver for receiving a radio signal; and
a processor being coupled to the transceiver, wherein the processor is configured to:
receive, from a transmitting STA, a first Physical Protocol Data Unit (PPDU);
determine a format of the first PPDU as a repeated PPDU format based on at least one extra tone included in at least one symbol of the first PPDU;
receive a second PPDU including the same data as the first PPDU, based on the format of the first PPDU,
wherein the first PPDU and the second PPDU are received through a 5.9 GHz band based on a frequency spacing of 156.25 kHz.

15. The receiving STA of claim 14, wherein a subcarrier index of the at least one extra tone is set to [−27, 27].

16. The receiving STA of claim 14, wherein a subcarrier index of the at least one extra tone is set to [−28, −27, 27, 28].

17. The receiving STA of claim 14, wherein the at least one symbol includes at least a portion of a data field and an L-SIG field.

* * * * *